US012473134B2

(12) United States Patent
Sollie et al.

(10) Patent No.: US 12,473,134 B2
(45) Date of Patent: *Nov. 18, 2025

(54) CUSHIONED MAILER

(71) Applicant: Pratt Corrugated Holdings, Inc., Brookhaven, GA (US)

(72) Inventors: Greg Sollie, Sharpsburg, GA (US); Christopher M. Stanton, Peachtree City, GA (US)

(73) Assignee: Pratt Corrugated Holdings, Inc., Brookhaven, GA (US)

( * ) Notice: Subject to any disclaimer, the term of this patent is extended or adjusted under 35 U.S.C. 154(b) by 21 days.

This patent is subject to a terminal disclaimer.

(21) Appl. No.: 18/099,502

(22) Filed: Jan. 20, 2023

(65) Prior Publication Data
US 2023/0150748 A1 May 18, 2023

Related U.S. Application Data

(63) Continuation-in-part of application No. 17/177,908, filed on Feb. 17, 2021.
(Continued)

(51) Int. Cl.
*B65D 81/03* (2006.01)
*B32B 3/30* (2006.01)
(Continued)

(52) U.S. Cl.
CPC ......... *B65D 81/051* (2013.01); *B65D 75/323* (2013.01); *B65D 2575/3227* (2013.01); *B65D 2581/053* (2013.01)

(58) Field of Classification Search
CPC ...... B65D 81/03; B65D 81/051; B65D 81/02; B65D 81/022; B65D 81/025; B65D 81/027; B65D 3/30; B65D 3/08
See application file for complete search history.

(56) References Cited

U.S. PATENT DOCUMENTS

| 1,945,024 A | 1/1934 | Coil et al. |
| 2,036,051 A | 3/1936 | Kieffer |

(Continued)

FOREIGN PATENT DOCUMENTS

| CH | 372913 | 10/1963 |
| CN | 108639567 | 10/2018 |

(Continued)

OTHER PUBLICATIONS

Moore, Benjamin Edward Lee; Non-Final Office Action for U.S. Appl. No. 17/012,870, filed Sep. 4, 2020, mailed Jul. 7, 2023, 6 pgs.
(Continued)

*Primary Examiner* — Nathan J Newhouse
*Assistant Examiner* — Nina K Attel
(74) *Attorney, Agent, or Firm* — Taylor Duma LLP

(57) ABSTRACT

A cushioned mailer includes a paper outer layer; a paper inner layer defining an inner cavity of the cushioned mailer, the inner cavity configured to receive contents therein, the inner cavity defining an opening at a top end of the cushioned mailer, the opening allowing access to the inner cavity; and an intermediate cushioning layer disposed between the paper outer layer and the paper inner layer, the intermediate cushioning layer comprising a plurality of cushioning inserts, each of the plurality of cushioning inserts being substantially uniform in size and shape.

23 Claims, 42 Drawing Sheets

Related U.S. Application Data

(60) Provisional application No. 63/302,802, filed on Jan. 25, 2022, provisional application No. 63/059,001, filed on Jul. 30, 2020.

(51) Int. Cl.
    *B65D 75/32*    (2006.01)
    *B65D 81/05*    (2006.01)

(56) References Cited

U.S. PATENT DOCUMENTS

| | | |
|---|---|---|
| 2,106,246 A | 1/1938 | Fourness |
| 2,345,844 A | 4/1944 | Weiss |
| 2,502,113 A | 3/1950 | Walker |
| 2,896,692 A | 7/1959 | Camillo |
| 3,642,967 A | 2/1972 | Doll |
| 3,672,950 A | 6/1972 | Murphy et al. |
| 3,867,874 A | 2/1975 | O'Neil |
| 4,580,683 A | 4/1986 | Gochenour |
| 4,620,633 A | 11/1986 | Lookholder |
| 4,861,170 A | 8/1989 | Patriksson |
| D310,953 S | 10/1990 | Lukowicz et al. |
| 5,273,361 A | 12/1993 | Jillson |
| 5,374,468 A | 12/1994 | Babinsky et al. |
| D364,812 S | 12/1995 | Breton |
| 5,593,755 A | 1/1997 | Fuss |
| 5,667,871 A | 9/1997 | Goodrich et al. |
| 5,688,578 A | 11/1997 | Goodrich |
| 5,782,735 A | 7/1998 | Goodrich et al. |
| 5,799,862 A | 9/1998 | Gray |
| 5,897,481 A | 4/1999 | Baumuller |
| 5,910,079 A | 6/1999 | Watanabe |
| 6,647,697 B1 | 11/2003 | Zarrow et al. |
| 6,716,498 B2 | 4/2004 | Curro et al. |
| 6,808,791 B2 | 10/2004 | Curro et al. |
| 6,863,960 B2 | 3/2005 | Curro et al. |
| 6,878,433 B2 | 4/2005 | Curro et al. |
| 6,913,389 B2 * | 7/2005 | Kannankeril .......... B65D 33/20 |
| | | 383/110 |
| D513,182 S | 12/2005 | DeLuca et al. |
| 6,986,932 B2 | 1/2006 | Zink et al. |
| 7,037,569 B2 | 5/2006 | Curro et al. |
| 7,255,910 B1 | 8/2007 | Seckel |
| D617,642 S | 6/2010 | Jonzon et al. |
| 7,807,253 B2 | 10/2010 | Kannankeril |
| 7,846,518 B2 | 12/2010 | Hahn |
| D640,557 S | 6/2011 | Wehrmann |
| 8,052,037 B2 | 11/2011 | Bussey, III et al. |
| D659,022 S | 5/2012 | Kemner |
| 8,449,968 B2 | 5/2013 | Mueller et al. |
| 8,613,993 B2 | 12/2013 | Kuchar |
| 9,045,271 B2 | 6/2015 | Matheison et al. |
| 9,315,312 B2 | 4/2016 | De Luca et al. |
| 9,376,280 B2 | 6/2016 | Page et al. |
| D770,282 S | 11/2016 | Ye et al. |
| 9,533,809 B2 | 1/2017 | Kuchar et al. |
| 9,643,754 B2 | 5/2017 | Brogan |
| 9,701,091 B2 | 7/2017 | Page et al. |
| D817,521 S | 5/2018 | Bordin |
| 9,963,283 B2 | 5/2018 | Page et al. |
| 10,226,907 B2 | 3/2019 | Goodrich |
| 10,442,574 B2 | 10/2019 | Kuchar et al. |
| 10,569,495 B2 | 2/2020 | Waldrop, III et al. |
| D876,843 S | 3/2020 | Zhang |
| 10,669,086 B2 | 6/2020 | Goodrich |
| 10,717,583 B2 | 7/2020 | Hoffman et al. |
| D898,382 S | 10/2020 | Delaney et al. |
| 10,850,891 B2 | 12/2020 | Yan |
| 10,870,949 B2 | 12/2020 | De Luca |
| D906,814 S | 1/2021 | Hsieh |
| 10,981,712 B2 | 4/2021 | Goodrich |
| 11,981,492 B2 | 5/2024 | Moore et al. |
| 12,043,015 B2 | 7/2024 | Sollie et al. |
| 12,214,576 B2 | 2/2025 | Sollie et al. |
| 12,415,331 B2 | 9/2025 | Sollie et al. |
| 2001/0031339 A1 | 10/2001 | Johnson |
| 2003/0021649 A1 | 1/2003 | Shetty |
| 2003/0029767 A1 | 2/2003 | Collins |
| 2004/0000581 A1 | 1/2004 | Brandolini et al. |
| 2004/0076798 A1 | 4/2004 | Larsson |
| 2005/0173506 A1 * | 8/2005 | Bartlett .................. B65D 27/14 |
| | | 229/80 |
| 2006/0210773 A1 | 9/2006 | Kannankeril |
| 2007/0082181 A1 | 4/2007 | Jung |
| 2008/0029583 A1 | 2/2008 | Korijio |
| 2010/0028611 A1 | 2/2010 | Adie |
| 2011/0127189 A1 * | 6/2011 | Liao ..................... B65D 81/052 |
| | | 206/521 |
| 2011/0266334 A1 | 11/2011 | Keltsch |
| 2011/0318522 A1 | 12/2011 | Mueller et al. |
| 2012/0104009 A1 | 5/2012 | Fascio |
| 2012/0248177 A1 | 10/2012 | Beaulieu et al. |
| 2013/0171422 A1 | 7/2013 | De Luca et al. |
| 2014/0117071 A1 | 5/2014 | Kannankeril et al. |
| 2015/0024172 A1 | 1/2015 | Pollock |
| 2015/0175331 A1 | 6/2015 | Sheu et al. |
| 2017/0203866 A1 | 7/2017 | Goodrich |
| 2018/0093441 A1 | 4/2018 | Wetsch |
| 2018/0162597 A1 | 6/2018 | Jobe |
| 2018/0334211 A1 | 11/2018 | Mertens et al. |
| 2018/0370702 A1 | 12/2018 | Goodrich |
| 2019/0062028 A1 | 2/2019 | Getty et al. |
| 2020/0031556 A1 | 1/2020 | Jobe |
| 2020/0039720 A1 | 2/2020 | Goodrich |
| 2020/0055272 A1 | 2/2020 | Boex |
| 2020/0247079 A1 | 8/2020 | Goodrich |
| 2020/0247105 A1 | 8/2020 | Getty et al. |
| 2020/0307866 A1 | 10/2020 | Yan |
| 2020/0307867 A1 | 10/2020 | Yan |
| 2021/0061535 A1 * | 3/2021 | Moore .................... B32B 29/08 |
| 2021/0078280 A1 | 3/2021 | Bergmann |
| 2021/0130070 A1 | 5/2021 | Zhu et al. |
| 2021/0221567 A1 | 7/2021 | Yan |
| 2022/0032572 A1 | 2/2022 | Sollie et al. |
| 2022/0153478 A1 * | 5/2022 | Mayer ..................... B65D 31/10 |
| 2023/0130696 A1 | 4/2023 | Sollie et al. |
| 2023/0234767 A1 | 7/2023 | Sollie |
| 2024/0262596 A1 | 8/2024 | Moore et al. |
| 2024/0286375 A1 | 8/2024 | Sollie et al. |
| 2025/0178305 A1 | 6/2025 | Sollie et al. |

FOREIGN PATENT DOCUMENTS

| | | |
|---|---|---|
| DE | 7730285 | 1/1978 |
| DE | 7735721 | 6/1983 |
| DE | 8913282 | 1/1990 |
| DE | 9302138 | 5/1993 |
| DE | 9313414 | 11/1993 |
| EP | 0553413 | 8/1993 |
| EP | 2463088 | 6/2012 |
| EP | 3564146 | 11/2019 |
| GB | 2093403 | 9/1982 |
| GB | 2488509 | 9/2012 |
| JP | 2010228111 | 10/2010 |
| WO | 0000408 | 1/2000 |
| WO | 2014175792 | 10/2014 |
| WO | 2018185213 | 10/2018 |
| WO | 2021046395 | 3/2021 |
| WO | 2021155145 | 8/2021 |
| WO | 2023146805 | 8/2023 |

OTHER PUBLICATIONS

Sollie, Greg; Final Office Action for U.S. Appl. No. 17/177,908, filed Feb. 17, 2021, mailed Jul. 25, 2023, 25 pgs.
Sollie, Greg; Non-Final Office Action for U.S. Appl. No. 18/146,244, filed Dec. 23, 2022, mailed Sep. 20, 2023, 34 pgs.
Sollie, Greg; Final Office Action for U.S. Appl. No. 17/177,908, filed Feb. 17, 2021, mailed May 24, 2024, 24 pgs.
Ecoenclose; Article entitled: "100% Recycled Indented Kraft Paper Roll—24"x360"', located at <https://www.ecoenclose.com/100-recycled-indented-kraft-paper-roll-24-x-360/>, accessed on Oct. 14, 2021, 5 pgs.

(56) References Cited

OTHER PUBLICATIONS

Jakodan; Article entitled: "Bubble Paper 25 CM", located at <https://www.jakodan.com/boble-papir-25-cm.html>, accessed on Oct. 14, 2021, 2 pgs.
Kite Packaging Ltd; Article entitled: "Bubble Wrap (mcp/bubble-wrap/) > Paper bubble wrap", accessed on Oct. 13, 2021, 3 pgs.
Moore, Benjamin Edward Lee; International Search Report and Written Opinion for PCT/US2020/049467, filed Sep. 4, 2020, mailed Dec. 10, 2020, 10 pgs.
Moore, Benjamin Edward Lee; Non-Final Office Action for U.S. Appl. No. 17/012,870, filed Sep. 4, 2020, mailed Oct. 6, 2022, 13 pgs.
Moore, Benjamin Edward Lee; Restriction Requirement for U.S. Appl. No. 17/012,870, filed Sep. 4, 2020, mailed Sep. 2, 2022, 6 pgs.
Sollie, Greg; Non-Final Office Action for U.S. Appl. No. 17/177,908, filed Feb. 17, 2021, mailed Jan. 13, 2023, 31 pgs.
Sollie, Greg; Requirement for Restriction/Election for U.S. Appl. No. 17/177,908, filed Feb. 17, 2021, mailed Sep. 6, 2022, 7 pgs.
Amazon.com; Article entitled: C-Line Heavy Duty Super Heavyweight Plus Stitched Shop Ticket Holder, Black, 9 x 12 Inches, Box of 15 Shop Ticket Holders (50912)>, available at <https://www.amazon.com/C-Line-Heavyweight-Stitched-Holders-50912/dp/B00MMR24G2/>, accessed on Jan. 11, 2023, 8 pgs.
Jbm Packaging; Article entitled: "Commercial Seed Packets", located at <https://www.jbmpackaging.com/products/premium-packets/commercial-seed-packets/>, accessed on Jan. 11, 2023, 10 pgs.
Product Packaging Supplies; Article entitled: "34-6-56-9-3/4"× 12-1/4" Stayflats Plus Peel-And-Seal Mailer-KRAFT", located <https://productpackagingsupplies.com/Item/9_3_4x12_1_4_Stayflats_Plus_Peel_and_Seal_Mailer_Kraft>, accessed on Jan. 11, 2023, 6 pgs.
Moore, Benjamin Edward Lee; Notice of Allowance for U.S. Appl. No. 17/012,870, filed Sep. 4, 2020, mailed Jan. 10, 2024, 7 pgs.
Sollie, Greg; Non-Final Office Action for U.S. Appl. No. 17/177,908, filed Feb. 17, 2021, mailed Feb. 12, 2024, 25 pgs.
Sollie, Greg; Notice of Allowance for U.S. Appl. No. 18/146,244, filed Dec. 23, 2022, mailed Feb. 7, 2024, 12 pgs.
Sollie, Greg; Requirement for Restriction/Election for U.S. Appl. No. 18/146,244, filed Dec. 23, 2022, mailed May 23, 2023, 7 pgs.
Sollie, Greg; International Search Report and Written Opinion for PCT Application No. PCT/US2023/11269, filed Jan. 20, 2023, mailed Apr. 5, 2023, 13 pgs.
Sollie, Greg; Non-Final Office Action for U.S. Appl. No. 17/177,908, filed Feb. 17, 2021, mailed Sep. 12, 2024, 26 pgs.
Sollie, Greg; Non-Final Office Action for U.S. Appl. No. 18/655,030, filed May 3, 2024, mailed Aug. 22, 2024, 28 pgs.
Sollie, Greg; Requirement for Restriction/Election for U.S. Appl. No. 18/151,220, filed Jan. 6, 2023, mailed Aug. 21, 2024, 6 pgs.
Sollie, Greg; International Preliminary Report on Patentability for PCT Application No. PCT/US2023/11269, filed Jan. 20, 2023, mailed Aug. 8, 2024, 11 pgs.
Sollie, Greg; Non-Final Office Action for U.S. Appl. No. 18/151,220, filed Jan. 6, 2023, mailed Nov. 1, 2024, 20 pgs.
Sollie, Greg; Advisory Action for U.S. Appl. No. 18/151,220, filed Jan. 6, 2023, mailed Apr. 11, 2025, 3 pgs.
Sollie, Greg; Non-Final Office Action for U.S. Appl. No. 19/043,816, filed Feb. 3, 2025, mailed May 8, 2025, 18 pgs.
Moore, Benjamin Edward Lee; Non-Final Office Action for U.S. Appl. No. 18/636,656, filed Apr. 16, 2024, mailed Dec. 13, 2024, 14 pgs.
Sollie, Greg; Notice of Allowance for U.S. Appl. No. 18/655,030, filed May 3, 2024, mailed Nov. 19, 2024, 12 pgs.
Sollie, Greg; Final Office Action for U.S. Appl. No. 18/151,220, filed Jan. 6, 2023, mailed Feb. 10, 2025, 9 pgs.
Moore, Benjamin Edward Lee; Final Office Action for U.S. Appl. No. 18/636,656, filed Apr. 16, 2024, mailed Jun. 12, 2025, 5 pgs.
Sollie, Greg; Notice of Allowance for U.S. Appl. No. 17/177,908, filed Feb. 17, 2021, mailed May 19, 2025, 12 pgs.
Sollie, Greg; Notice of Allowance for U.S. Appl. No. 19/043,816, filed Feb. 3, 2025, mailed Jul. 8, 2025, 8 pgs.
Moore, Benjamin Edward Lee; Notice of Allowance for U.S. Appl. No. 18/636,656, filed Apr. 16, 2024, mailed Sep. 10, 2025, 9 pgs.
Sollie, Greg; Non-Final Office Action for U.S. Appl. No. 18/151,220, filed Jan. 6, 2023, mailed Aug. 28, 2025, 16 pgs.

* cited by examiner

CUSHIONED MAILER

CROSS-REFERENCE TO RELATED APPLICATIONS

The present application is a continuation-in-part of U.S. application Ser. No. 17/177,908, filed Feb. 17, 2021, which claims the benefit of U.S. Provisional Application No. 63/059,001, filed Jul. 30, 2020, each of which is hereby specifically incorporated by reference herein in its entirety. The present application further claims the benefit of U.S. Provisional Application No. 63/302,802, filed Jan. 25, 2022, which is hereby specifically incorporated by reference herein in its entirety.

TECHNICAL FIELD

This disclosure relates to cushioning materials. More specifically, this disclosure relates to a sheet with cushioning inserts.

BACKGROUND

Cushioning sheets, such as wrapping paper and bubble wrap, are often used as cushioning for fragile objects during shipping. Wrapping paper typically comprises a single, thin sheet of paper that can be bunched up and packed around the object to limit movement of the object within a package and to provide cushioning from heavy impacts. However, wrapping paper easily crumples under force, and, once crumpled, can lose its volume and effectiveness. Bubble wrap typically comprises a plastic sheet defining air fill pockets. However, typical plastic bubble wrap is not recyclable.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a cushioned sheet comprising a first layer comprising a first base and a plurality of first sockets extending from the first base, each of the first sockets spaced apart from adjacent ones of the first sockets; a second layer coupled to the first layer by an adhesive, the second layer comprising a second base and a plurality of second sockets extending from the second base, each of the second sockets aligned with a corresponding one of the first sockets to define a void therebetween; and a plurality of cushioning inserts, each of the plurality cushioning inserts substantially spherical in shape and received in a corresponding one of the voids.

Also disclosed is a cushioned mailer comprising a first layer defining a plurality of first sockets; a second layer defining a plurality of second sockets, each of the first sockets aligned with a corresponding one of the second sockets to define a void therebetween; and a cushioning insert received within each of the voids; wherein the first layer is coupled to the second layer to define a cushioning sheet, the cushioning sheet defining an inner cavity configured to receive contents, the inner cavity at least partially surrounded by the first layer, the second layer facing away from the inner cavity.

Additionally, a method of forming a cushioning sheet is disclosed, the method comprising forming a plurality of first sockets in a first layer; forming a plurality of second sockets in a second layer, each of the second sockets corresponding to a one of the first sockets; positioning a cushioning insert within a void defined between each corresponding pair of the first and second sockets; and coupling the first layer to the second layer.

A cushioned mailer is disclosed, the cushioned mailer comprising a paper outer layer; a paper inner layer defining an inner cavity of the cushioned mailer, the inner cavity configured to receive contents therein, the inner cavity defining an opening at a top end of the cushioned mailer, the opening allowing access to the inner cavity; and an intermediate cushioning layer disposed between the paper outer layer and the paper inner layer, the intermediate cushioning layer comprising a plurality of cushioning inserts, each of the plurality of cushioning inserts being substantially uniform in size and shape.

Furthermore, disclosed is a cushioned mailer comprising a paper outer layer; a paper inner layer defining an inner cavity of the cushioned mailer, the inner cavity configured to receive contents therein, the inner cavity defining an opening at a top end of the cushioned mailer, the opening allowing access to the inner cavity; and an intermediate cushioning layer disposed between the paper outer layer and the paper inner layer, the intermediate cushioning layer comprising a textured paper sheet defining a plurality of cushioning sockets.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
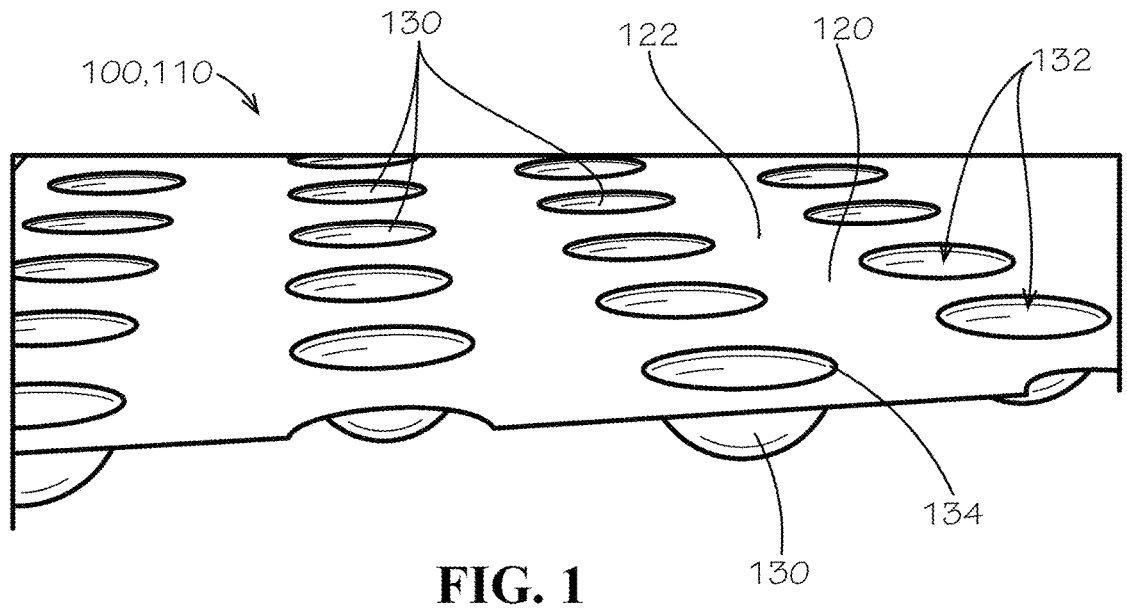
FIG. 1 is a top perspective view of a first paper layer, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a cushioning sheet and associated methods, systems, devices, and various apparatus. Example aspects of the cushioning sheet can comprise a first layer, a second layer, and a plurality of cushioning inserts received between the first layer and the second layer. In some aspects, the cushioning inserts can be substantially spherical in shape and can comprise a starch material. It would be understood by one of skill in the art that the cushioning sheet is described in but a few exemplary embodiments among many. No particular terminology or description should be considered limiting on the disclosure or the scope of any claims issuing therefrom.

FIG. 1 is a top perspective view of a first layer 100 of a cushioning sheet 700 (shown in FIG. 7), in accordance with one aspect of the present disclosure. According to example aspects, the cushioning sheet 700 can be formed by a rolling machine 1400 (shown in FIG. 14). In the present aspect, the first layer 100 can comprise a paper material and can therefore be a first paper layer 110. In some aspects, the paper material can be a tissue-grade paper material, which may be covered with a coating to increase strength while maintaining flexibility. In other aspects, the first layer 100 can comprise any other suitable material known in the art. As shown, according to example aspects, the first paper layer 110 can comprise a substantially planar first base 120 defining a first upper surface 122 and a first lower surface 824 (shown in FIG. 8). The first paper layer 110 can further define a plurality of first sockets 130 extending substantially downward from the first lower surface 824 of the planar first base 120, relative to the orientation shown. In the present aspect, each of the first sockets 130 can be formed as a substantially semi-spherical dome and can define a substantially semi-spherical first recess 132. As shown, each of the first sockets 130 are substantially uniform in size and shape, and each of the first recesses 132 are substantially uniform in size and shape. Each of the first sockets 130 can further define a substantially circular first opening 134 formed at the planar first base 120 that can allow access to the corresponding semi-spherical first recess 132. In the present aspect, each of the first sockets 130 can be spaced apart from adjacent first sockets 130, and the first sockets 130 can be oriented in a plurality of linear rows and columns; however, in other aspects, the first sockets 130 can be oriented in any other suitable arrangement or pattern.

Figure 2:
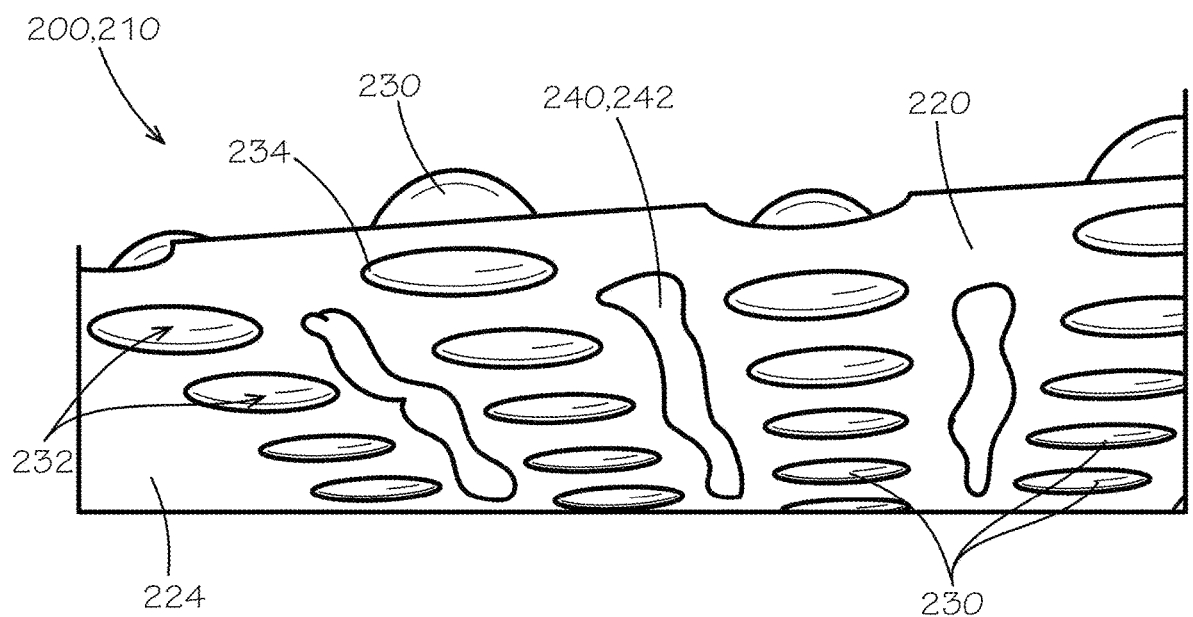
FIG. 2 is a bottom perspective view of a second paper layer, in accordance with another aspect of the present disclosure.

FIG. 2 illustrates a second layer 200 of the cushioning sheet 700 (shown in FIG. 7), in accordance with an aspect of the present disclosure. Like the first layer 100 (shown in FIG. 1), the second layer 200 can comprise a paper material and can therefore be a second paper layer 210. However, in other aspects, the second layer 200 can comprise any other suitable material known in the art, and may or may not comprise the same material as the first layer 100. Example aspects of the second paper layer 210 can be substantially similar as the first paper layer 110 (shown in FIG. 1), as described above. For example, the second paper layer 210 can comprise a substantially planar second base 220 defining a second upper surface 722 (shown in FIG. 7) and a second lower surface 224. The second paper layer 210 can further comprise a plurality of second sockets 230 extending from the planar second base 220. However, unlike the first paper layer 110, wherein the first sockets 130 (shown in FIG. 1) can extend substantially downward from the first lower surface 824 (shown in FIG. 1), the second sockets 230 can extend substantially upward from the second upper surface 722 of the second base 220, relative to the orientation shown. In the present aspect, each of the second sockets 230 can be formed as a substantially semi-spherical dome and can define a substantially semi-spherical second recess 232. As shown, each of the second sockets 230 are substantially uniform in size and shape, and each of the second recesses 232 are substantially uniform in size and shape. Each of the second sockets 230 can further define a substantially circular second opening 234 formed at the planar second base 220 that can allow access to the corresponding semi-spherical second recess 232. In the present aspect, each of the second sockets 230 can be spaced apart from adjacent second sockets 230, and the second sockets 230 can be oriented in a plurality of linear rows and columns; however, in other aspects, the second sockets 230 can be oriented in any other suitable arrangement or pattern. According to example aspects, the second sockets 230 and second recesses 232 of the second paper layer 210 can be substantially similar in size, shape, and arrangement to the first sockets 130 and first recesses 132 (shown in FIG. 1) of the first paper layer 110.

In some example aspects, as shown, an adhesive 240 may be applied to the second lower surface 224 of the planar second base 220. The adhesive 240 can be configured to secure the second layer 200 to the first layer 100, as described in further detail below. In other aspects, the adhesive 240 may instead be applied to the first upper surface 122 (shown in FIG. 1) of the planar first base 120 (shown in FIG. 1). In the present aspect, a thin film or layer of the adhesive 240 can be applied to the second lower surface 224; in other aspects, however, a substantially thick film or layer of the adhesive 240 may be applied. According to example aspects, the adhesive 240 can comprise a starch material, which can be repulpable in some aspects. For example, the adhesive 240 can be a thin film of a starch paste 242. In other aspects, the adhesive 240 can be any other suitable adhesive, including but not limited to, plastic adhesives, tape, and the like. As shown, in the present aspect, the adhesive 240 is applied to the second lower surface 224 only though in other aspects, the adhesive 240 may also be applied within the second sockets 230. Furthermore, while the adhesive 240 is depicted herein as covering only select portions of the second lower surface 224 of the planar second base 220, in other aspects, the adhesive 240 may substantially or entirely cover the second lower surface 224.

Figure 3:
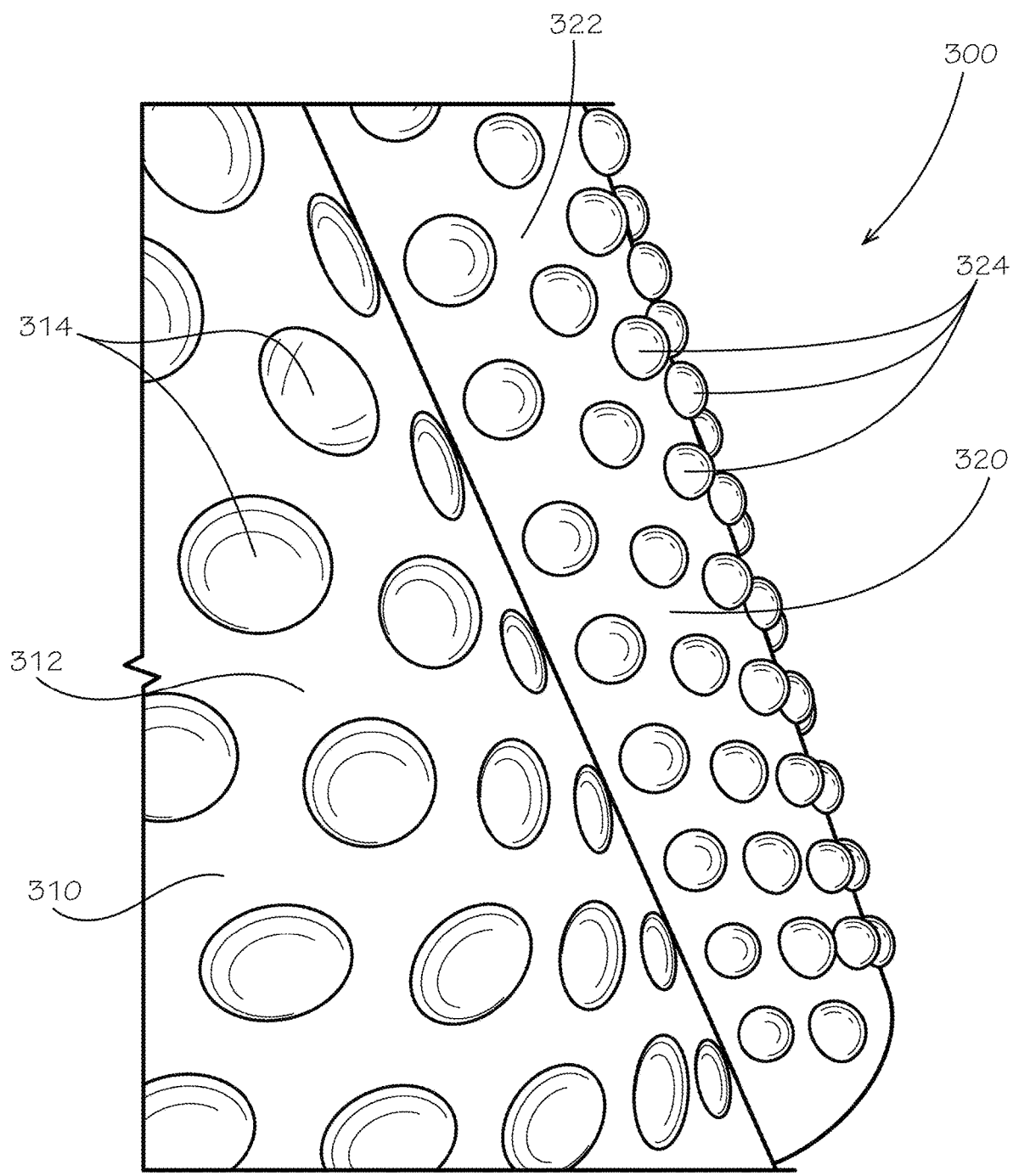
FIG. 3 is a top perspective view of a layer rolling device or forming the first paper layer of FIG. 1 and the second paper layer of FIG. 2.

FIG. 3 illustrates a layer rolling device 300 for forming the first and second sockets 130,230 of the first and second layers 100,200 (shown in FIGS. 1 and 2, respectively). As shown, the layer rolling device 300 can comprise a first layer roller 310 and a second layer roller 320. Each of the first and second layer rollers 310,320 can be substantially cylindrical in shape and can define a cylindrical outer surface 312,322, respectively. The first layer roller 310 can define a plurality of semi-spherical socket indentations 314 formed in the corresponding cylindrical outer surface 312, each of which can be substantially uniform in size and shape. The second layer roller 320 can define a plurality of semi-spherical socket projections 324 extending from the corresponding cylindrical outer surface 322, each of which can be substantially uniform in size and shape, and which can be configured to fit within a corresponding one of the socket indentations 314. According to example aspects, the first layer roller 310 and second layer roller 320 can be configured to rotate in unison, as each of the first layer 100 and second layer 200 are fed through the layer rolling device 300 between the first and second layer rollers 310,320. Prior to passing through the layer rolling device 300, each of the first and second layers 100,200 can be substantially planar. In some aspects, the first and second sockets 130,230 of the first and second layers 100,200 can be formed simultaneously by feeding the first and second layers 100,200 through the layer rolling device 300 at the same time, one on top of the other. However, in other aspects, such as the present aspect, the first layer 100 can be formed first, followed by the second layer 200, or vice versa.

In example aspects, each of the socket indentations 314 of the first layer roller 310 can be configured to align with a corresponding one of the socket projections 324 of the second layer roller 320 as the first and second layer rollers 310,320 confront one another during rolling. Each of the socket projections 324 can be configured to push a corresponding portion of the first layer 100 and second layer 200 into the corresponding one of the socket indentations 314 to form the first sockets 130 and second sockets 230, respectively. As such, each of the socket indentations 314 can be sized and shaped about equal to the first and second sockets 130,230, and each of the socket projections 324 can be sized and shaped about equal to the first and second recesses 132,232 (shown in FIGS. 1 and 2, respectively). Furthermore, as the first and second layers 100,200 are fed through the layer rolling device 300, the portions of the cylindrical outer surfaces 312,322 of the first and second layer rollers 310,320 extending between the socket indentations 314 can press the planar first base 120 and planar second base 220 (shown in FIGS. 1 and 2, respectively) therebetween to maintain the flat, planar shape thereof.

Figure 4:
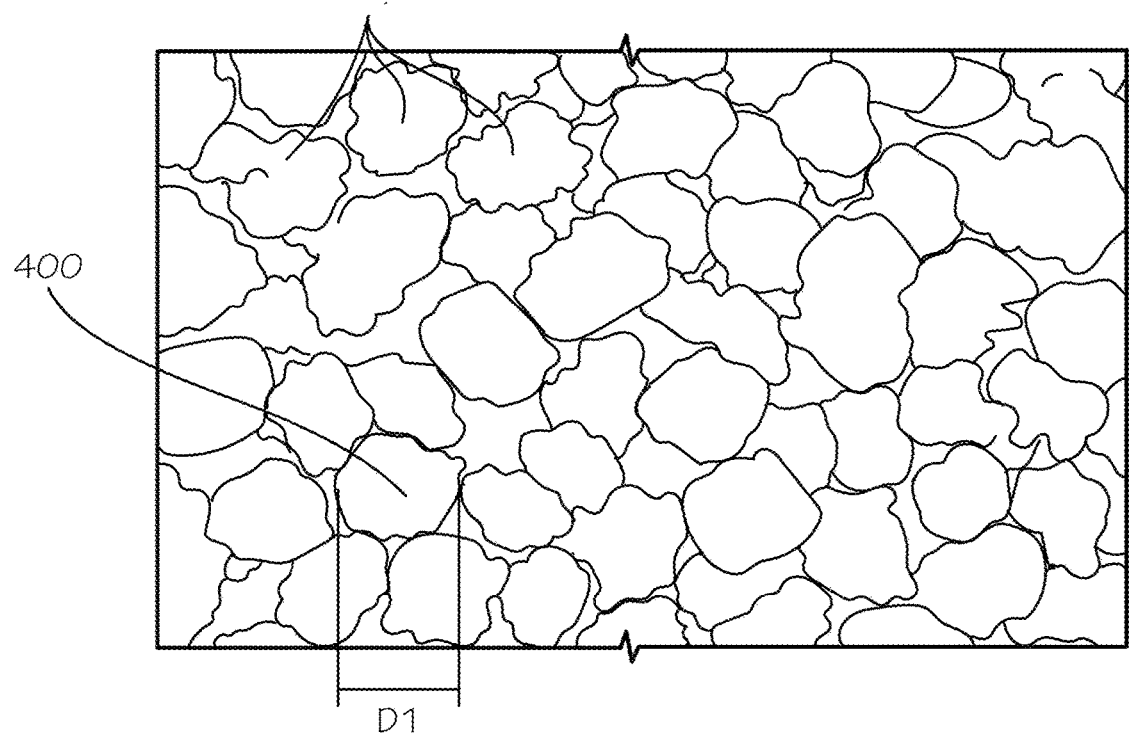
FIG. 4 is a top view of a plurality of spherical cushioning inserts, in accordance with another example aspect of the present disclosure.

FIG. 4 illustrates a plurality of cushioning inserts 400 configured to be received between the first and second layers 100,200 (shown in FIGS. 1 and 2, respectively), as described in further detail below. In the present aspect, each of the cushioning inserts 400 can define a substantially spherical shape, as shown. Moreover, in the present aspect, each of the cushioning inserts 400 can comprise a starch material, such that the cushioning inserts 400 can be starch cushioning inserts 410. For example, the starch material can comprise corn starch in some aspects. In other aspects, the cushioning inserts 400 may define any other suitable shape and/or may comprise any other suitable starch material or other material known in the art. The cushioning inserts 410 can further be repulpable in some aspects. According to example aspects, the cushioning inserts 400 can be formed by an extrusion process, followed by a chopping process. In some example aspects, in the extrusion process, the corn starch material can be extruded through a chamber with a small amount of moisture. The moisture can vaporize under heat during the extrusion, and an elongated, continuous tube of corn starch material can be formed. In the chopping process, a cutter can cut the tube of corn starch material into short segments, each of which can puff up and harden and cool into a substantially spherical shape. In the present aspect, each of the spherical cushioning inserts 400 can define a diameter $D_1$ of about 0.375 inches. However, in other aspects, the cushioning inserts 400 can define any other suitable size and shape and/or can be formed by any other suitable processes known in the art.

Figure 5:
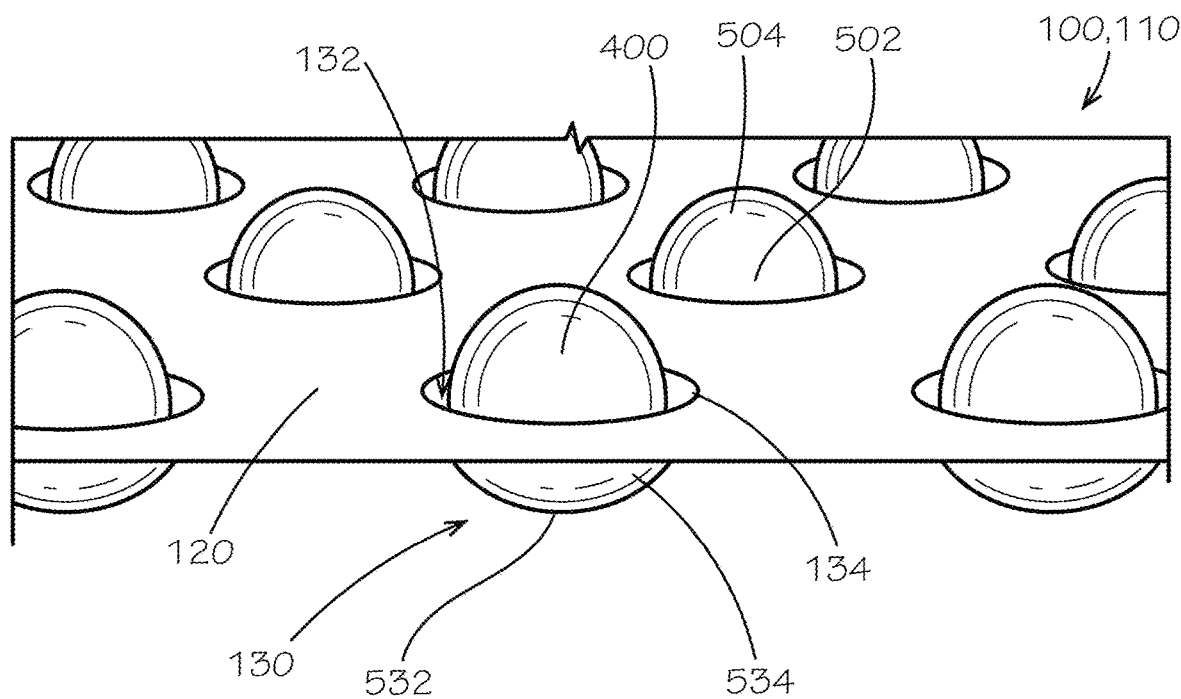
FIG. 5 is a top perspective view of the spherical cushioning inserts of FIG. 4 applied to the first paper layer of FIG. 1.
Figure 7:
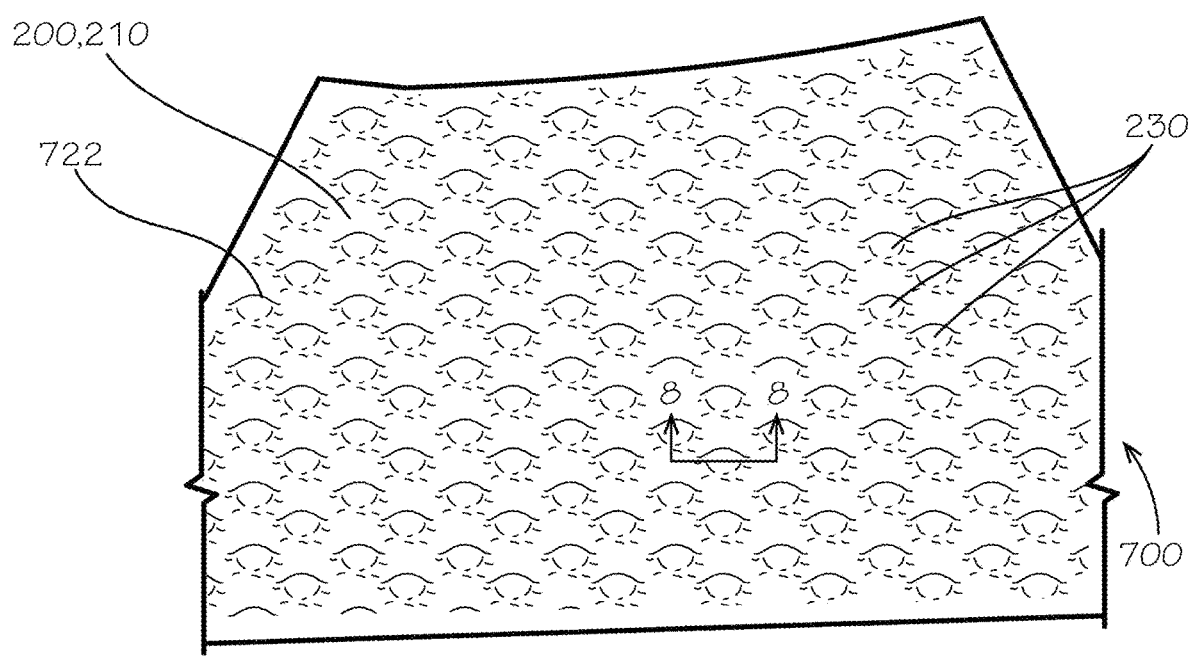
FIG. 7 is a top perspective view of the second paper layer of FIG. 2 laid over the first paper layer 1 of FIG. 1, such that the spherical cushioning inserts of FIG. 4 are received between the first and second paper layers. The first paper layer, second paper layer, and spherical cushioning inserts can together define a cushioning sheet, in accordance with another aspect of the present disclosure.

FIG. 5 illustrates a first step in assembling the cushioning sheet 700 of FIG. 7. As shown, each of the spherical cushioning inserts 400 can be placed into a corresponding one of the semi-spherical first sockets 130 of the first paper layer 110, such that each of the spherical cushioning inserts 400 is partially received within a corresponding one of the semi-spherical first recesses 132 and can rest on a bottom 532 of the first socket 130. For example, a lower portion 502 of each spherical cushioning insert 400 can be received within the corresponding first recess 132, while an upper portion 504 of the spherical cushioning insert 400 can extend past the corresponding first opening 134 to be oriented outside of the first recess 132. In the present aspect, the spherical cushioning inserts 400 can be sized such that a clearance is provided between the each of the spherical cushioning inserts 400 and corresponding sides 534 of the semi-spherical first socket 130, as shown. As such, each of the spherical cushioning inserts 400 can be free to roll around within the corresponding semi-spherical first recess 132. In some aspects, however, the clearance defined between the spherical cushioning inserts 400 and the sides 534 of the corresponding semi-spherical first sockets 130 may be reduced such that movement of the cushioning inserts 400 within the corresponding semi-spherical first recesses 132 may be limited or prohibited. Furthermore, in some aspects, the spherical cushioning inserts 400 may be secured to the first paper layer 110 within the corresponding first recesses 132 to limit or prohibit movement therein by a fastener, such as, for example, an adhesive, such as glue. For example, the glue can be PVA (polyvinyl acetate) glue in some aspects.

Figure 6:
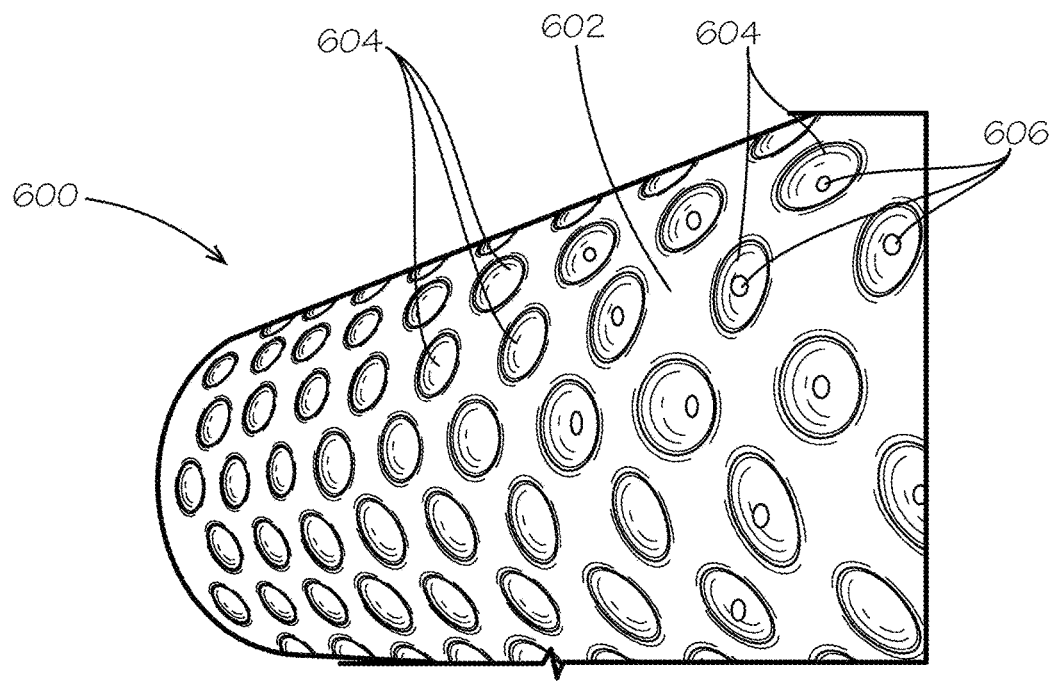
FIG. 6 is a perspective view of a vacuum roller configured to deposit the spherical cushioning inserts of FIG. 4 onto the first paper layer of FIG. 1.

According to example aspects, as shown in FIG. 6, a vacuum roller 600 may be provided for picking up the spherical cushioning inserts 400 (shown in FIG. 4) and depositing them onto the first paper layer 110 (shown in FIG. 1). As shown, in the present aspect, the vacuum roller 600 can define a substantially cylindrical outer surface 602 and a plurality of insert indentations 604 formed therein, each of which can be configured to pick up and retain one of the spherical cushioning inserts 400 therein. For example, each of the insert indentations 604 may comprise a vacuum port 606 configured to draw a corresponding one of the cushioning inserts 400 into the insert indentation 604. Each spherical cushioning insert 400 can then be released from the corresponding insert indention into a corresponding one of the first recesses 132 (shown in FIG. 1) of the first paper layer 110. In other aspects, the spherical cushioning inserts 400 can be deposited into the corresponding first recesses 132 by any other suitable method known in the art. In other aspects, the cushioning inserts 400 can be deposited by the vacuum roller 600 or any other suitable method into the second recesses 232 (shown in FIG. 2) of the second paper layer 210 (shown in FIG. 2), instead of the first paper layer 110.

Figure 8:
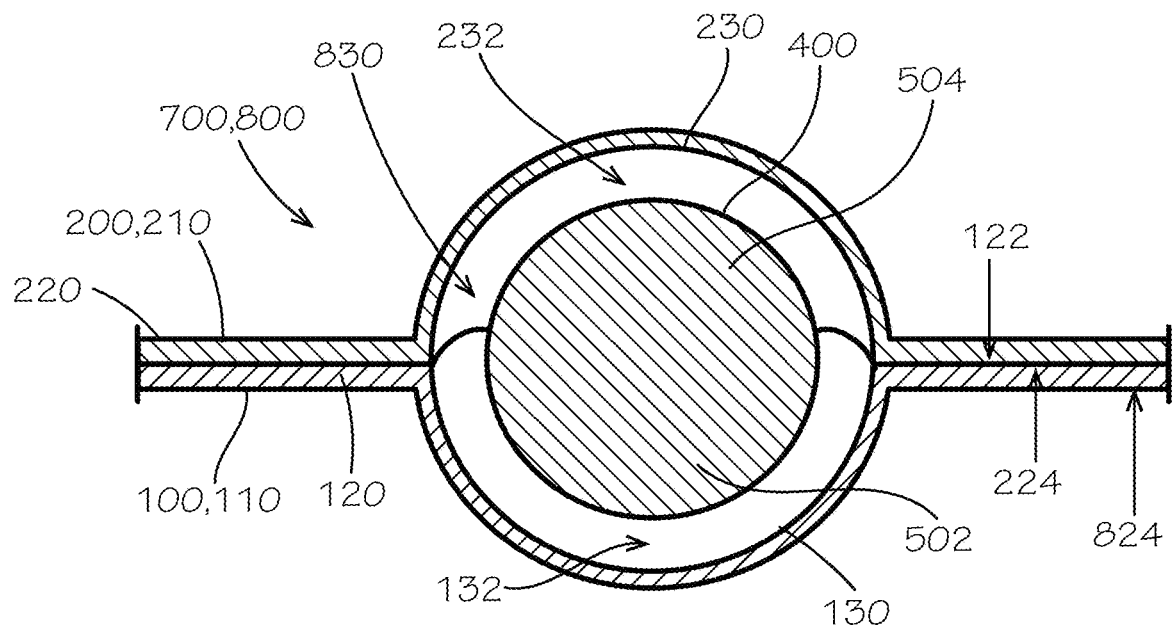
FIG. 8 is a detail cross-sectional view of the cushioning sheet of FIG. 7 taken along line 8-8 in FIG. 7.

FIGS. 7 and 8 illustrate a second step in forming the cushioning sheet 700, wherein the second layer 200 can be laid over the first layer 100 (shown in FIG. 8), or vice versa, with the spherical cushioning inserts 400 (shown in FIG. 8) received therebetween. As such, in the present aspect, the first layer 100 can be a lower layer and the second layer 200 can be an upper layer, relative to the orientations shown. Referring to FIG. 8, the first layer 100, second layer 200, and spherical cushioning inserts 400 can together define the cushioning sheet 700. In the present aspect, the first layer 100 can be the first paper layer 110, the second layer 200 can be the second paper layer 210, and the cushioning sheet 700 can be wrapping paper 800 within which an object can be wrapped for cushioned protection. As shown, the second paper layer 210 can be positioned over the first paper layer 110 such that each of the second sockets 230 of the second paper layer 210 can be aligned with a corresponding one of the first sockets 130 of the first paper layer 110. Each corresponding pair of first and second sockets 130,230 can together define a hollow, substantially spherical void 830 or bubble.

The spherical void 830 can comprise the corresponding semi-spherical first recess 132 and semi-spherical second recess 232, and each of the cushioning inserts 400 can reside between a corresponding pair of first and second sockets 130,230 within the spherical void 830. As shown, the lower portion 502 of the cushioning insert 400 can generally reside within the corresponding first recess 132 and the upper portion 504 of the cushioning insert 400 can generally reside within the corresponding second recess 232. In the present aspect, a diameter of each void 830 can be larger than the diameter $D_1$ (shown in FIG. 4) of the corresponding cushioning insert 400 and each of the cushioning inserts 400 can be received loosely within the void 830, allowing the cushioning insert 400 to move around within the void 830. In other aspects, the size of the voids 830 may be about equal to the size of the cushioning inserts 400 and/or the cushioning inserts 400 may be secured within the void 830 to limit or prohibit movement therein. Other aspects of the cushioning sheet 700 may not comprise the cushioning inserts 400, and the voids 830 can be filled with any other suitable cushioning material. In other aspects, the voids 830 can be filled with air (or any other suitable gas), such that a plurality of cushioning air pockets can be formed between the first and second layers 100,200. In such aspects, the first and second layers 100,200 may comprise a specific paper material that can be configured to limit or prevent the air from leaking out of the voids 830. In some aspects, the first and second layers 100,200 can comprise a stretchy paper material. In some aspects, the first and second layers 100, 200 can be coated in a material configured to limit or prevent the passage of air therethrough. Other aspects of the first and second layers 100 can comprise any suitable material, including paper and non-paper materials, configured to limit or prevent the passage of air therethrough.

As described above, example aspects of the second paper layer 210 can comprise an adhesive 240 (shown in FIG. 2) applied to the second lower surface 224 thereof. The second lower surface 224 of the second paper layer 210 can engage the first upper surface 122 of the first paper layer 110, and the adhesive 240 can join the second lower surface 224 to the first upper surface 122, thereby securing the first and second paper layers 110,210 together. In some aspects, the second step of applying the second paper layer 210 over the first paper layer 110 can be the final step in forming the cushioning sheet 700. However, in other aspects, a third step can comprise passing the cushioning sheet 700 through a sheet rolling device 900 (shown in FIG. 9). As described above, the adhesive 240 can be repulpable in some aspects. In some example aspects, additional components of the cushioning sheet 700, or the entire cushioning sheet 700, can comprise repulpable materials.

Figure 9:
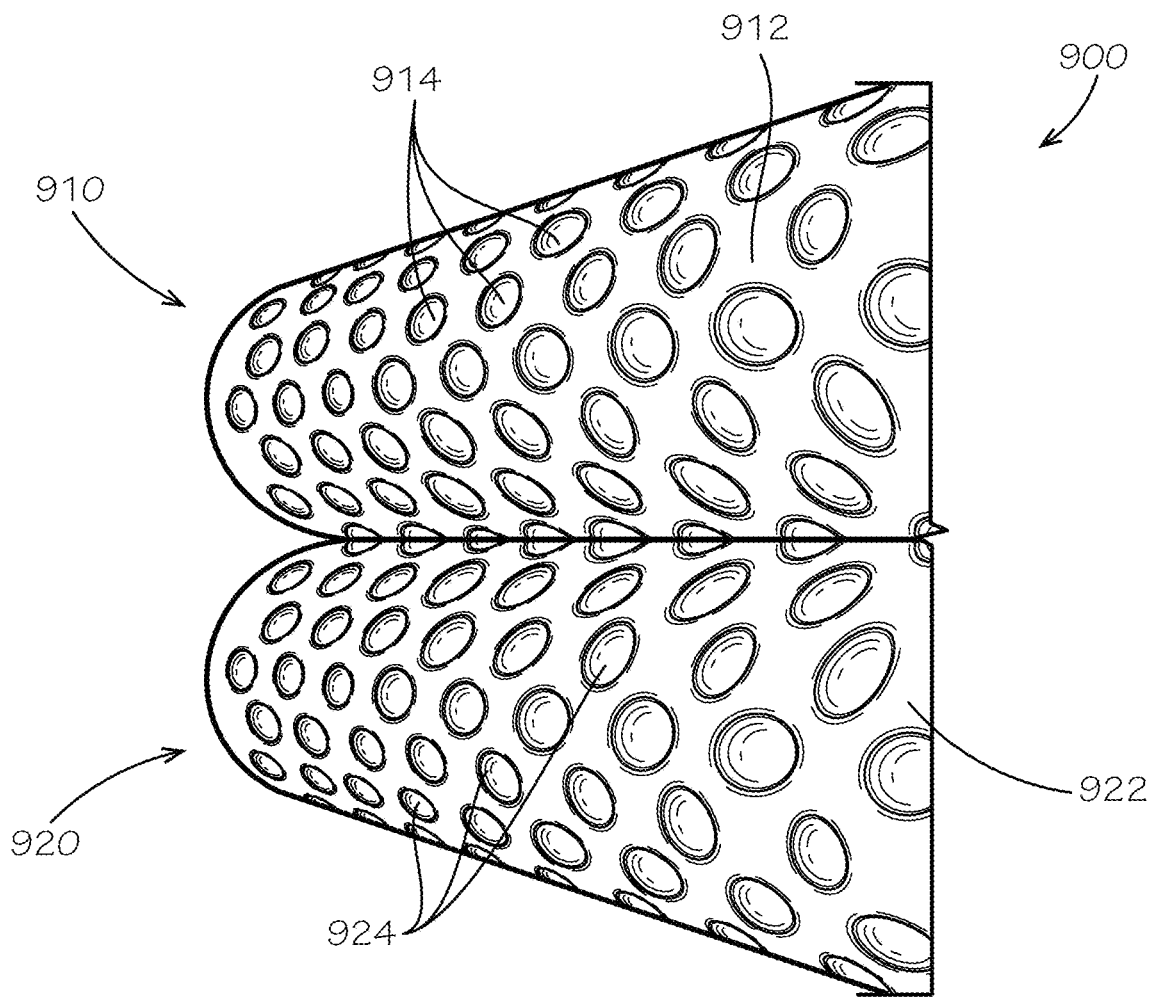
FIG. 9 is a perspective view of sheet rolling device configured to assist in adhering the first paper layer of FIG. 1 to the second paper layer of FIG. 2, in accordance with another aspect of the present disclosure.

FIG. 9 illustrates the sheet rolling device 900, which can be provided for pressing the planar first base 120 of the first paper layer 110 (both 110 and 120 shown in FIG. 1) against the planar second base 220 of the second paper layer 210 (both 210 and 220 shown in FIG. 2) to ensure that the adhesive 240 (e.g., the starch paste 242, both 240 and 242 shown in FIG. 2) secures the first and second paper layers 110,210 to one another. As shown, the sheet rolling device 900 can define a first sheet roller 910 and a second sheet roller 920. Each of the first and second sheet rollers 910,920 can define a cylindrical outer surface 912,922, respectively and a plurality of semi-spherical indentations 914,924, respectively, which can be sized about equal to or greater than each of the first and second sockets 130,230. The first and second sheet rollers 910,920 can be configured to rotate in unison, as the cushioning sheet 700 (e.g., the wrapping paper 800), both shown in FIG. 8, is fed through the sheet rolling device 900 between the first and second sheet rollers 910,920. According to example aspects, each of the indentations 914 of the first sheet roller 910 can be configured to align with a corresponding one of the indentations 924 of the second sheet roller 920 as the first and second sheet rollers 910,920 confront one another during rolling. As the cushioning sheet 700 is fed through the sheet rolling device 900, each of the first sockets 130 (shown in FIG. 1) of the first paper layer 110 can align with and extend into a corresponding one of the indentations 914 of the first sheet roller 910, and similarly, each of the second sockets 230 (shown in FIG. 2) of the second paper layer 210 can align with and extend into a corresponding one of the indentations 924 of the second sheet roller 920. In this way, each of the semi-spherical first and second sockets 130,230, as well as the spherical voids 830 (shown in FIG. 8) formed by the first and second sockets 130,230, can maintain their shapes as the cushioning sheet 700 is passed through the sheet rolling device 900.

Figure 10:
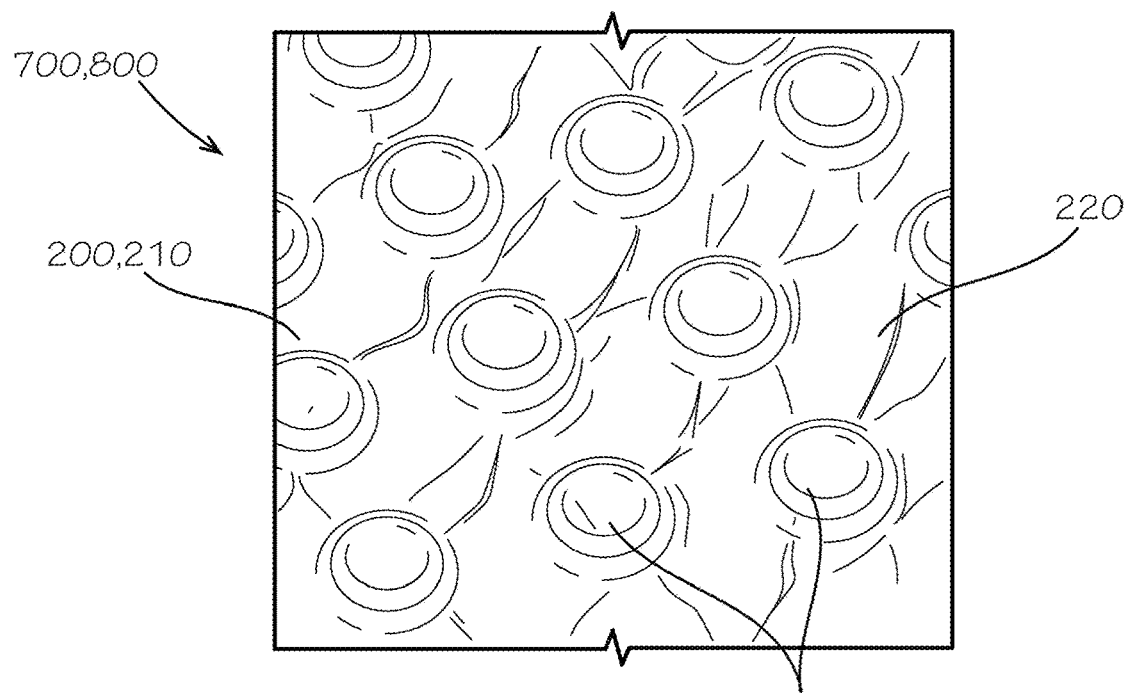
FIG. 10 is a top view of the cushioning sheet of FIG. 7 after going through the sheet rolling device of FIG. 9.
Figure 11:
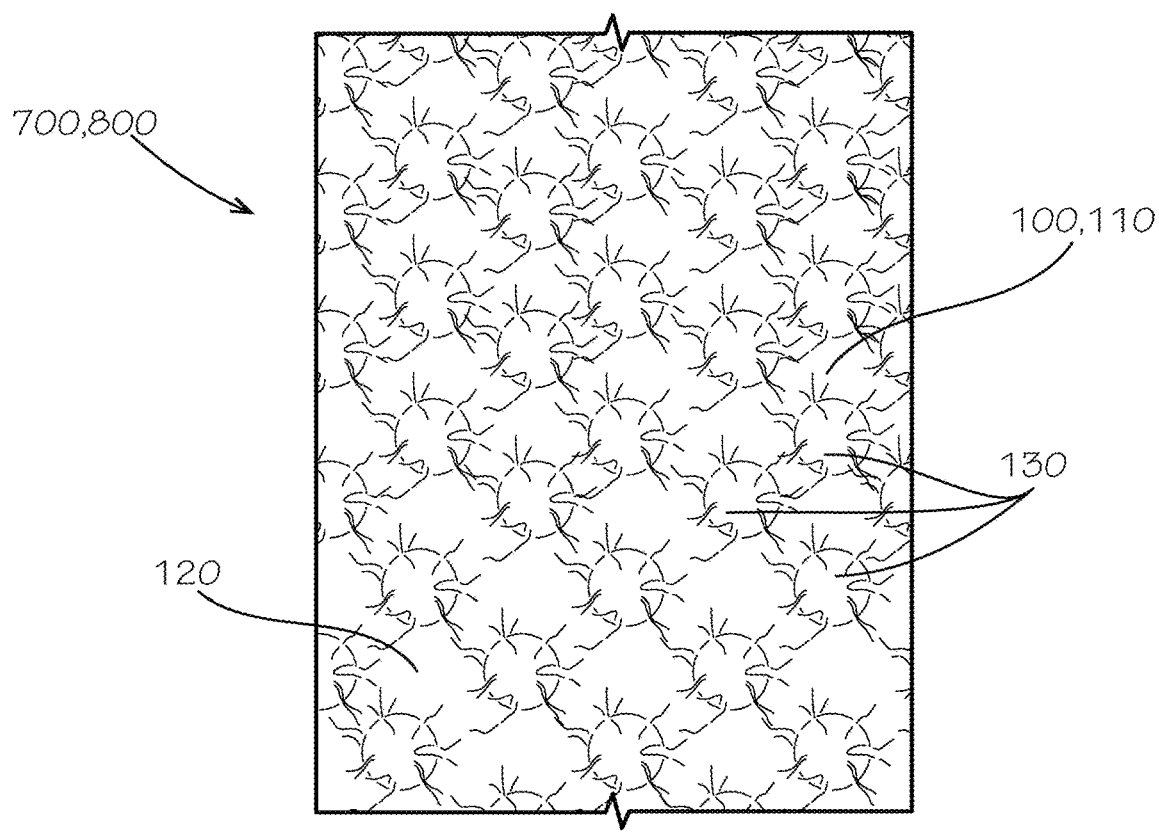
FIG. 11 is a bottom view of the cushioning sheet of FIG. 7 after going through the sheet rolling device of FIG. 9.

Furthermore, as the cushioning sheet 700 is fed through the sheet rolling device 900, the portions of cylindrical outer surfaces 912,922 of the first and second sheet rollers 910, 920 extending between the indentations 914,924 can be configured to contact the planar first and second bases 120,220 of the first and second paper layers 110,210, respectively. The first and second sheet rollers 910,920 can press the first upper surface 122 (shown in FIG. 1) of the first paper layer 110 against the second lower surface 224 (shown in FIG. 2) of the second paper layer 210, such that the adhesive 240 applied to the second lower surface 224 firmly engages the first upper surface 122, thereby further securing the first and second paper layers 110,210 together. As described above, in some aspects, a substantially thin film or layer of the adhesive 240 can be applied to the second lower surface 224. However, in some aspects, the film or layer of adhesive 240 can be thick enough such that some of the adhesive 240 may be pressed into some or all of the voids 830, forming an adhesive ring around the corresponding cushioning insert 400 (shown in FIG. 4) therein, which can aid in holding the cushioning insert 400 in place within the void 830 and/or which may increase the strength and/or cushioning ability of the cushioning sheet 700 in some aspects. FIG. 10 illustrates a top view of the cushioning sheet 700 after being passed through the sheet rolling device 900 (shown in FIG. 9) to ensure the first base 120 (shown in FIG. 1) of the first paper layer 110 (shown in FIG. 1) is adequately secured to the second base 120 of the second paper layer 210, and FIG. 11 illustrates a bottom view of the cushioning sheet 700 after passing through the sheet rolling device 900.

Figure 12:
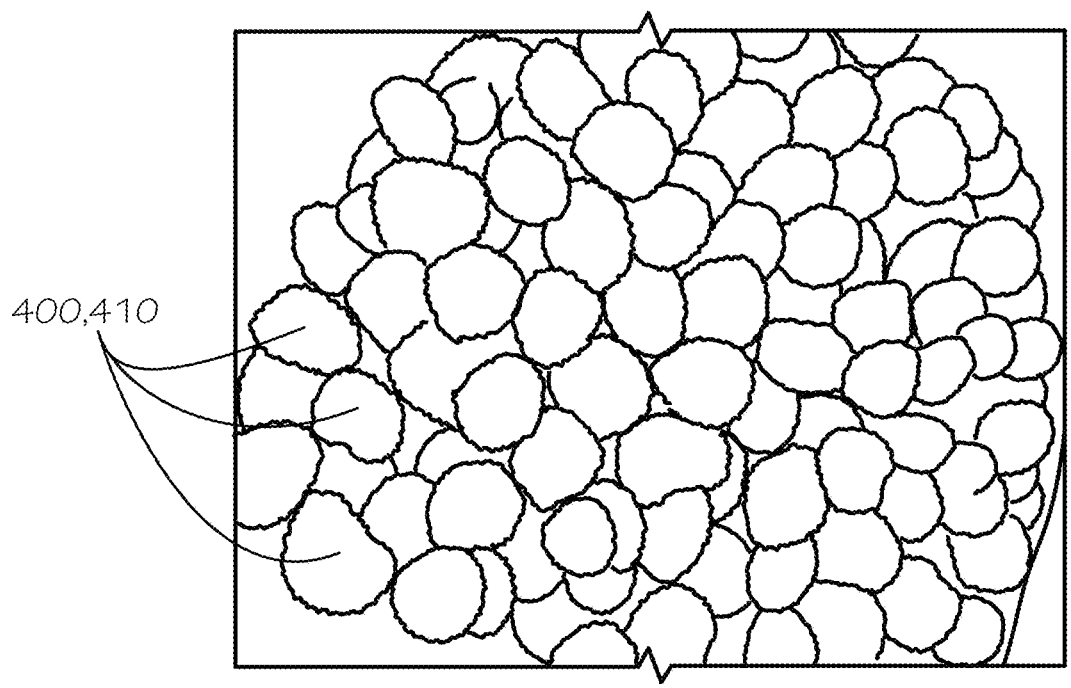
FIG. 12 is a top view of the spherical cushioning inserts, in accordance with another example aspect of the present disclosure.
Figure 13:
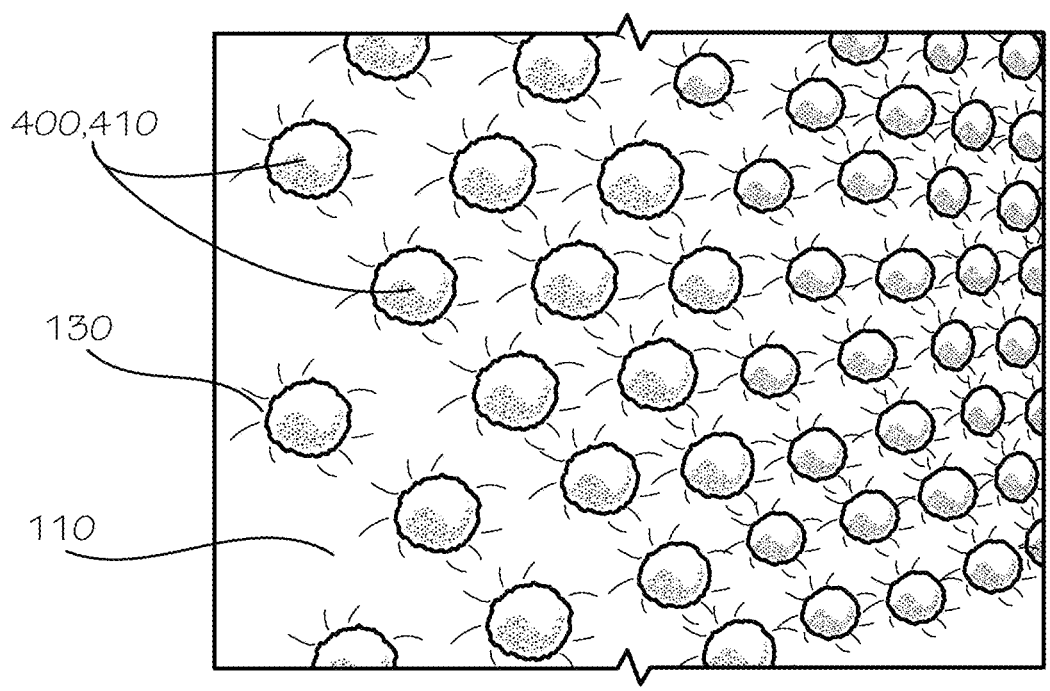
FIG. 13 is a top perspective view of the spherical cushioning inserts of FIG. 12 applied to the first paper layer, in accordance with another example aspect of the present disclosure.

FIG. 12 illustrates the cushioning inserts 400 according to another example aspect of the present disclosure, wherein the cushioning inserts 400 again define a substantially spherical shape. In the present aspect, the spherical shape of the cushioning inserts 400 is even more defined that the substantially spherical cushioning inserts shown in FIG. 4. Furthermore, in the present aspect, the cushioning inserts 400 can be the starch cushioning inserts 410. FIG. 13 illustrates each of the cushioning inserts 400 of FIG. 12 placed into a corresponding one of the semi-spherical first sockets 130 of the first paper layer 110.

Figure 14:
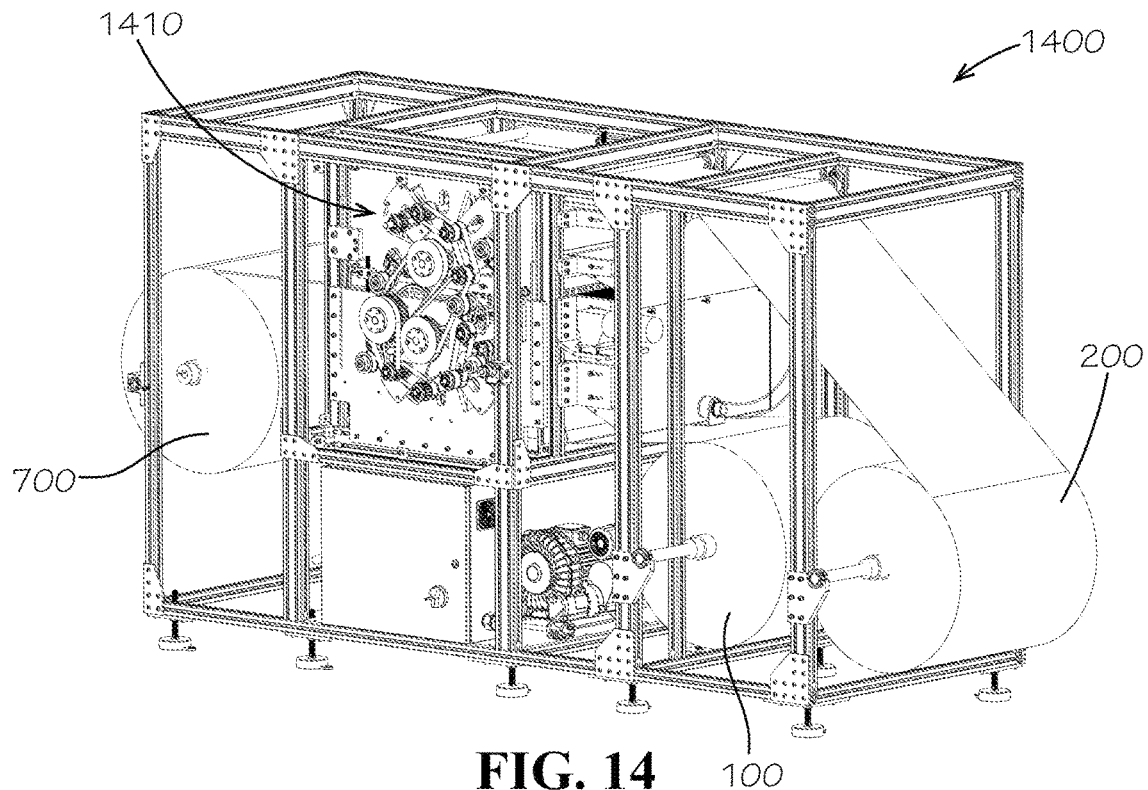
FIG. 14 is rear perspective view of a rolling machine for forming the cushioning sheet of FIG. 7, in accordance with another example aspect of the present disclosure.
Figure 15A:
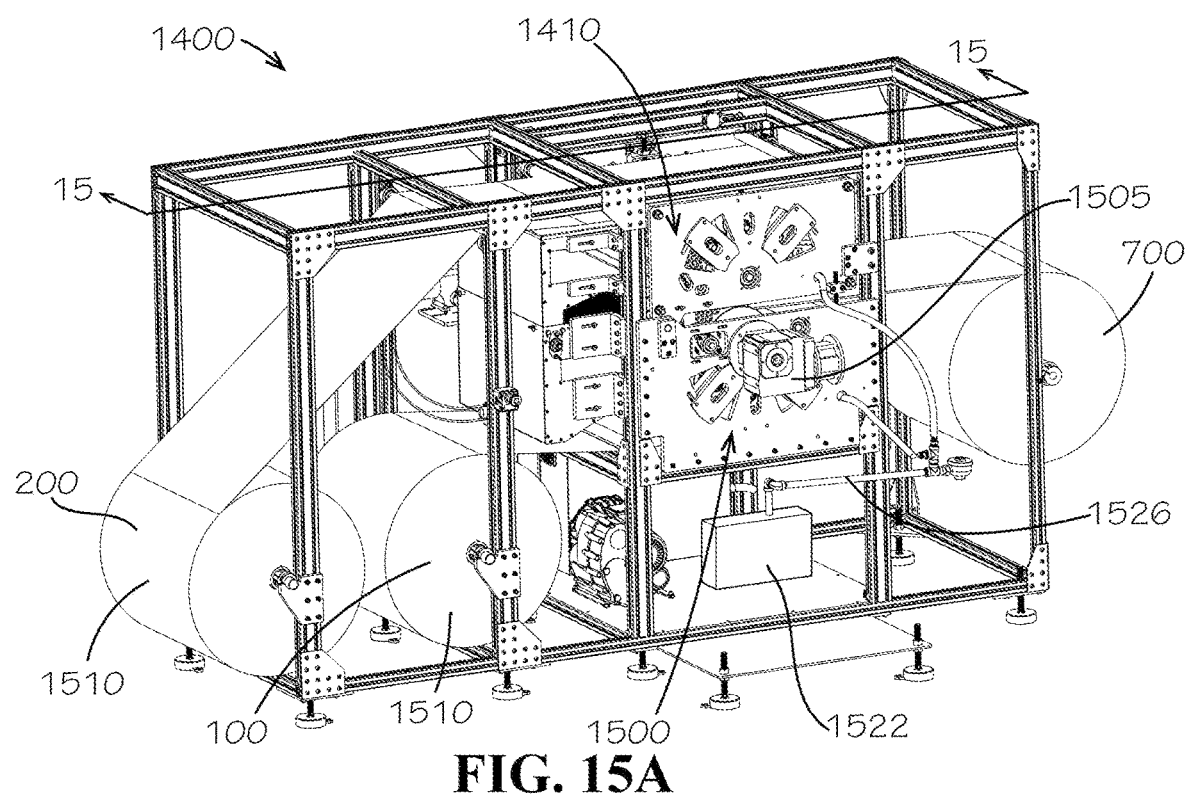
FIG. 15A is a front perspective view of the rolling machine of FIG. 14.
Figure 15B:
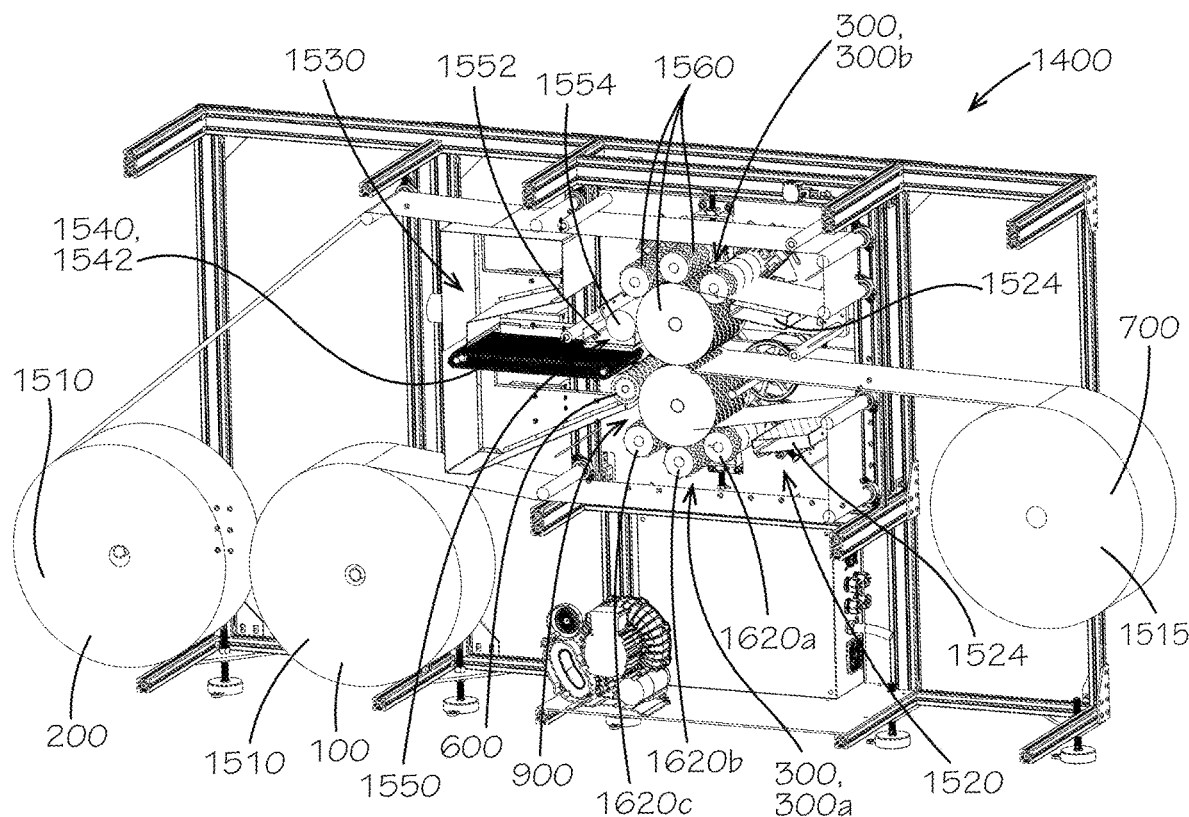
FIG. 15B is a cross-sectional view of the rolling machine of FIG. 14 taken along line 15-15 in FIG. 15A.

FIGS. 14 and 15A-B illustrate the rolling machine 1400, according to an example aspect of the present disclosure, for forming the cushioning sheet 700. FIG. 14 illustrates a rear perspective view of the rolling machine 1400, FIG. 15A illustrates a front perspective view of the rolling machine 1400, and FIG. 15B illustrates a cross-sectional view of the rolling machine 1400 taken along line 15-15 in FIG. 15A. Example aspects of the rolling machine 1400 can comprise a roller assembly 1410, which can comprise a plurality of rollers 1560 (shown in FIG. 15B). In the present aspect, the roller assembly 1410 can comprise two of the layer rolling devices 300 (shown in FIG. 15B) for simultaneously forming the first and second sockets 130,230 (shown in FIGS. 1 and 2, respectively) in the first and second layers 100,200, respectively. Other aspects of the rolling machine 1400 can comprise only one of the layer rolling devices 300, which can form the first and second sockets 130,230 in the first and second layers 100,200 either simultaneously or consecutively. The roller assembly 1410 of the rolling machine 1400 can further comprise the sheet rolling device 900 (shown in FIG. 15B) for sealing the first layer 100 to the second layer 200 with the cushioning inserts 400 (shown in FIG. 4) received therebetween. Referring to FIG. 15A, a drive system 1500 can be provided for driving the movement of the roller assembly 1410 during production of the cushioning sheet 700. As shown, example aspects of the drive system 1500 can comprise one or more motors 1505 configured to impart rotational movement to the various rollers 1560 (shown in FIG. 15B) of the roller assembly 1410, as described in further detail below.

According to example aspects, each of the first and second layers 100,200 can be formed as a roll of raw material 1510 (e.g., a roll of paper, as shown) prior to being passed through the rolling machine 1400. Referring to FIG. 15B, the rolling machine 1400 can comprise the two layer rolling devices 300—for example, a first layer rolling device 300a and a second layer rolling device 300b. In some aspects, the rolling machine 1400 can comprise one or more steam units 1520 configured to steam the first and second layers 100,200 prior to passage through the corresponding layer rolling devices 300. Steaming the first and second layers 100,200 can soften the paper material, which can allow the paper material to stretch without tearing during formation of the first and second sockets 130,230 (shown in FIGS. 1 and 2, respectively). Example aspects of the steam unit 1520 can comprise a water tank 1522 (shown in FIG. 15A), one or more steam pans 1524, and one or more conduits 1526 (shown in FIG. 15A) for transferring water from the water tank 1522 to the steam pans 1524. The steam pans 1524 can be configured to heat the water received from the water tank 1522 to produce steam. In example aspects, as shown, each of the first and second layers 100,200 can pass over a corresponding one of the steam pans 1524 before being fed into the corresponding layer rolling device 300. The layer rolling devices 300 can then form the first and second sockets 130,230 in the first and second layers 100,200, as described above. In some aspects, one or both the steam units 1520 can be turned off or left unused when it is desired to cold set the first and/or second layers 100,200. Other aspects of the rolling machine 1400 may not comprise the steam units 1520 or the steam units 1520 can be removed as desired. Furthermore, in example aspects, the layer rolling devices 300 can be used to form the first and second sockets 130,230 in the corresponding first and second layers 100, 200, and the first and second layers 100,200 can then be removed from the rolling machine 1400 and used as textured sheets 51110 (shown in FIG. 51) of material (e.g., a textured paper sheets). In some aspects, only one of the layer rolling devices 300 may be used or provided for forming a textured sheet 51110 from the first layer 100 and/or second layer 200.

Once the first sockets 130 have been formed in the first layer 100 by the corresponding first layer rolling device 300a, the cushioning inserts 400 (shown in FIG. 4) can be positioned within the first sockets 130. Example aspects of the rolling machine 1400 can comprise the vacuum roller 600 for picking up the cushioning inserts 400 from a hopper 1530 or other repository and depositing them onto the first upper surface 122 (shown in FIG. 1) of the first layer 100. Some aspects of the rolling machine 1400 can also comprise a vibration mechanism 1540 configured to vibrate each of cushioning inserts 400 into a corresponding one of the insert indentations 604 (shown in FIG. 6) of the vacuum roller 600. For example, in the present aspect, the vibration mechanism 1540 can comprise a vibrating conveyor belt 1542. The cushioning inserts 400 can be fed from the hopper 1530 onto the vibrating conveyor belt 1542, which can agitate the cushioning inserts 400 thereon. The agitated cushioning inserts 400 can be transported along the conveyor belt 1542 and can be deposited onto the vacuum roller 600. The movement of the cushioning inserts 400 caused by the vibrating conveyor belt 1542 can aid in locating the cushioning inserts 400 within the insert indentations 604. For example, the agitated cushioning inserts 400 can slide, roll, or otherwise move across the cylindrical outer surface 602 (shown in FIG. 6) of the vacuum roller 600 until dropping into a corresponding one of the insert indentations 604. The cushioning inserts 400 can be retained within the corresponding insert indentations 604 of the vacuum roller 600 by suction provided through the corresponding vacuum port 606 (shown in FIG. 6).

Additionally, once the second sockets 230 have been formed in the second layer 200 by the corresponding second layer rolling device 300b, the adhesive 240 (shown in FIG. 2) can be applied to the second lower surface 224 (shown in FIG. 2) of the second layer 200. According to example aspects, the rolling machine 1400 can comprise an adhesive applicator 1550 configured to apply the adhesive 240 to the second lower surface 224. In the present aspect, the adhesive applicator 1550 can comprise an adhesive pan 1552 and an adhesive roller 1554. A pool of the adhesive 240 can be received in the adhesive pan 1552, and the adhesive roller 1554 can be continuously dipped into the pool of the adhesive 240 as the adhesive roller 1554 rotates, thereby continuously applying the adhesive 240 to the adhesive roller 1554. After dipping into the pool of the adhesive 240, the adhesive roller 1554 can rotate into contact with the second layer 200 to continuously apply the adhesive 240 to the second lower surface 224 thereof. An example aspect of the adhesive applicator 1550 is shown and described in further detail below with respect to FIG. 15C.

Once the cushioning inserts 400 have been deposited on the first layer 100 and the adhesive 240 has been applied to the second layer 200, each of the first and second layers 100,200 can be simultaneously passed through the sheet rolling device 900 in facing contact with one another. As described above, when passing the first and second layers 100,200 through the sheet rolling device 900, each of the first sockets 130 of the first layer 100 can be aligned with a corresponding one of the second sockets 230 of the second layer 200 to define the substantially spherical void 830 (shown in FIG. 8) therebetween. Each of the cushioning inserts 400 can be positioned within a corresponding one of the voids 830, and the sheet rolling device 900 can adhere the first layer 100 to the second layer 200 to retain the cushioning inserts 400 within the corresponding voids 830. The cushioning sheet 700 can then exit the sheet rolling device 900, and in the present aspect, the cushioning sheet 700 can be wrapped around itself to define a finished roll 1515 of the cushioning sheet 700.

Figure 15C:
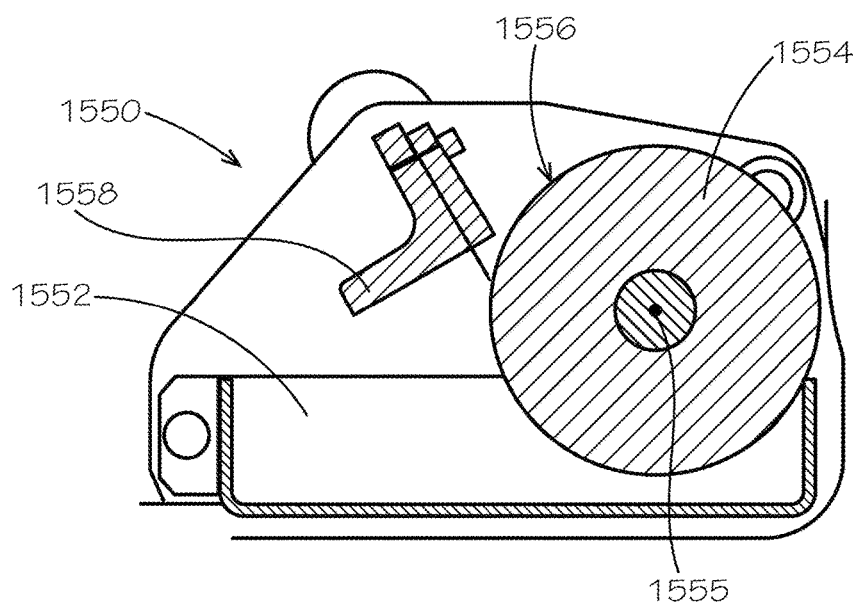
FIG. 15C is a cross-sectional view of an adhesive applicator of the rolling machine of FIG. 14.

FIG. 15C illustrates a cross-sectional view of the adhesive applicator 1550. As shown, the adhesive applicator 1550 can comprise the adhesive pan 1552 within which a pool of the adhesive 240 (shown in FIG. 2) can be received. The adhesive roller 1554 can be configured to rotate about a roller axis 1555 (going into the page) proximate to the adhesive pan 1552, such that an outer roller surface 1556 of the adhesive roller 1554 can be continuously rotated into the pool of glue. The adhesive roller 1554 can further be continuously rotated into contact with the second layer 200 (shown in FIG. 14) to apply the adhesive 240 thereto. For example, as a first portion of the outer roller surface 1556 rotates out of the pool of the adhesive 240 with the adhesive 240 applied thereto, the first portion can rotate into contact with the second layer 200. Specifically, the first portion of the adhesive roller 1554 can rotate into contact with the second lower surface 224 (shown in FIG. 2) of the second layer 200 as the second layer 200 moves through the roller assembly 1410 (shown in FIG. 14) towards the sheet rolling device 900 (shown in FIG. 15B), depositing the adhesive 240 on the second lower surface 224. Furthermore, in some aspects, the adhesive applicator 1550 can further comprise a doctor blade 1558 configured to remove any excess adhesive 240 from the adhesive roller 1554 after application of the adhesive 240 to the second layer 200. For example, after the first portion of the adhesive roller 1554 has applied the adhesive to the second layer 200, the first portion can be rotated into contact with the doctor blade 1558, which can scrape the outer roller surface 1556 to remove any excess adhesive 240 thereon prior to re-dipping the first portion into the pool of adhesive 240.

Figure 16:
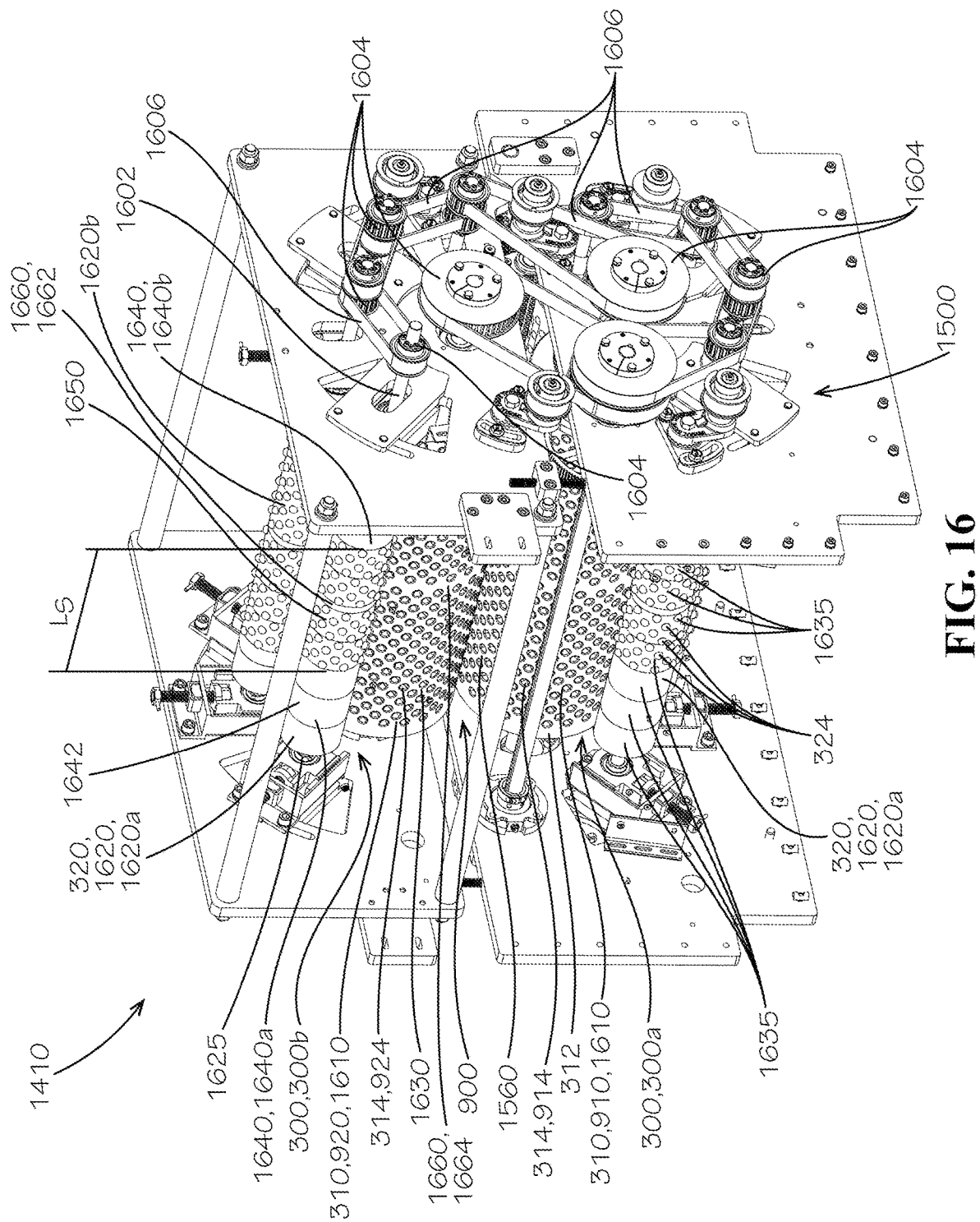
FIG. 16 is a detail perspective view of a roller assembly of the rolling machine of FIG. 14.

FIG. 16 illustrates a detail view of a roller assembly 1410 of the rolling machine 1400 (shown in FIG. 14), in accordance with an example aspect of the present disclosure. The roller assembly 1410 can comprise the pair of the layer rolling devices 300 and the sheet rolling device 900. The layer rolling devices 300 and the sheet rolling device 900 can be operably connected to one another by the drive system 1500, such that the various rollers 1560 thereof can rotate in unison. As described above, the drive system 1500 can comprise the motor 1505 (shown in FIG. 15A). Furthermore, in the present aspect, each of the rollers 1560 can comprise a rotating axle 1602, and the motor 1505 can be configured to directly drive one of the rotating axles 1602. For example, in the present aspect, the motor 1505 can directly drive the rotating axle 1602 of the first layer roller 310 of the first layer rolling device 300a. Example aspects of the drive system 1500 can further comprise a wheel 1604 or sprocket mounted on each of the rotating axles 1602, and the wheels 1604 or sprockets can be interconnected by one or more straps 1606 or chains to transmit rotational motion between the rollers 1560.

According to example aspects, each of the layer rolling devices 300 can comprise one or more of the first layer rollers 310 defining the socket indentations 314, which can be considered female rollers 1610. Each of the layer rolling devices 300 can further comprise one or more of the second layer rollers 320 defining the socket projections 324, which can be considered male rollers 1620. For example, in the present aspect, each layer rolling device 300 can comprise three small male rollers 1620a,b,c (1620c shown in FIG. 15B) oriented in series and configured to engage one large female roller 1610. Other aspects of the layer rolling devices 300 can comprise more female rollers 1610 and/or more or fewer male rollers 1620. The male rollers 1620 and female roller 1610 of each layer rolling device 300 can be interconnected by the drive system 1500 as described above and can rotate concurrently as the corresponding first and second layers 100,200 (shown in FIG. 14) are fed therethrough. As described above, each of the socket projections 324 of the male rollers 1620 can be configured to align with a corresponding one of the socket indentations 314 of the corresponding female roller 1610 as the female and male rollers 1610,1620 confront one another during rotation. Each of the socket projections 324 can be configured to push a portion of the corresponding first layer 100 or second layer 200 into the corresponding socket indentation 314 to form the first and second sockets 130,230 (shown in FIGS. 1 and 2), respectively.

In some aspects, some or all of the female and male rollers 1610,1620 can be formed from a singular cylindrical structure 1630 extending from a first end 1625 of the corresponding roller 1560 to an opposite second end (not shown) of the corresponding roller 1560. A length of the roller can be defined between the first end 1625 and the opposite second end. In some aspects, some or all of the female and male rollers 1610,1620 can be formed from a plurality of cylindrical collars 1635 stacked laterally between the corresponding first end 1625 and the second end. Rollers 1560 comprising the collars 1635 can allow for selective adjustment of the length of the roller 1560 by adding or removing collars 1635. Furthermore, according to example aspects, each of the collars 1635 can be either a smooth collar 1640 defining a substantially smooth outer collar surface 1642 or a socket collar 1650 defining a plurality of the socket projections 324 or the socket indentations 314. For example, in the present aspect, each of the female rollers 1610 can define the singular cylindrical structure 1630, while each of the male rollers 1620 can define a plurality of the collars 1635. As shown, each of the male rollers 1620a,b can comprise one or more first smooth collars 1640a proximate to the corresponding first end 1625 and one or more second smooth collars 1640b proximate to the corresponding second end. Each of the male rollers 1620a,b can further comprise one or more of the socket collars 1650 defining the socket projections 324 oriented centrally between the first and second smooth collars 1640a,b. The male roller 1620c (shown in FIG. 15B) can comprise the socket collars 1650 extending from the first end 1625 to the second end, and does not comprise any of the smooth collars 1640 in the present aspect. In other aspects, however, the male roller 1620c may comprise the smooth collars 1640.

According to example aspects, any of the rollers 1560 and/or collars 1635 can be selectively removed and replaced with rollers 1560 and/or collars 1635 having varying patterns, varying sizes, and/or other varying features. In one example, the rollers 1560 and/or collars 1635 can be replaced with rollers 1560 and/or collars 1635 defining larger or smaller socket indentations 314 and/or socket projections 324. In another example, the rollers 1560 and/or collars 1635 can be replaced with rollers 1560 and/or collars 1635 defining socket indentations 314 and/or socket projections 324 defining an alternative shape (e.g., cuboidal instead of semi-spherical). In another example, some or all of the smooth collars 1640 can be replaced with socket collars 1650 as desired, or vice versa.

According to example aspects, each of the female and male rollers 1610,1620 can be about equal in length. In other aspects, some or all of the female and male rollers 1610, 1620 can define varying lengths. Additionally, as shown, each of the smooth collars 1640 can be about equal in size, and each of the socket collars 1650 can be about equal in size. In other aspects, the smooth collars 1640 and/or socket collars 1650 can define varying sizes. In the present aspect, the male rollers 1620b can define more of the socket collars 1650 and fewer of the smooth collars 1640 than the male rollers 1620a. Similarly, the male rollers 1620c (shown in FIG. 15B) can define more of the socket collars 1650 and fewer of the smooth collars 1640 than the male rollers 1620b. As such, a length $L_s$ of the stack of socket collars 1650 of the male rollers 1620a can be less than the length $L_s$ of the stack of socket collars 1650 of the male rollers 1620b, and the length $L_s$ of the stack of socket collars 1650 of the male rollers 1620b can be less than the length $L_s$ of the stack of socket collars 1650 of the male rollers 1620c. As described above, each of the collars 1635 can be selectively removed and replaced, and thus, the length $L_s$ can be selectively adjusted. Additionally, in some aspects, a height to which the socket projections 324 extend away from the corresponding socket collars 1650 can vary between some or all of the male rollers 1620a,b,c. For example, in some aspects, the socket projections 324 of the male roller 1620a can extend to a height that is less that a height of socket projections 324 of the male roller 1620b, and the socket projections 324 of the male roller 1620b can extend to a height that is less than a height of the socket projections 324 of the male roller 1620c. In other aspects, the socket projections 324 of each of the male rollers 1620a,b,c can be about equal in height.

According to example aspects, each of the first and second layers 100,200 (shown in FIG. 14) can be fed through the corresponding layer rolling devices 300 in the direction from the male roller 1620a to the male roller 1620c. The centrally-oriented socket collars 1650 of the male roller 1620a can form a center set 1912 (shown in FIG. 19) of the first and second sockets 130,230 at and around a center 1910 (shown in FIG. 19) of the first and second layers 100,200, respectively. The socket collars 1650 of the male roller 1620b can then form first and second intermediate sets 1914a,b (shown in FIG. 19) of the first and second sockets 130,230 on either side of the center set 1912. Finally, the socket collars 1650 of the male roller 1620c can form first and second outer sets 1916*a,b* (shown in FIG. 19) of the first and second sockets 130,230 adjacent to the first and second intermediate sets 1914*a,b* and distal to the center set 1912.

In some aspects, each of the male rollers 1620 can define one or more spacer areas 1660 extending about a circumference of the male roller 1620. For example, in the present aspect, each of the male rollers 1620 can define one of the spacer areas 1660 oriented about centrally along the length of the male roller 1620. In other aspects, each of the male rollers 1620 can define additional spacer areas 1660 and/or the spacer area(s) 1660 can be positioned anywhere along the length of the male roller 1620. As shown, each of the spacer areas 1660 can be substantially smooth and does not define the socket projections 324. In the present aspect, each of the spacer areas 1660 of the male rollers 1620 can be provided by a spacer collar 1662 positioned between adjacent socket collars 1650. In some aspects, the spacer collar 1662 can be similar to the smooth collars 1640. Furthermore, the spacer area 1660 of the male roller 1620*a* can be aligned with corresponding spacer areas 1660 of the male rollers 1620*b*,1620*c*. According to example aspects, the spacer areas 1660 can define cutting portions extending lengthwise along the first and second layers 100,200, which can be substantially planar and which do not define the corresponding first and second sockets 130,230. The cutting portions of the first and second layers 100,200 can be aligned on the finished cushioning sheet 700, such that the cushioning sheet 700 can be cut lengthwise along the cutting portions without piercing any of the cushioning inserts 400 or voids 830. However, other aspects of the male rollers 1620 may not comprise the spacer areas 1660.

In some aspects, as shown, each of the female rollers 1610 can also define one or more of the spacer areas 1660. For example, in the present aspect, each of the female rollers 1610 can define one of the spacer areas 1660 oriented about centrally along a length of the female roller 1610. Each of the spacer areas 1660 of the female rollers 1610 can be formed as a smooth circumferential region 1664 of the cylindrical outer surface 312 of the female roller 1610. The smooth circumferential region 1664 of the female roller 1610 can be configured to align with the spacer collars 1662 of the male rollers 1620. In other aspects, however, the female rollers 1610 may not comprise the corresponding spacer areas 1660. The roller assembly 1410 can further comprise the sheet rolling device 900. According to example aspects, the sheet rolling device 900 can comprise each of the female rollers 1610 of the layer rolling devices 300. Thus, the female rollers 1610 of the layer rolling devices 300 can serve as the first and second sheet rollers 910,920, and the corresponding socket indentations 314 of the female rollers 1610 can serve as the indentations 914,924. The first and second sheet rollers 910,920 can confront another, and each of the first and second layers 100,200 can be simultaneously fed therebetween. As described above, each of the indentations 914 of the first sheet roller 910 can align with a corresponding one of the indentations 924 of the second sheet roller 920 as the first and second sheet rollers 910,920 are concurrently rotated. The first sockets 130 of the first layer 100 can extend into the indentations 914 of the first sheet roller 910, and the second sockets 230 of the second layer 200 can extend into the indentations 924 of the second sheet roller 920, allowing the voids 830 (shown in FIG. 8) therebetween to maintain their shape and preventing the cushioning inserts 400 (shown in FIG. 4) from being compressed or crushed therein. Additionally, as described above, the cylindrical outer surfaces 912,922 (shown in FIG. 9) of the first and second sheet rollers 910,920 surrounding the corresponding indentations 914,924 can press the second lower surface 224 (shown in FIG. 2) of the second layer 200 into contact with the first upper surface 122 (shown in FIG. 1) of the first layer 100. The adhesive 240 (shown in FIG. 2) applied to the second lower surface 224 of the second layer 200 can adhere to the first upper surface 122 of the first layer 100 to secure the first and second layers 100,200 together with the cushioning inserts 400 received in the voids 830, thereby defining the cushioning sheet 700 (shown in FIG. 7). The cushioning sheet 700 can then exit the roller assembly 1410 and can be wrapped around itself to define the finished roll 1515 (shown in FIG. 15B).

Thus, a method of forming the cushioning sheet 700 can comprise forming the plurality of first sockets 130 in the first layer 100, and forming the plurality of second sockets 230 in the second layer 200, wherein each of the second sockets 230 can correspond to a one of the first sockets 130. The method can further comprise positioning one of the cushioning inserts 400 within the void 830 defined between each corresponding pair of the first and second sockets 130,230, and coupling the first layer 100 to the second layer 200.

Figure 17:
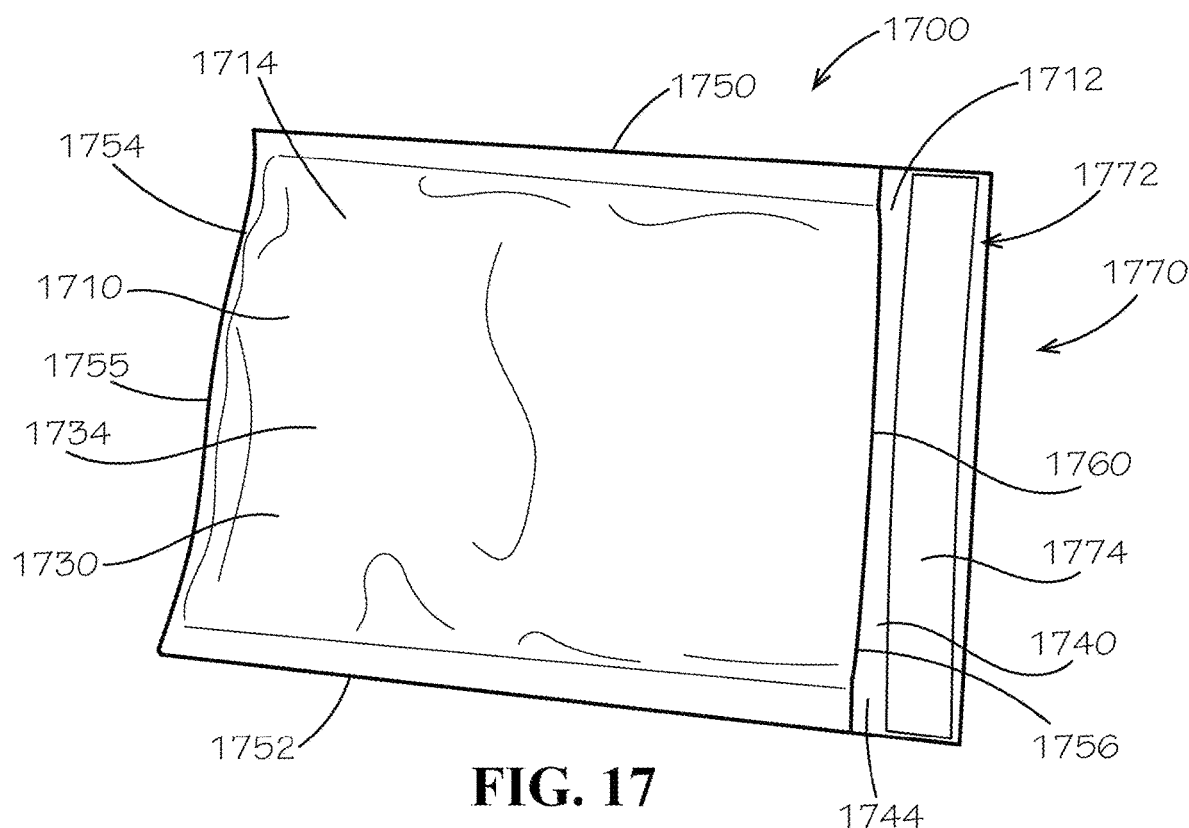
FIG. 17 is a front view of a cushioned mailer comprising the cushioning sheet of FIG. 7, in accordance with another example aspect of the present disclosure.
Figure 18:
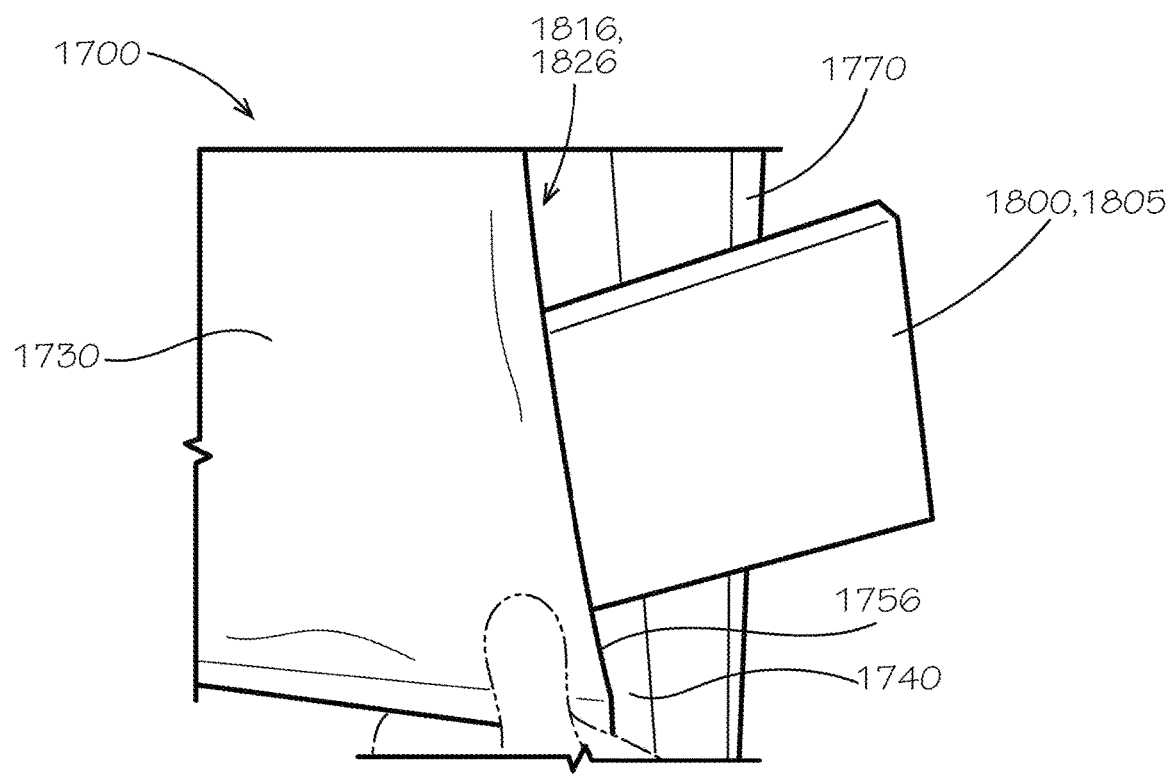
FIG. 18 is a front view of contents being inserted into an inner cavity of the cushioned mailer of FIG. 17.
Figure 19:
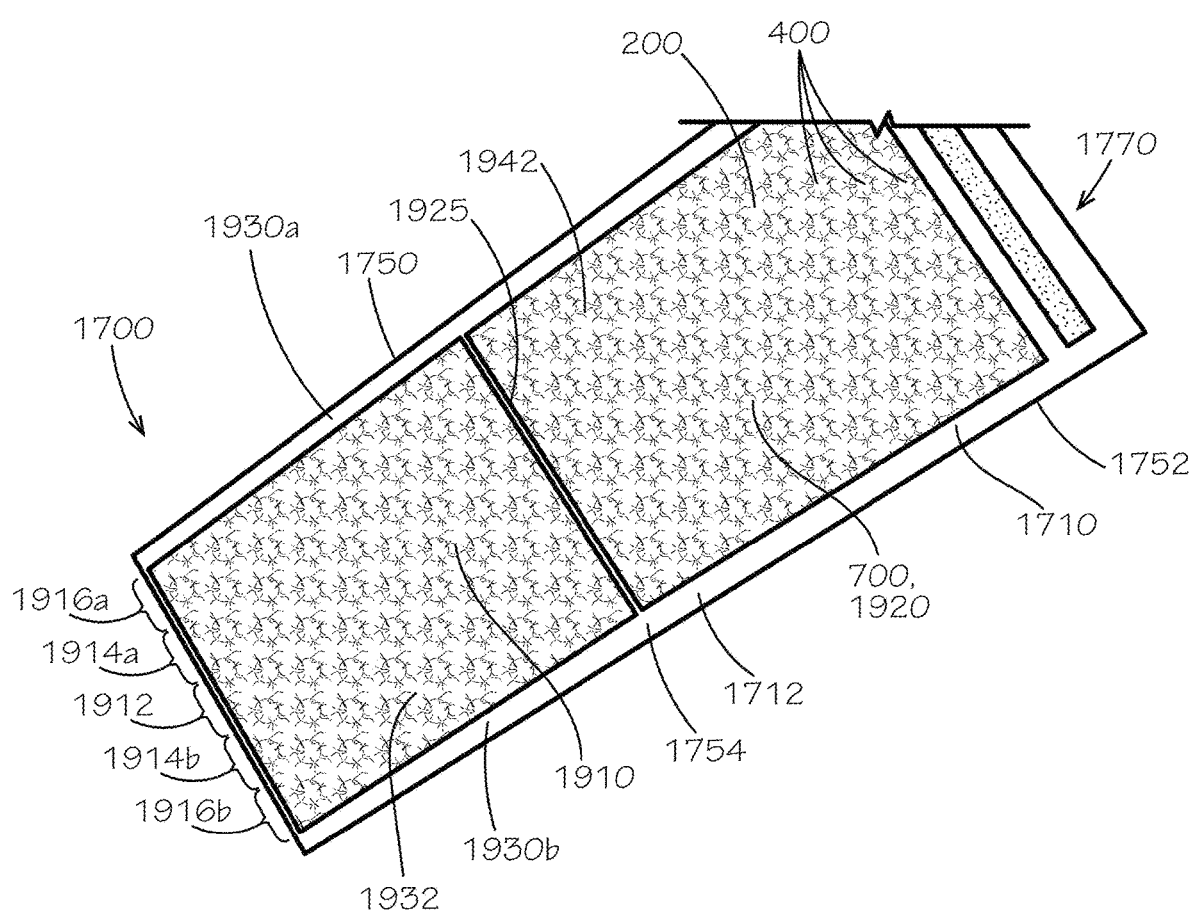
FIG. 19 is a front view of the cushioned mailer of FIG. 17 in an unfolded configuration.

FIGS. 17-19 illustrate a cushioned mailer 1700, in accordance with an example aspect of the present disclosure. Referring to FIG. 17, example aspects of the cushioned mailer 1700 can comprise an outer sheet 1710 defining an inner surface 1712 and an outer surface 1714. The outer sheet 1710 can be a substantially planar paper sheet in the present aspect, though in other aspects, the outer sheet 1710 can comprise any other suitable material and/or configuration. According to example aspect, the inner surface 1712 of the outer sheet 1710 can define an outer cavity 1816 (shown in FIG. 18). The cushioned mailer 1700 can further comprise the cushioning sheet 700 (shown in FIG. 19), which can be an inner sheet 1920 (shown in FIG. 19) in the present aspect, positioned within the outer cavity 1816 and coupled to the inner surface 1712 of the outer sheet 1710. For example, the cushioning sheet 700 can be coupled to the inner surface 1712 by an adhesive, such as, for example, glue, or any other suitable fastener known in the art. Other aspects of the cushioning sheet 700 may not be coupled to the outer sheet 1710 and can be loosely received within the outer cavity 1816. According to example aspects, the cushioning sheet 700 can define an inner cavity 1826, which can include portions of the outer cavity 1816. The cushioned mailer 1700 can be configurable in a folded configuration, as shown in FIGS. 17 and 18, and an unfolded configuration, as shown in FIG. 19. The cushioned mailer 1700 can further be configurable in an open orientation, as shown in FIGS. 17 and 18, and a closed orientation (not shown).

In the folded configuration, the cushioned mailer 1700 can define a front panel 1730 and a rear panel 1740 opposite the front panel 1730. The cushioning sheet 700 can define a front inner portion 1932 (shown in FIG. 19) of the front panel 1730, and the outer sheet 1710 can define a front outer portion 1734 of the front panel 1730 opposite the front inner portion 1932. Similarly, the cushioning sheet 700 (i.e., the inner sheet 1920) can define a rear inner portion 1942 (shown in FIG. 19) of the rear panel 1740, and the outer sheet 1710 can define a rear outer portion 1744 of the rear panel 1740 opposite the rear inner portion 1942. The front inner portion 1932 of the cushioning sheet 700 can face the rear inner portion 1942 of the cushioning sheet 700, and the inner cavity 1826 can be substantially defined therebetween. The inner cavity 1826 can be configured to receive contents 1800 (shown in FIG. 18) therein, which can be substantially surrounded and cushioned by the cushioning sheet 700.

Example aspects of the cushioned mailer 1700 can further define a left side 1750, a right side 1752 opposite the left side 1750, a bottom end 1754, and a top end 1756 opposite the bottom end 1754. The front panel 1730 of the cushioned mailer 1700 can be hingedly coupled to the rear panel 1740 of the cushioned mailer 1700 at the bottom end 1754 at a bottom fold line 1755, as shown. As such, both the outer cavity 1816 and the inner cavity 1826 can be closed at the bottom end 1754 of the cushioned mailer 1700. The bottom fold line 1755 can be defined in at least the outer sheet 1710, and in some aspects, can further be defined in the cushioning sheet 700. In other aspects, the cushioning sheet 700 can define a cut 1925 (shown in FIG. 19) at the bottom end 1754 of the cushioned mailer 1700. Example aspects of the cushioned mailer 1700 can also be sealed at each of the left side 1750 and the right side 1752. For example, in some aspects, the inner surface 1712 of the outer sheet 1710 can be sealed to itself by an adhesive at the left and right sides 1750,1752, thereby closing the outer cavity 1816 and the inner cavity 1826 at the left and right sides 1750,1752. The adhesive can be, for example, glue or any other suitable adhesive known in the art. In other aspects, the left and right sides 1750,1752 can be sealed by any other suitable fastener. Furthermore, in other aspects, the cushioning sheet 700 can be sealed to itself or to the outer sheet 1710 to close the outer cavity 1816 and/or inner cavity 1826 at the left and right sides 1750,1752.

Example aspects of the cushioned mailer 1700 can further be oriented in the open orientation, as shown, and the closed orientation. In the open orientation, an opening 1760 can be defined at the top end 1756 of the cushioned mailer 1700 to allow access to inner cavity 1826. In the closed orientation, the inner cavity 1826 can be selectively closed at the top end 1756. In some aspects, the cushioned mailer 1700 can define a closure flap 1770 for selectively covering the opening 1760 and sealing the top end 1756 of the cushioned mailer 1700 in the closed orientation, thereby securing the contents 1800 within the inner cavity 1826. In the present aspect, the rear outer portion 1744 of the rear panel 1740 of the cushioned mailer 1700 can define the closure flap 1770 extending from the top end 1756 thereof. Thus, the closure flap 1770 can be defined by the outer sheet 1710, as shown. The closure flap 1770 can define an adhesive strip 1772 extending substantially from the left side 1750 to the right side 1752 of the cushioned mailer 1700. The adhesive strip 1772 can be selectively covered by a peelable backing 1774 in some aspects, which can be peeled away from the cushioned mailer 1700 to reveal the adhesive strip 1772. With the peelable backing 1774 removed, the closure flap 1770 can be folded over the top end 1756 of the cushioned mailer 1700, and the adhesive strip 1772 can be adhered to the front outer portion 1734 of the front panel 1730 of the cushioned mailer 1700. FIG. 18 illustrates the contents 1800 (for example, a small box 1805, as shown) being inserted into the inner cavity 1826 of the cushioned mailer 1700 through the top end 1756 thereof in the open orientation.

FIG. 19 illustrates the cushioned mailer 1700 in the unfolded configuration. As shown, the cushioning sheet 700 can be adhered to the inner surface 1712 of the outer sheet 1710. In the present aspect, the first layer 100 (shown in FIG. 14) of the cushioning sheet 700 can be adhered to the outer sheet 1710, and the second layer 200 of the cushioning sheet 700 can face away from the outer sheet 1710. As such, the second layer 200 of the cushioning sheet 700 can at least partially surround and define the inner cavity 1826 (shown in FIG. 18) in the folded configuration. The cushioning sheet 700 can further comprise the cushioning inserts 400 received in the voids 830 (shown in FIG. 8) between the first layer 100 and the second layer 200, and the cushioning inserts 400 can provide cushioned protection to the contents 1800 (shown in FIG. 18) received in the inner cavity 1826. The cushioning sheet 700 can further define the cut 1925 at the bottom end 1754 of the cushioned mailer 1700 to separate the cushioning sheet 700 into the front inner portion 1932 and the rear inner portion 1942. In other aspects, the cushioning sheet 700 can define the bottom fold line 1755 (shown in FIG. 17) between the front inner portion 1932 and the rear inner portion 1942. The cut 1925 can facilitate folding the cushioned mailer 1700 from the unfolded configuration to the folded configuration. As shown, in example aspects, the outer sheet 1710 can define left and right sealing flaps 1930a,b extending beyond the cushioning sheet 700 at the left and right sides 1750,1752 of the cushioned mailer 1700. In the folded orientation, the portions of the left and right sealing flaps 1930a,b proximate to the front inner portion 1932 can be coupled to the portions of the left and right sealing flaps 1930a,b, respectively, proximate to the rear inner portion 1942 to seal the left and right sides 1750,1752 of the cushioned mailer 1700.

Figure 20:
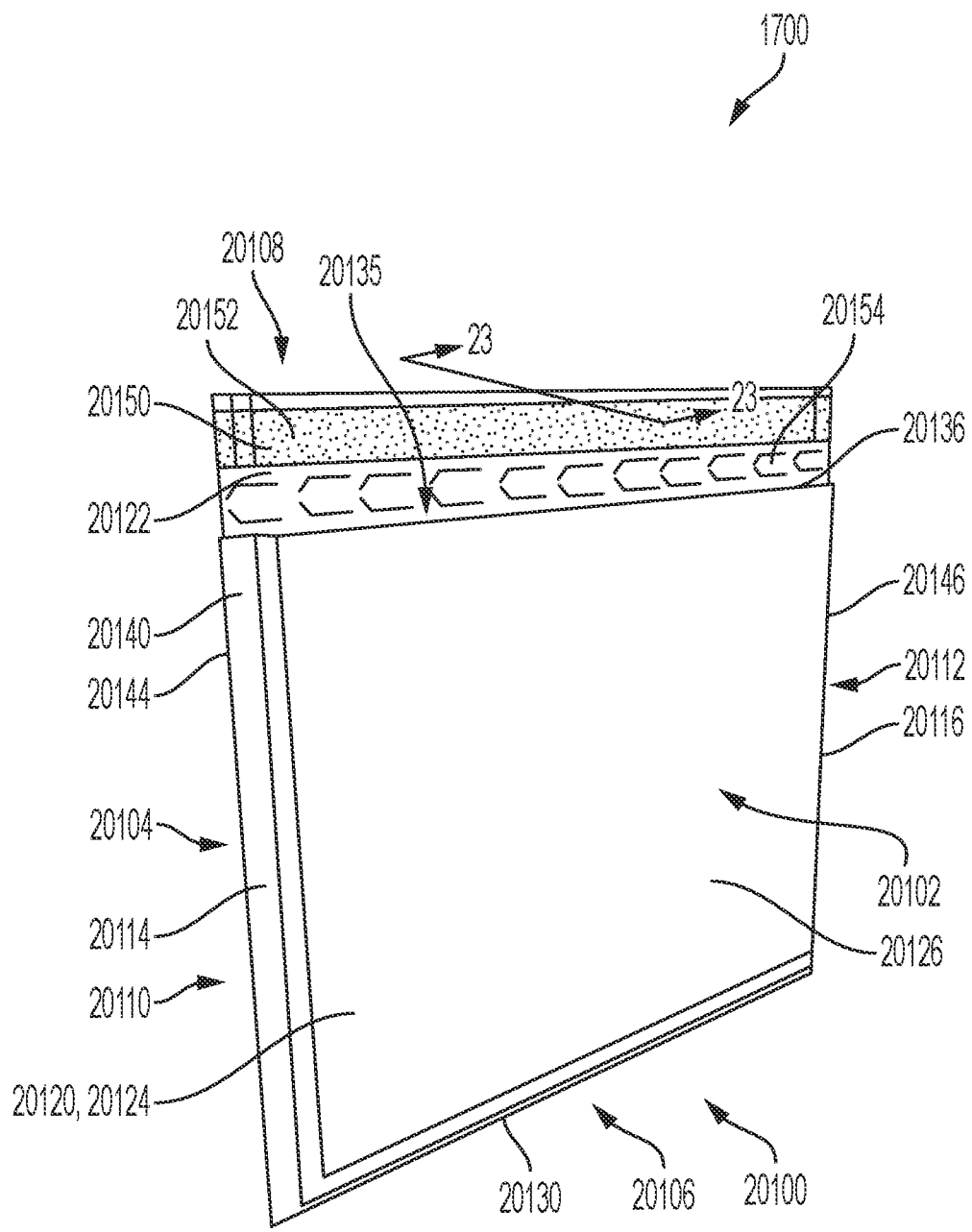
FIG. 20 is a front perspective view of the cushioned mailer, in accordance with another aspect of the present disclosure, wherein the cushioned mailer is formed as a textured mailer.

FIG. 20 illustrates a front perspective view of the cushioned mailer 1700 in accordance with another example aspect of the present disclosure. The cushioned mailer 1700 can be a textured mailer 20100 in the present aspect, as described in further detail below. In FIG. 20, the textured mailer 20100 is shown in a folded configuration. The textured mailer 20100 can be similar to the cushioned According to example aspects, the textured mailer 20100 can comprise an outer layer 20120 and an inner layer 22320 (shown in FIG. 22). Other aspects of the textured mailer 20100 can comprise more or fewer layers; for example, in another aspect, the textured mailer 20100 can comprise the outer layer 20120, the inner layer 22320, and an intermediate layer therebetween. The outer layer 20120 can define an inner surface 20122 and an outer surface 20124. The outer layer 20120 can comprise a paper material, and thus, the outer layer 20120 can be a paper outer layer 20120. In some aspects, the paper material can be recyclable, and in some aspects the paper material can be single stream repulpable. Additionally, in some aspects, the paper material can be a tissue-grade paper material. Furthermore, in some aspects, a coating can be applied to the paper material of the outer layer 20120 to increase the strength of the outer layer 20120 while maintaining flexibility. The coating can be, for example and without limitation, a starch-based coating. In some aspects, the paper material can be extensible, such that the outer layer 20120 can be stretchable. In other aspects, the outer layer 20120 can comprise any other suitable material known in the art, may or may not comprise the coating, and/or can be inextensible.

Figure 21:
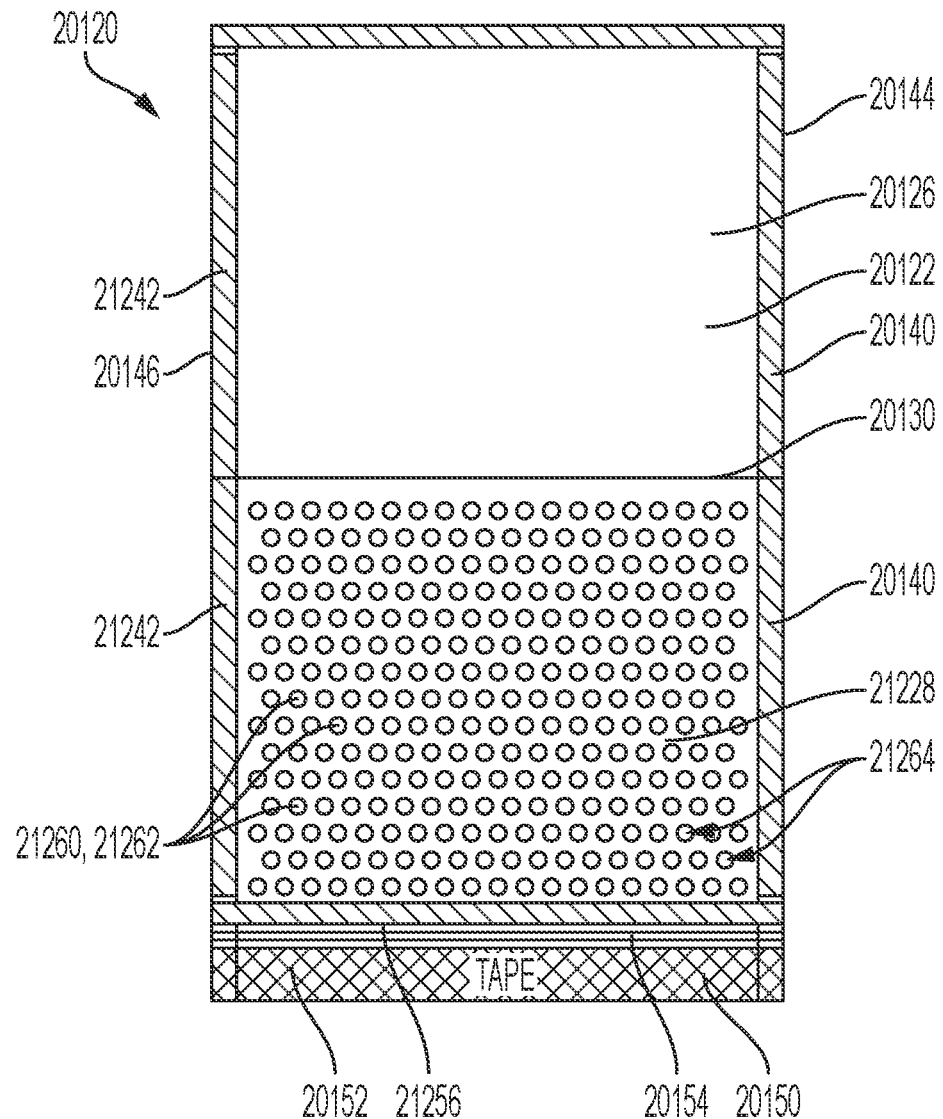
FIG. 21 is a top plan view of an outer layer of the textured mailer of FIG. 20.

Example aspects of the outer layer 20120 can comprise an outer front panel 20126 and an outer rear panel 21228 (shown in FIG. 21). The outer front panel 20126 can be folded towards the outer rear panel 21228 at a lower outer bend line 20130, as shown, such that the outer front panel 20126 can be disposed at a front side 20102 of the textured mailer 20100 and the outer rear panel 21228 can be disposed at a rear side 20104 of the textured mailer 20100. The outer front panel 20126 and the outer rear panel 21228 can be oriented about parallel with one another. In example aspects, the outer front panel 20126 can be substantially smooth and planar, and the outer rear panel 21228 can be textured, as described in further detail below. The smoothness of the outer front panel 20126 can allow for sticker labels to be easily adhered to the outer front panel 20126 and/or can allow for easy writing of mailing addresses or other information thereon. In other aspects, the outer front panel 20126 can be textured, and the outer rear panel 21228 can be substantially smooth and planar. In other aspects, both of the outer front panel 20126 and the outer rear panel 21228 can be textured, or both of the outer front panel 20126 and the outer rear panel 21228 can be substantially smooth and planar.

The inner surface 20122 of the outer layer 20120 can define an outer cavity 20135 between the outer front panel 20126 and the outer rear panel 21228. The outer cavity 20135 can be sealed at a lower end 20106 of the textured mailed by the lower outer bend line 20130. Each of the outer front panel 20126 and the outer rear panel 21228 can define a left sealing portion 20140 extending along a left edge 20144 thereof and a right sealing portion 21242 (shown in FIG. 21) extending along a right edge 20146 thereof. According to example aspects, the left sealing portion 20140 of the outer front panel 20126 can be coupled to the left sealing portion 20140 of the rear front panel to define a left seam 20114 and to seal the outer cavity 20135 at a left side 20110 of the textured mailer 20100. Similarly, the right sealing portion 21242 of the outer front panel 20126 can be coupled to the right sealing portion 21242 of the outer rear panel 21228 to define a right seam 20116 and to seal the outer cavity 20135 at a right side 20112 of the textured mailer 20100. In example aspects, the right sealing portions 21242 can be secured together at the right side 20112 by an adhesive, and the left sealing portions 20140 can be secured together at the left side 20110 by an adhesive. The adhesives can be, for example, glue or tape. In other aspects, the right sealing portions 21242 can be secured together and the left sealing portions 20140 can be secured together by any other suitable fastener or fastening technique known in the art. According to example aspects, the textured mailer 20100 can further comprise the inner layer 22320 (shown in FIG. 22), which can be disposed substantially within the outer cavity 20135 in the folded configuration. In example aspects, the inner layer 22320 can be secured to the outer layer 20120 in an unfolded configuration, and then the textured mailer 20100 can be folded to the folded configuration, as described in further detail below.

A cavity opening 20136 can be defined generally at or near an upper end 20108 of the textured mailer 20100. The inner layer 22320 can be inserted into the outer cavity 20135 through the cavity opening 20136. Example aspects of the textured mailer 20100 can be configured in an unsealed configuration, as shown, and a sealed configuration. In the unsealed configuration, the cavity opening 20136 can be uncovered to allow access to the outer cavity 20135. In the sealed configuration, the cavity opening 20136 can be covered by a sealing flap 20150 of the textured mailer 20100 to seal the outer cavity 20135 at the upper end 20108, thereby containing contents received within the textured mailer 20100. According to example aspects, the sealing flap 20150 can extend substantially upward, relative to the orientation shown, from the outer rear panel 21228. In some aspects, a tape strip 20152 can be applied substantially along a length of the sealing flap 20150 on the inner surface 20122. To seal the textured mailer 20100 in the sealed configuration, the sealing flap 20150 can be folded relative to the outer rear panel 21228 over the cavity opening 20136, and the tape strip 20152 can be adhered to the outer front panel 20126 on the outer surface 20124. In some aspects, a backing can cover the tape strip 20152 in the unsealed configuration and can be peeled off to expose the tape strip 20152 prior to sealing the textured mailer 20100. In other aspects, the sealing flap 20150 can be secured to the outer front panel 20126 by any other suitable fastener or fastening technique. Moreover, in some aspects, the sealing flap 20150 can comprise a tear strip 20154 disposed between the tape strip 20152 and the outer rear panel 21228, and extending along the length of the sealing flap 20150. The tear strip 20154 can be torn away from the textured mailer 20100 to facilitate opening the textured mailer 20100 from the sealed configuration. Other aspects of the textured mailer 20100 may not comprise the tear strip 20154 and/or the tape strip 20152.

FIG. 21 is a top plan view of the outer layer 20120 of the textured mailer 20100 (shown in FIG. 20) in an unfolded configuration, illustrating the inner surface 20122 thereof. As shown, the outer front panel 20126 can be hingedly coupled to the outer rear panel 21228 by the lower outer bend line 20130. Each of the outer front panel 20126 and the outer rear panel 21228 can define the corresponding left sealing portion 20140 and right sealing portion 21242. The sealing flap 20150 can extend from the outer rear panel 21228, opposite the outer front panel 20126. In some aspects, the sealing flap 20150 can be hingedly connected to the outer rear panel 21228 at an upper outer bend line 21256. The sealing flap 20150 can define both the tape strip 20152 and the tear strip 20154. According to example aspects, the outer front panel 20126 can be substantially smooth and planar, and the outer rear panel 21228 can be textured. For example, the textured outer rear panel 21228 can define a plurality of spaced-apart outer sockets 21260 formed therein, similar to the sockets 130,230 previously described.

In the present aspect, each of the outer sockets 21260 can be formed as a substantially semi-spherical dome 21262 defining a substantially semi-spherical recess 21264. Furthermore, each of the outer sockets 21260 can be substantially uniform in size and shape, and can extend in the same direction. For example, each of the outer sockets 21260 can extend rearwardly from the rear side 20104 (shown in FIG. 23A) of the textured mailer 20100. As such, the outer sockets 21260 can extend into the page in the present view. In other aspects, however, the outer sockets 21260 can vary in size and/or shape, and/or the outer sockets 21260 can vary in direction (i.e., some of the outer sockets 21260 can extend rearwardly from the rear side 20104 of the textured mailer 20100 and some of the outer sockets 21260 can extend forwardly towards the front side 20102—shown in FIG. 23A—of the textured mailer 20100). The outer sockets 21260 can also be arranged in any suitable pattern, such as in diagonal lines, as shown. According to example aspects, outer sockets 21260 can be formed in the outer layer 20120 by the rolling machine 1400.

Figure 22:
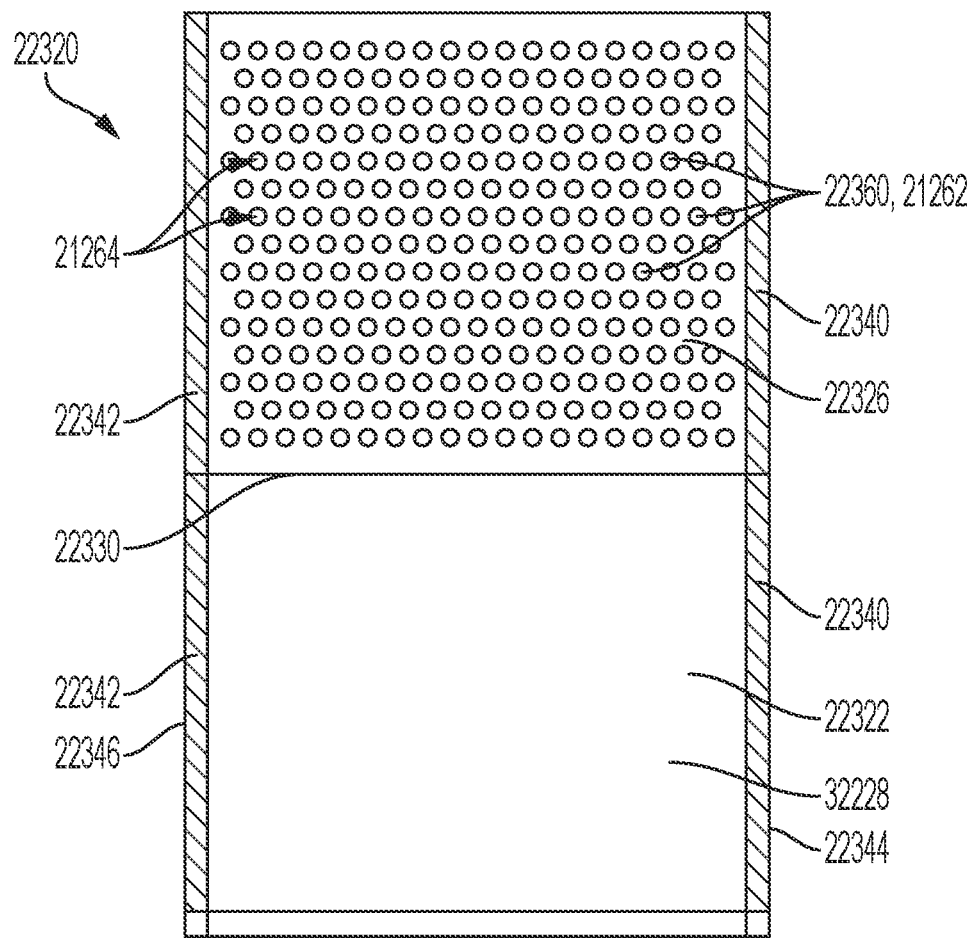
FIG. 22 is a top plan view of an inner layer of the textured mailer of FIG. 20.

FIG. 22 is a top plan view of the inner layer 22320 in an unfolded configuration. According to example aspects, the inner layer 22320 can be similar to the outer layer 20120 (shown in FIG. 20). For example, like the outer layer 20120, the inner layer 22320 can comprise a paper material, and thus, the inner layer 22320 can be a paper inner layer 22320. In some aspects, the paper material can be recyclable, and in some aspects, the paper material can be single stream repulpable. Additionally, in some aspects, the paper material can be a tissue-grade paper material. Furthermore, in some aspects, a coating can be applied to the paper material of the inner layer 22320 to increase the strength of the inner layer 22320 while maintaining flexibility. The coating can be, for example and without limitation, a starch-based coating. In some aspects, the paper material can be extensible, such that the outer layer 20120 can be stretchable. In other aspects, the inner layer 22320 can comprise any other suitable material known in the art, may or may not comprise the coating, and/or can be inextensible.

Figure 23A:
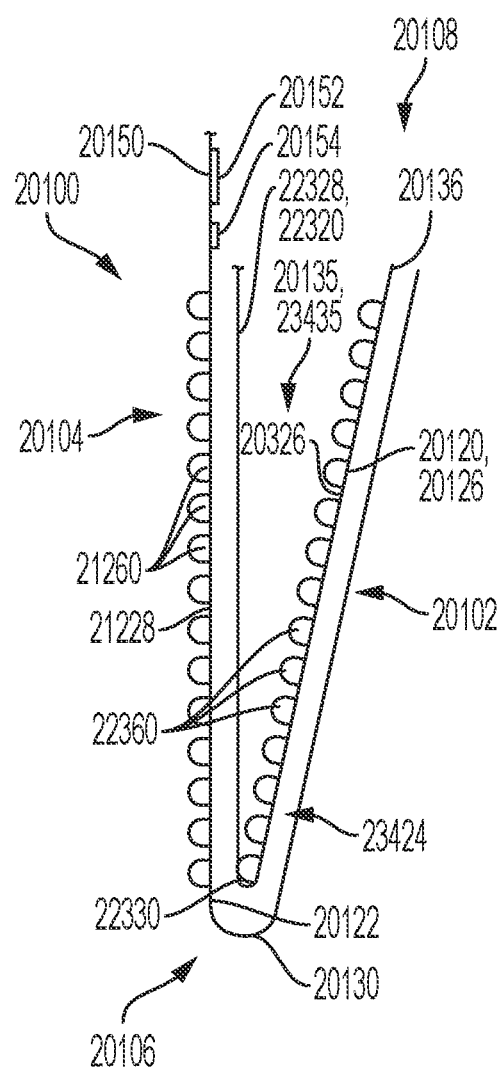
FIG. 23A is a cross-section view of the textured mailer of FIG. 20, taken along line 23-23 in FIG. 20.

The inner layer 22320 can define an inner surface 22322 and an outer surface 23424 (shown in FIG. 23A). Example aspects of the inner layer 22320 can comprise an inner front panel 22326 and an inner rear panel 22328. The inner front panel 22326 can be hingedly connected to the inner rear panel 22328 at a lower inner bend line 22330, as shown. Each of the inner front panel 22326 and the inner rear panel 22328 can define a left coupling portion 22340 extending along a left edge 22344 thereof and a right coupling portion 22342 extending along a right edge 22346 thereof. Furthermore, according to example aspects, the inner rear panel 22328 can be substantially smooth and planar, and the inner front panel 22326 can be textured. In other aspects, the inner rear panel 22328 can be textured, and the inner front panel 22326 can be substantially smooth and planar. In other aspects, both of the inner front panel 22326 and the inner rear panel 22328 can be textured, or both of the inner front panel 22326 and the inner rear panel 22328 can be substantially smooth and planar. Like, the textured outer rear panel 21228 (shown in FIG. 21) of the outer layer 20120, the textured inner front panel 22326 of the inner layer 22320 can define a plurality of spaced-apart inner sockets 22360 formed therein.

Figure 23B:
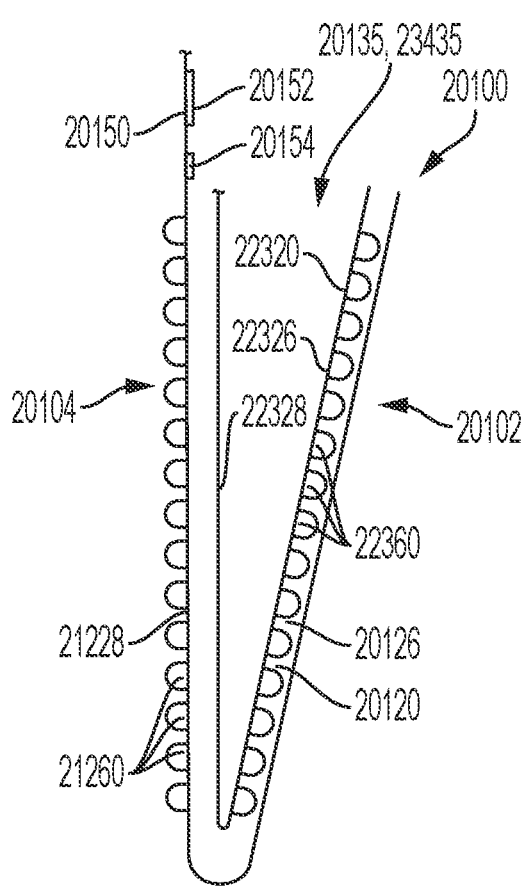
FIG. 23B is a cross-sectional view of the textured mailer in accordance with another aspect of the present disclosure.

The inner sockets 22360 can be substantially similar to the outer sockets 21260. As described above, example aspects of the inner sockets 22360 can be formed as the substantially semi-spherical domes 21262, each dome 21262 defining one of the substantially semi-spherical recesses 21264. The inner sockets 22360 can be substantially uniform in size and shape, and can extend in the same direction. For example, when assembled with the outer layer 20120, each of the inner sockets 22360 can extend rearwardly towards the rear side 20104 (shown in FIG. 23A) of the textured mailer 20100, as is illustrated in FIG. 23A. As such, the inner sockets 22360 can extend out of the page in the present view. In other aspects, each of the inner sockets 22360 can extend forwardly towards the front side 20102 (shown in FIG. 23A) of the textured mailer 20100, as is illustrated in FIG. 23B. In other aspects, the inner sockets 22360 can vary in size and/or shape, and/or the inner sockets 22360 can vary in direction (i.e., some of the inner sockets 22360 can extend rearwardly towards the rear side 20104 of the textured mailer 20100 and some of the inner sockets 22360 can extend forwardly towards the front side 20102 of the textured mailer 20100). The inner sockets 22360 can also be arranged in any suitable pattern, such as in diagonal lines, as shown. The inner sockets 22360 can be formed by the same method as the outer sockets 21260, such as by a rolling machine.

FIG. 23A illustrates a cross-sectional view of the textured mailer 20100 comprising the inner layer 22320 and the outer layer 20120. The textured mailer 20100 is shown in a partially folded configuration as the textured mailer 20100 is being folded to the folded configuration of FIG. 20. In the folded configuration, the inner layer 22320 can be substantially disposed within the outer cavity 20135 defined by the outer layer 20120. According to example aspects, the inner layer 22320 can be secured to the outer layer 20120 while each of the outer and inner layers 20120,22320 are in the unfolded configuration (shown in FIGS. 21 and 22). For example, the outer surface 23424 of the inner layer 22320 can be secured to the inner surface 20122 of the outer layer 20120 by any suitable fastener, such as by an adhesive, for example and without limitation. Specifically, the inner rear panel 22328 can be secured to the outer rear panel 21228, and the inner front panel 22326 can be secured to the outer front panel 20126. The adhesive can be applied to the outer surface 23424 of the inner layer 22320 only, to the inner surface 20122 of the outer layer 20120 only, or to both of the outer surface 23424 and the inner surface 20122. In some aspects, the adhesive can fully cover the outer surface 23424 of the inner layer 22320 and/or the inner surface 20122 of the outer layer 20120, and in other aspects, the adhesive can only partially cover the outer surface 23424 and/or the inner surface 20122. In other aspects, the inner layer 22320 can be secured to the outer layer 20120 by any other suitable fastener or fastening technique.

Furthermore, the left and right coupling portions 22340, 22342 (shown in FIG. 22) of the inner layer 22320 can overlay the corresponding left and right sealing portions 20140,21242 (shown in FIG. 21) of the outer layer 20120. The inner front panel 22326 of the inner layer 22320 can then be folded towards the inner rear panel 22328 of the inner layer 22320, such that the inner front panel 22326 and the outer front panel 20126 can be disposed generally at the front side 20102 of the textured mailer 20100 and the inner rear panel 22328 and the outer rear panel 21228 can be disposed generally at the rear side 20104 of the textured mailer 20100. The left coupling portions 22340 of the inner front panel 22326 and the inner rear panel 22328 can be captured and sealed between the left sealing portions 20140 of the outer front panel 20126 and the outer rear panel 21228 at the left seam 20114 (shown in FIG. 20). Similarly, the right coupling portions 22342 of the inner front panel 22326 and the inner rear panel 22328 can be captured and sealed between the right sealing portions 21242 of the outer front panel 20126 and the outer rear panel 21228 at the right seam 20116 (shown in FIG. 20). The adhesive for sealing the left seam 20114 and the right seam 20116 can be applied to the left and right coupling portions 22340,22342 only, the left and right sealing portions 20140,21242 only, or to both the left and right coupling portions 22340,22342 and the left and right sealing portions 20140,21242. In other aspects, the inner layer 22320 can be secured to the outer layer 20120 only at the left and right seams 20114,20116. Other aspects of the inner layer 22320 may not be coupled to the outer layer 20120 at all and can be loosely received within the outer cavity 20135.

The inner surface 22322 of the inner layer 22320 can define an inner cavity 23435 between the inner front panel 22326 and the inner rear panel 22328, which can overlap and include portions of the outer cavity 20135. The cavity opening 20136 can be defined generally at or near the upper end 20108 of the textured mailer 20100 and can allow access to the inner cavity 23435 in the unsealed configuration, as shown. Contents can be inserted into the inner cavity 23435 of the textured mailer 20100 through the cavity opening 20136. In the present aspect, the inner sockets 22360 of the inner front panel 22326 can extend into the inner cavity 23435 and can cushion the textured mailer 20100 at the front side 20102 thereof. The inner rear panel 22328 can be substantially smooth and planar, which can facilitate sliding contents (e.g., greeting cards, paper documents, etc.) into the inner cavity 23435. The outer sockets 21260 of the outer rear panel 21228 can extend away from the inner rear panel 22328 and can cushion the textured mailer 20100 at the rear side 20104 thereof. Thus, the inner cavity 23435 and the contents therein can be substantially surrounded by the textured outer rear panel 21228 and the texture inner front panel 22326.

The inner cavity 23435 can be sealed at the lower end 20106 of the textured mailer 20100 by the lower inner bend line 22330. The inner cavity 23435 can further be sealed at the left side 20110 and the right side 20112 by the left seam 20114 and the right seam 20116, respectively. The sealing flap 20150 of the outer layer 20120 can extend upward from the outer rear panel 21228, relative to the orientation shown, beyond the inner rear panel 22328. As described above, the sealing flap 20150 can be folded over the cavity opening 20136 and secured to the outer front panel 20126 to seal the inner cavity 23435 at the upper end 20108 of the textured mailer 20100 and to retain the contents therein.

FIG. 23B illustrates a cross-sectional view of the textured mailer 20100 according to another example aspect of the present disclosure, wherein the inner sockets 22360 of the inner front panel 22326 can extend away from the inner cavity 23435 towards the outer front panel 20126. As shown, the outer sockets 21260 of the outer rear panel 21228 can extend away from the inner rear panel 22328; however, in other aspects, the outer sockets 21260 can extend towards the inner rear panel 22328.

Figure 24:
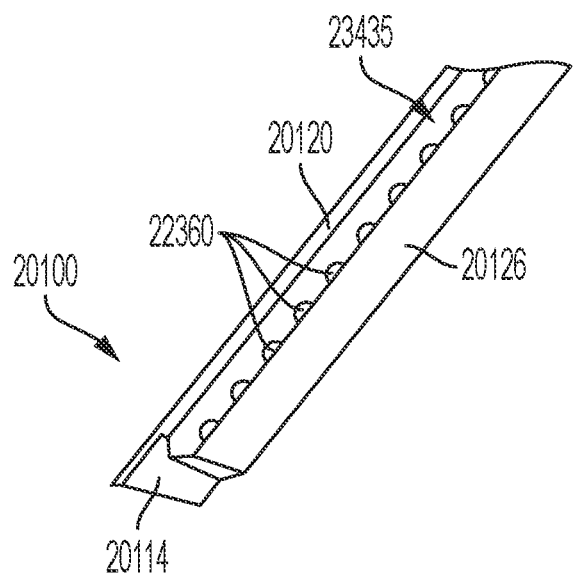
FIG. 24 is a top perspective view of the textured mailer of FIG. 20.
Figure 25:
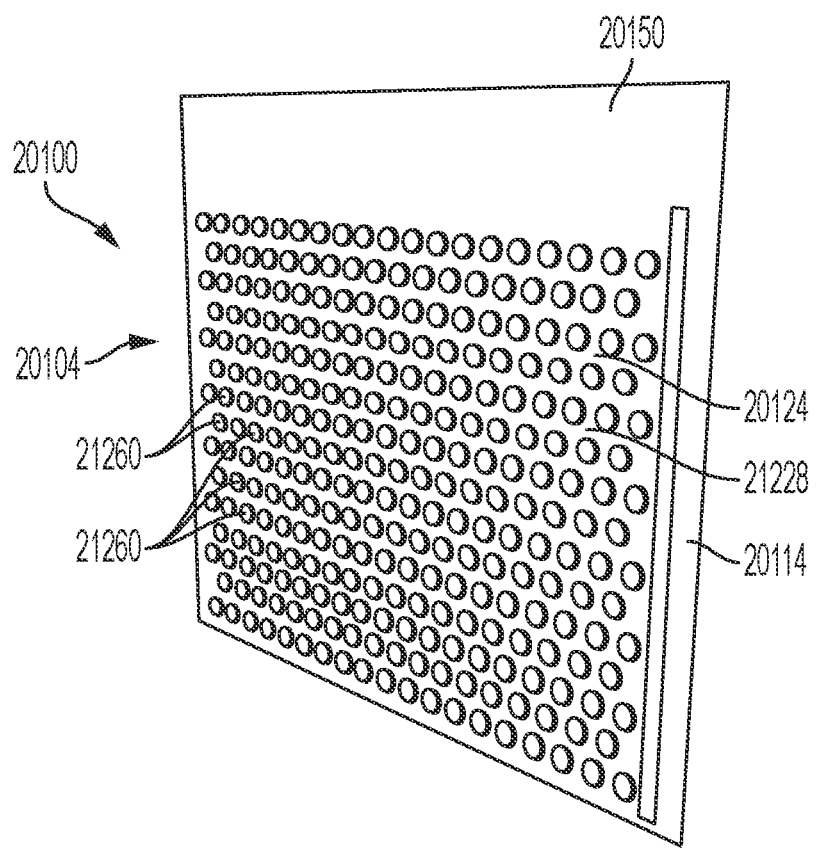
FIG. 25 is a rear perspective view of the textured mailer of FIG. 20.
Figure 26A:
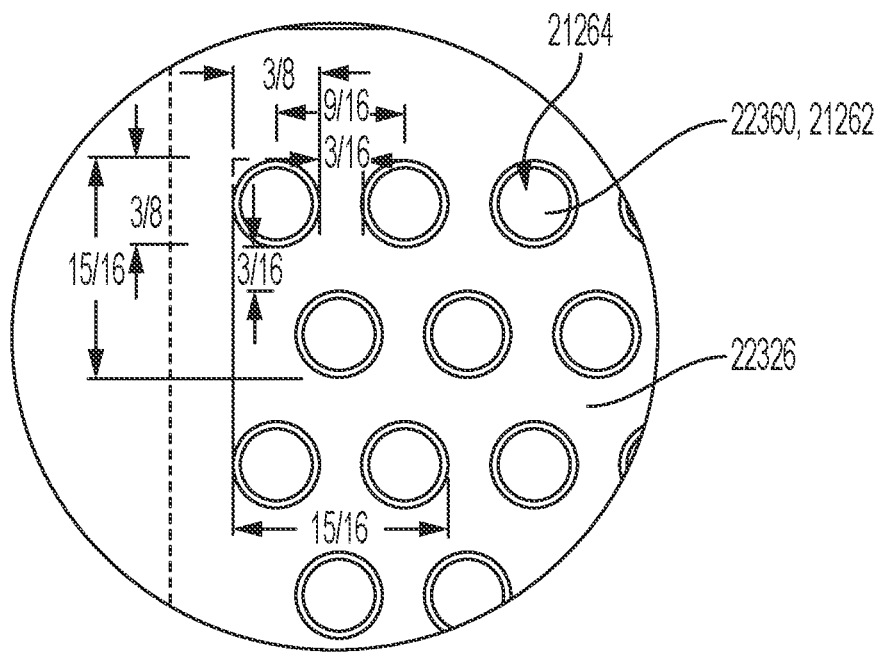
FIG. 26A is a detail view of the textured mailer of FIG. 20, showing example dimensions thereof.
Figure 26B:
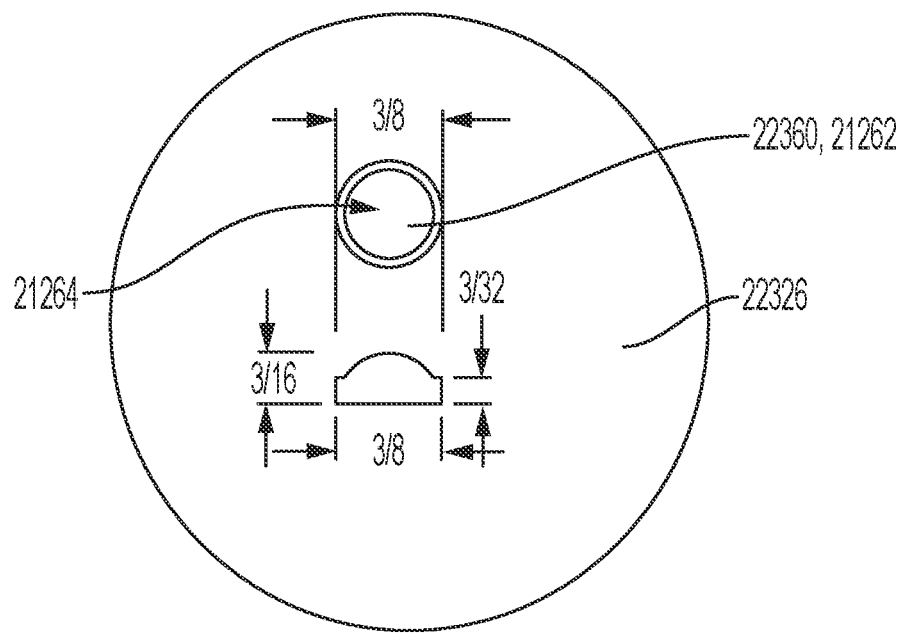
FIG. 26B is another detail view of the textured mailer of FIG. 20, showing example dimensions thereof.

FIG. 24 illustrates a top perspective view of the textured mailer 20100, showing the inner sockets 22360 extending into the inner cavity 23435. FIG. 25 illustrates a rear perspective view of the textured mailer 20100 showing the outer sockets 21260 extending rearwardly from the rear side 20104 of the textured mailer 20100. FIGS. 26A and 26B illustrate example dimensions of the inner sockets 22360, wherein the outer sockets 21260 (shown in FIG. 21) can define the same dimensions or different dimensions. The dimensions disclosed herein are merely exemplary and should not be considered limiting.

Figure 27:
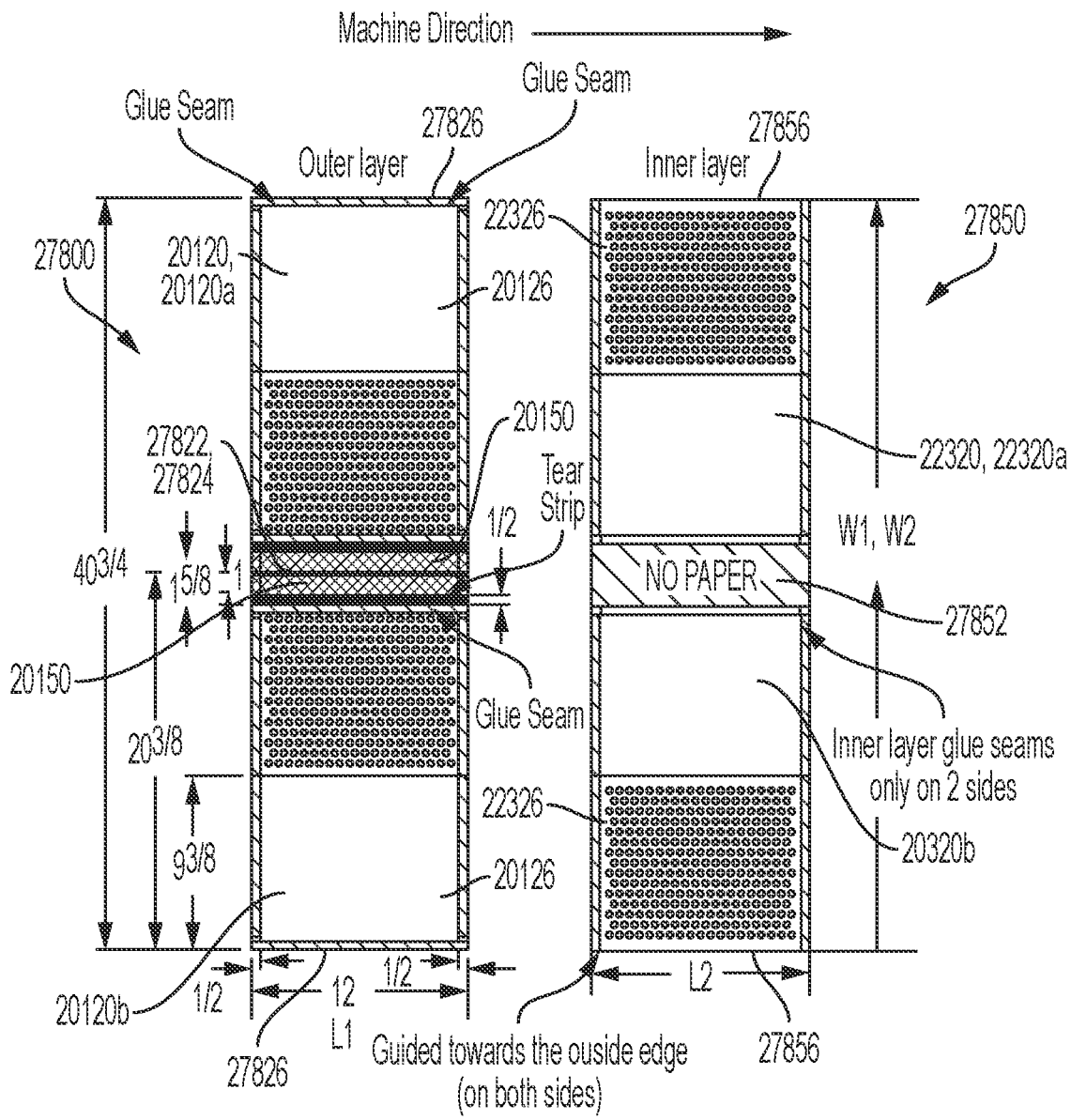
FIG. 27 is a top plan view of a first sheet comprising a plurality of the outer layers of FIG. 21 and a second sheet comprising a plurality of the inner layers of FIG. 22, in accordance with an example aspect of the present disclosure.

FIG. 27 illustrates a monolithic (i.e., formed as a singular component that constitutes a single material without joints or seams) first sheet 27800 comprising a plurality of the outer layers 20120, which can be produced by a rolling machine. The first sheet 27800 can be fed through the rolling machine in the direction indicated by the directional arrow at the top of the page. In the present aspect, the first sheet 27800 can comprise at least a first one of the outer layers 20120a and a second one of the outer layers 20120b. An upper edge 27822 of the sealing flap 20150 of the first outer layer 20120a can meet and extend along the upper edge 27822 of the sealing flap 20150 of the second outer layer 20120b. The upper edges 27822 of the first and second outer layers 20120a,b can generally define a cut line 27824 or a cut region. To separate the first outer layer 20120a from the second outer layer 20120b, the first sheet 27800 can be cut along the cut line 27824.

Figure 28:
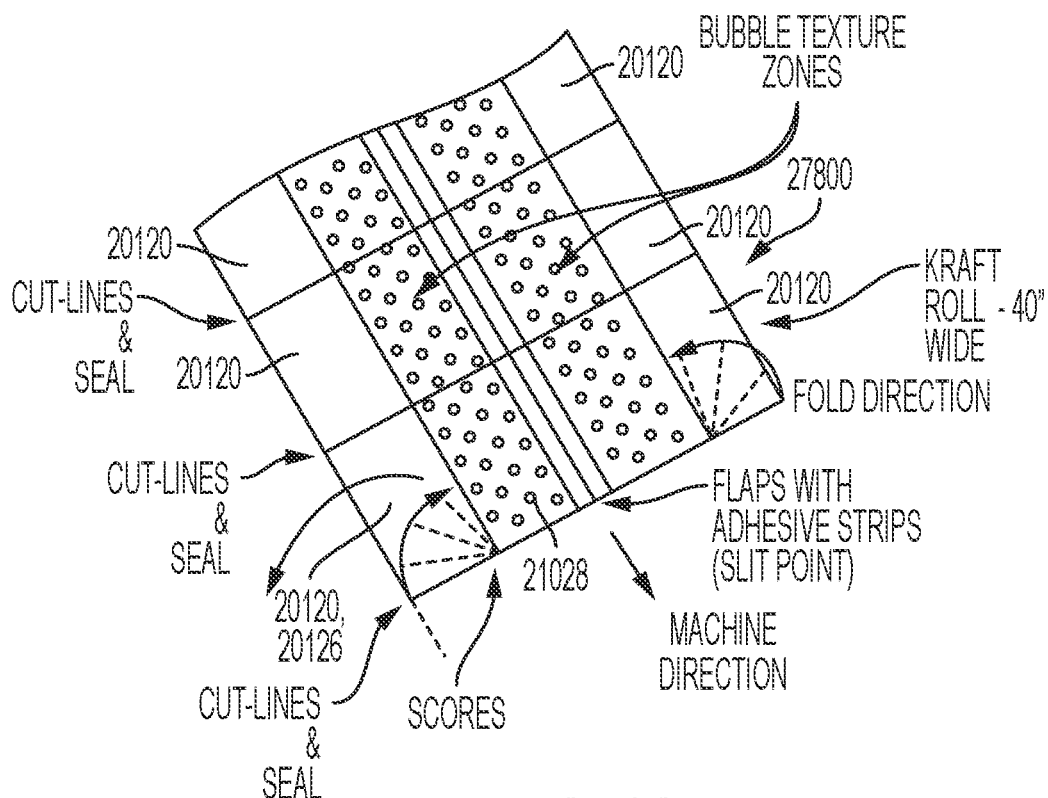
FIG. 28 is a top perspective view of the first sheet of FIG. 27.
Figure 29:
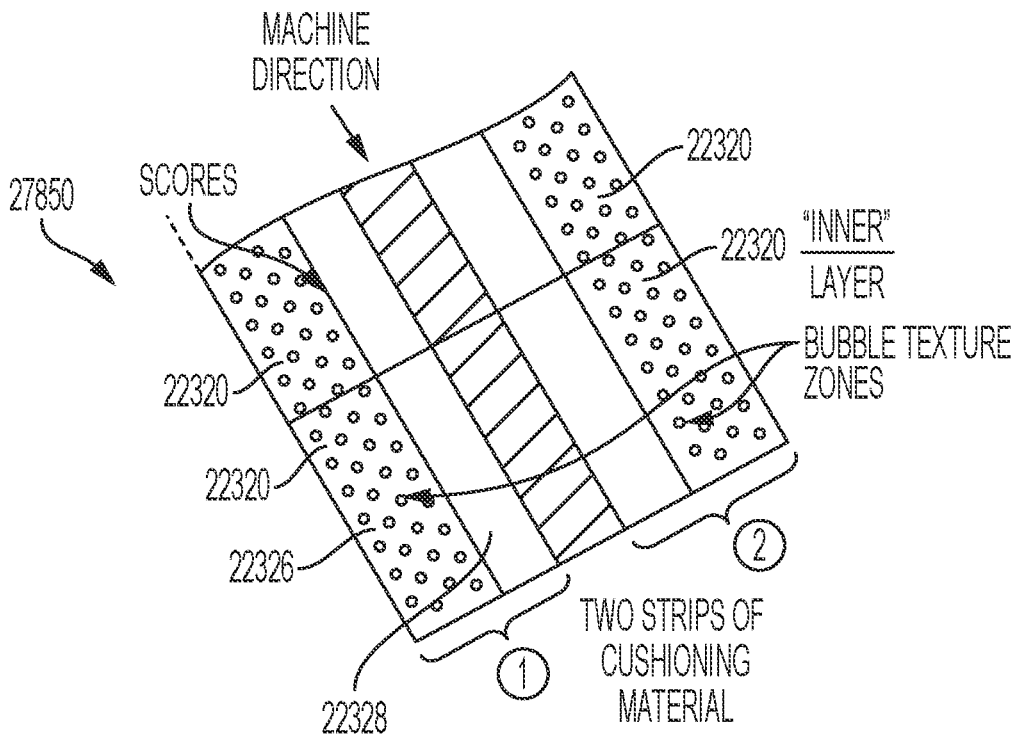
FIG. 29 is a top perspective view of the second sheet of FIG. 27.

As shown, the first sheet 27800 can define a width W1. The width W1 can extend from a distal edge 27826 of the outer front panel 20126 of the first outer layer 20120a to the opposing distal edge 27826 of the outer front panel 20126 of the second outer layer 20120b. Thus, in the present aspect, the first sheet 27800 can be two outer layers 20120 wide. In other aspects, first sheet 27800 can be more or fewer outer layers 20120 wide. Additionally, as shown, the first sheet 27800 can define a length L1. In the present aspect, the first sheet 27800 can be one outer layer 20120 long. However, as shown in FIG. 28, the first sheet 27800 can comprise additional outer layers 20120 along its length in other aspects.

Also illustrated in FIG. 27 is a second sheet 27850 comprising a plurality of the inner layers 22320, which can be produced by a roller machine. The second sheet 27850 can be fed through the rolling machine in the direction indicated by the directional arrow at the top of the page. In the present aspect, the second sheet 27850 can comprise at least a first one of the inner layers 22320a and a second one of the inner layers 22320b. In example aspects, the second sheet 27850 can be a monolithic sheet prior to being fed through the rolling machine. However, in the present aspect, the rolling machine can be configured to cut out a center section of the second sheet 27850 between the first inner layer 22320a and the second outer layer 20120b to define a gap 27852 therebetween, thereby dividing the second sheet 27850 into two separate parts.

As shown, the second sheet 27850 can define a width W2. The width W2 can extend from a distal edge 27856 of the inner front panel 22326 of the first inner layer 22320a to the opposing distal edge 27856 of the inner front panel 22326 of the second inner layer 22320b. Thus, in the present aspect, the second sheet 27850 can be two inner layers 22320 wide, including the gap 27852 defined therebetween. The width W2 can equal the width W1 in the present aspect. In other aspects, the second sheet 27850 can be more or fewer inner layers 22320 wide and/or the width W2 can be different than the width W1. Additionally, as shown, the second sheet 27850 can define a length L2. In the present aspect, the second sheet 27850 can be one inner layer 22320 long and the length L2 can equal the length L1. However, as shown in FIG. 10, the second sheet 27850 can comprise additional inner layers 22320 along its length in other aspects and/or the length L2 can be different than the length L1. The various dimensions disclosed in FIG. 27 are merely exemplary and should not be considered limiting.

Figure 30:
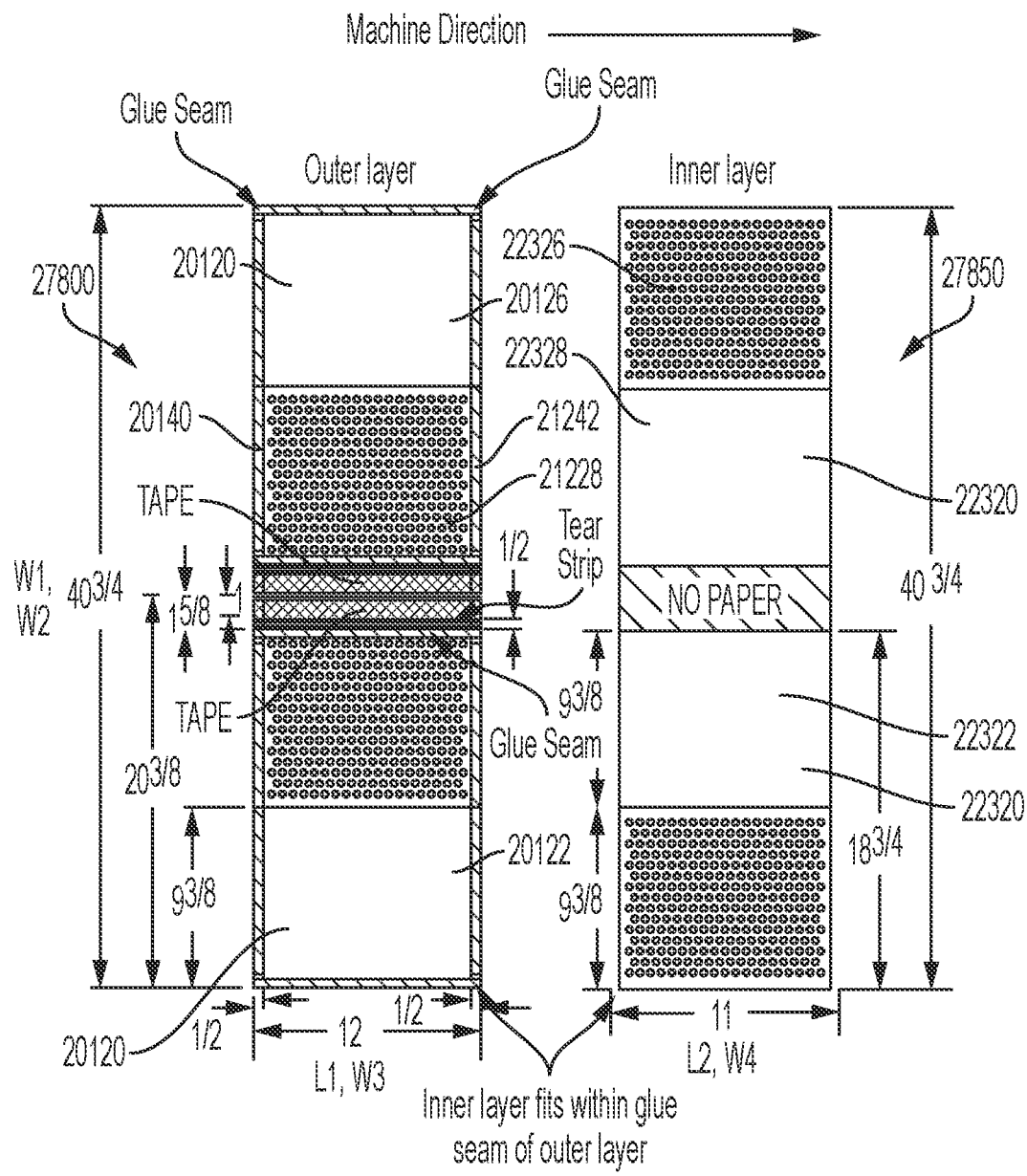
FIG. 30 is a top plan view of the first sheet and the second sheet, in accordance with another example aspect of the present disclosure.

FIG. 30 illustrates the first sheet 27800 and the second sheet 27850 of the textured mailer 20100 (shown in FIG. 20), in accordance with another aspect of the present disclosure. The first sheet 27800 can comprise a pair of the outer layers 20120 and the second sheet 27850 can comprise a pair of the inner layers 22320. Each of the outer layers 20120 can be substantially the same as the outer layers 20120 previously described. Additionally, each of the inner layers 22320 can be similar to the inner layers 22320 previously described; however, in the present aspect, the inner layers 22320 do not comprise the corresponding left and right coupling portions 22340,22342 (shown in FIG. 22). Thus, a width W4 of each of the inner layers 22320 can be less than a width W3 of each of the outer layers 20120. It should be noted that the various dimensions disclosed in FIG. 30 are merely exemplary and should not be considered limiting.

To secure the inner layer 22320 to the outer layer 20120, the outer surface 23424 (shown in FIG. 23) of the inner layer 22320 can be coupled to the inner surface 20122 of the outer layer 20120, as described above. Specifically, the inner front panel 22326 of the inner layer 22320 can be coupled to the outer front panel 20126 of the corresponding outer layer 20120 between the left and right sealing portions 20140, 21242 of the outer layer 20120. Similarly, the inner rear panel 22328 can be coupled to the corresponding outer rear panel 21228 between the left and right sealing portions 20140,21242. The left sealing portion 20140 of the outer front panel 20126 can be adhered directly to the left sealing portion 20140 of the outer rear panel 21228 to define the left seam 20114 (shown in FIG. 20), and the right sealing portion 21242 of the outer front panel 20126 can be adhered directly to the right sealing portion 21242 of the outer rear panel 21228 to define the right seam 20116 (shown in FIG. 20).

Figure 31:
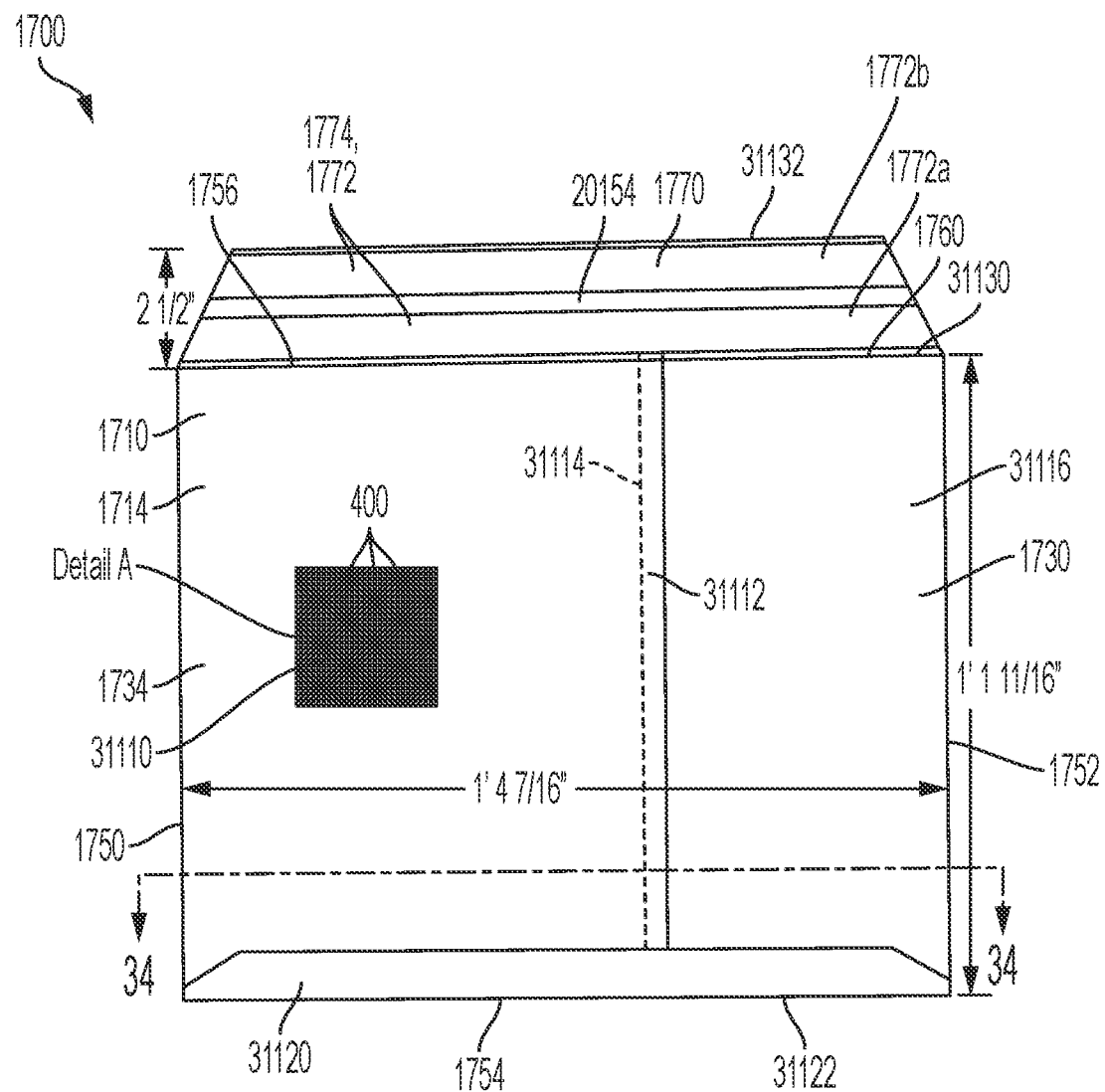
FIG. 31 is a front view of the cushioned mailer in accordance with another aspect of the present disclosure.
Figure 42:
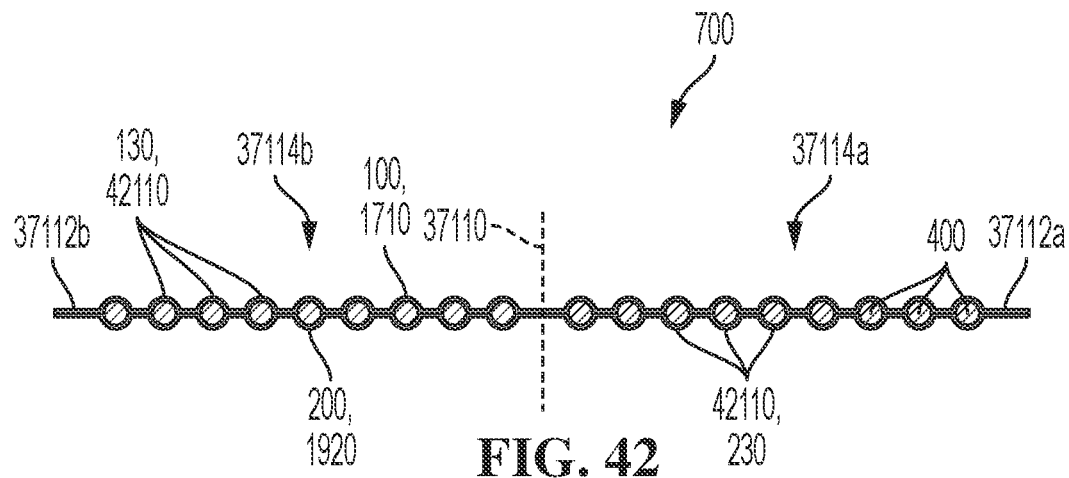
FIG. 42 is a cross-sectional view of the cushioning sheet in accordance with another example aspect of the present disclosure.

FIG. 31 illustrates the cushioned mailer 1700 according to another example aspect of the disclosure. As shown, the cushioned mailer 1700 can comprise the outer sheet 1710 defining the inner surface 1712 (shown in FIG. 17) and the outer surface 1714. The cushioned mailer 1700 can further comprise the inner sheet 1920 (shown in FIG. 34) defining an inner surface 34112 and an outer surface 34114 (both shown in FIG. 34). The outer surface 34114 of the inner sheet 1920 can generally define the inner cavity 1826 (shown in FIG. 18) of the cushioned mailer 1700, within which contents 1800 (shown in FIG. 18) can be received. In the present aspect, both the outer sheet 1710 and the inner sheet 1920 of the cushioned mailer 1700 can be formed as a substantially planar paper sheet. In other aspects, the outer sheet 1710 and/or the inner sheet 1920 can comprise any other suitable material and/or configuration. For example, in other aspects, the outer sheet 1710 and/or the inner sheet 1920 may define cushioning sockets 42110 (such as the first and second sockets 130,230), as shown in FIG. 42. The cushioned mailer 1700 can further comprise an intermediate cushioning layer 31110 disposed between the outer sheet 1710 and the inner sheet 1920. Example aspects of the cushioned mailer 1700 can define a first side, such as the left side 1750, and an opposite second side, such as the right side 1752. The cushioned mailer 1700 can also define the bottom end 1754 and the top end 1756 opposite the bottom end 1754.

According to example aspects, the intermediate cushioning layer 31110 can comprise a plurality of the cushioning inserts 400 disposed between the inner sheet 1920 and the outer sheet 1710 to provide cushioning to the cushioned mailer 1700. For illustrative purposes, a portion of the outer sheet 1710 is removed at Detail A to show the cushioning inserts 400 behind the outer sheet 1710. In example aspects, the plurality of cushioning inserts 400 can be arranged side by side in a single layer between the outer and inner sheets 1710,1920. Adjacent cushioning inserts 400 may confront or contact one another, or clearance may be provided between adjacent cushioning inserts 400. In some aspects, each of the cushioning inserts 400 can be coupled to either or both of the inner sheet 1920 and the outer sheet 1710, such as by an adhesive (e.g., glue) or any other suitable fastener known in the art. For example, in the present aspect, each of the cushioning inserts 400 can be adhered to both the outer sheet 1710 and the inner sheet 1920, as described in further detail below.

Figure 35:
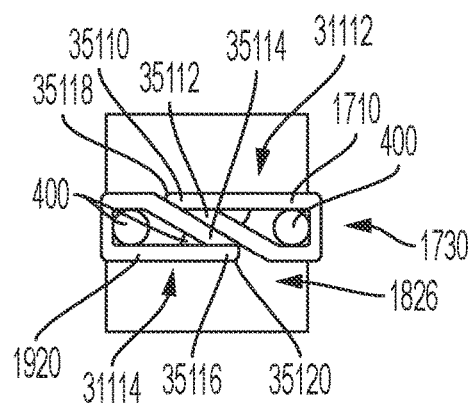
FIG. 35 is a close-up view of Detail B taken from FIG. 34.

Furthermore, the inner surface 34112 of the inner sheet 1920 can be coupled to the inner surface 1712 of the outer sheet 1710 to retain the intermediate cushioning layer 31110 therebetween. For example, the inner sheet 1920 can be coupled to the outer sheet 1710 by an adhesive, such as, for example, glue, or by any other suitable fastener known in the art. In the present aspect, the inner sheet 1920 can be coupled to the outer sheet 1710 at first and second sealing ends 31112,31114 of the cushioned mailer 1700. In the present aspect, the first sealing end 31112 can further be folded towards and coupled to the second sealing end 31114 to define a continuous mailer sidewall 31116 wrapping around the sides of the inner cavity 1826. Each of the first sealing end 31112 and the second sealing end 31114 can extend substantially vertically from the top end 1756 of the cushioned mailer 1700 to the bottom end 1754 of the cushioned mailer 1700. In the present view, the first sealing end 31112 can be folded over and overlap the second sealing end 31114, such that the first sealing end 31112 can be externally visible. The second sealing end 31114 is not externally visible in the present view; however, a dashed line generally indicating the unseen second sealing end 31114 beneath the first sealing end 31112 is shown for the sake of clarity. Moreover, in some aspects, an externally-visible crease may be formed in the cushioned mailer 1700 at an edge of the second sealing end 31114 (generally where the dashed line is shown). FIG. 35, described in further detail below, illustrates how the first sealing end 31112 overlaps the second sealing end 31114.

As shown, each of the left side 1750 and the right side 1752 of the cushioned mailer 1700 can extend substantially vertically between the top end 1756 and the bottom end 1754, relative to the orientation shown. In some aspects, the cushioned mailer 1700 can define first and second gussets 34120,34122 (shown in FIG. 34) at the left and right sides 1750,1752 thereof, respectively. In other aspects, the cushioned mailer 1700 may not define the first and second gussets 34120,34122 and can simply be folded at the left and right sides 1750,1752 thereof to define left and right bend lines 36110,36112 (shown in FIG. 36), respectively. Example aspects of the cushioned mailer 1700 can further define the front panel 1730 and the rear panel 1740 (shown in FIG. 34) extending between the left and right sides 1750,1752. In the present aspect, the first sealing end 31112 can overlap and be affixed to the second sealing end 31114 at the front panel 1730. However, in other aspects, the first and second sealing ends 31112,31114 can be oriented within the first gusset 34120 or the second gusset 34122, or at the rear panel 1740.

The inner sheet 1920 can define the front inner portion 1932 (shown in FIG. 34) of the front panel 1730, and the outer sheet 1710 can define the front outer portion 1734 of the front panel 1730. Similarly, the inner sheet 1920 can define the rear inner portion 1942 (shown in FIG. 34) of the rear panel 1740, and the outer sheet 1710 can define the rear outer portion 1744 (shown in FIG. 34) of the rear panel 1740 opposite the rear inner portion 1942. The front inner portion 1932 of the cushioned mailer 1700 can face the rear inner portion 1942 of the cushioning sheet 700, and the inner cavity 1826 can be generally defined therebetween.

A bottom sealing flap 31120 can extend from the bottom end 1754 of the cushioned mailer 1700. Specifically, in the present aspect, the bottom sealing flap 31120 can extend from the rear outer portion 1744 of the outer sheet 1710. The bottom sealing flap 31120 can be configured to fold relative to the rear outer portion 1744 at a bottom flap fold line 31122. Furthermore, the bottom sealing flap 31120 can be attached to the front outer portion 1734 of the outer sheet 1710, as shown, to enclose the inner cavity 1826 at the bottom end 1754 of the cushioned mailer 1700. For example, the bottom sealing flap 31120 can be attached to the front outer portion 1734 by an adhesive, such as glue, for example and without limitation. In other aspects, the bottom sealing flap 31120 can be attached to the front outer portion 1734 by any other suitable fasteners or fastening techniques. Moreover, in other aspects, the bottom sealing flap 31120 can extend from the front outer portion 1734 of the outer sheet 1710 and can be attached to the rear outer portion 1744 to enclose the inner cavity 1826 at the bottom end 1754.

Figure 47:
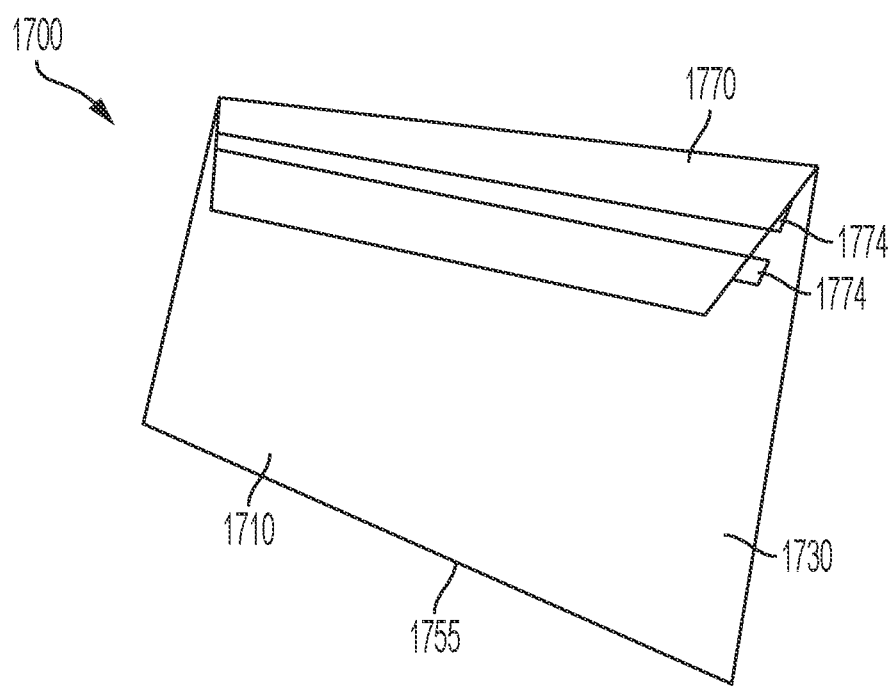
FIG. 47 is a front perspective of the cushioned mailer of FIG. 44 in a sealed configuration.

The cushioned mailer 1700 can be oriented in the open orientation (shown) and the closed orientation (shown in FIG. 47). The opening 1760 can be defined at the top end 1756 of the cushioned mailer 1700, which can allow access to inner cavity 1826. In the open orientation, access to the inner cavity 1826 through the opening 1760 can be permitted, while in the closed orientation, the opening 1760 can be sealed to prohibit access to the inner cavity 1826. The cushioned mailer 1700 can define the closure flap 1770 for selectively covering and uncovering the opening 1760 in the open and closed orientations, respectively. The closure flap 1770 can extend from the top end 1756 of the cushioned mailer 1700. Specifically, in the present aspect, the closure flap 1770 can extend from the rear outer portion 1744 of the outer sheet 1710 at the top end 1756. The closure flap 1770 can be configured to fold relative to the rear outer portion 1744 at a top flap fold line 31130 to cover the opening 1760. The closure flap 1770 can then be attached to the front outer portion 1734 of the outer sheet 1710, as shown in FIG. 47, to enclose the inner cavity 1826 at the top end 1756. For example, the closure flap 1770 can be attached to the front outer portion 1734 to retain the cushioned mailer 1700 in the closed orientation. In other aspects, the closure flap 1700 can extend from the front outer portion 1734 of the outer sheet 1710 and can be attached to the rear outer portion 1744 to enclose the inner cavity 1826 at the top end 1756.

In some aspects, a width of the closure flap 1770 can taper generally from the top end 1756 of the cushioned mailer 1700 to a distal flap end 31132 of the closure flap 1770. However, in other aspects, the width of the closure flap 1770 may not be tapered. In example aspects, the closure flap 1770 can comprise one or more of the adhesive strips 1772 extending substantially along the width of the closure flap 1770, generally from the left side 1750 to the right side 1752 of the cushioned mailer 1700. In the present aspect, the closure flap 1770 can comprise two of the adhesive strips 1772—an inner adhesive strip 1772*a* proximate to the top end 1756 and an outer adhesive strip 1772*b* proximate to the distal flap end 31132. The tear strip 20154 can be formed between the inner and outer adhesive strips 1772*a,b*, as shown, and can extend substantially along the width of the closure flap 1770. Each of the adhesive strips 1772 can be covered by a peelable backing 1774, which can be peeled away from the closure flap 1770 to expose the adhesive strip 1772.

The two adhesive strips 1772 can allow the cushioned mailer 1700 to be sealed in the closed orientation on two separate occasions. For example, the cushioned mailer 1700 can be sealed in the closed orientation on a first occasion with the outer adhesive strip 1772*b*. The tear strip 20154 can then be torn away from the cushioned mailer 1700 to facilitate opening the cushioned mailer 1700 from the sealed configuration. The cushioned mailer 1700 can then be re-sealed in the closed orientation on a second occasion with the inner adhesive strip 1772*a*. In other aspects, the closure flap 1770 can be sealed in the closed orientation by any other suitable fastener or fastening technique. In other aspects, the closure flap 1770 can comprise more or fewer of the adhesive strips 1772 and/or the tear strips 20154.

Figure 32:
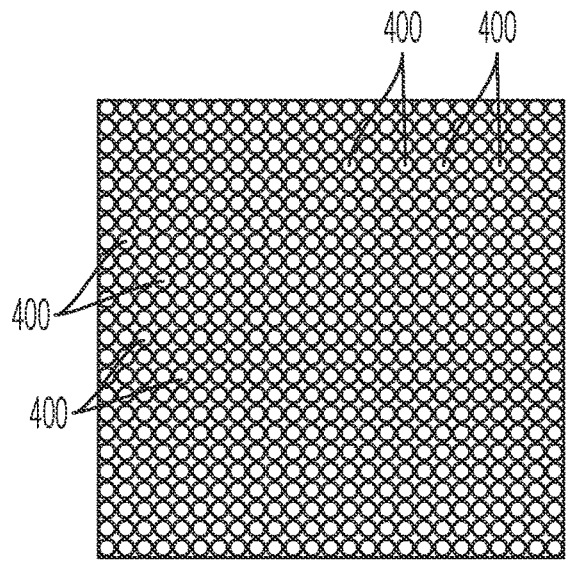
FIG. 32 is a close-up view of Detail A taken from FIG. 31.

FIG. 32 illustrates Detail A taken from FIG. 32, showing an example arrangement of the cushioning inserts 400 between the outer and inner sheets 1710,1920 (shown in FIG. 31) of the cushioned mailer 1700 (shown in FIG. 31). In example aspects, the cushioning inserts 400 can comprise a starch material, as previously described. Moreover, in example aspects, the cushioning inserts 400 can be substantially spherical in shape. In other aspects, the cushioning inserts 400 can comprise any other suitable material and/or can define any other suitable shape. In example aspects, as shown, the cushioning inserts 400 can be arranged in a single layer in a plurality of rows and columns and can substantially confront or contact adjacent ones of cushioning inserts 400. In other aspects, the cushioning inserts 400 may be stacked to define more than one layer of the cushioning inserts 400, and/or the cushioning inserts 400 can be arranged in any suitable pattern, and/or the cushioning inserts 400 can be spaced from adjacent cushioning inserts 400.

Figure 33:
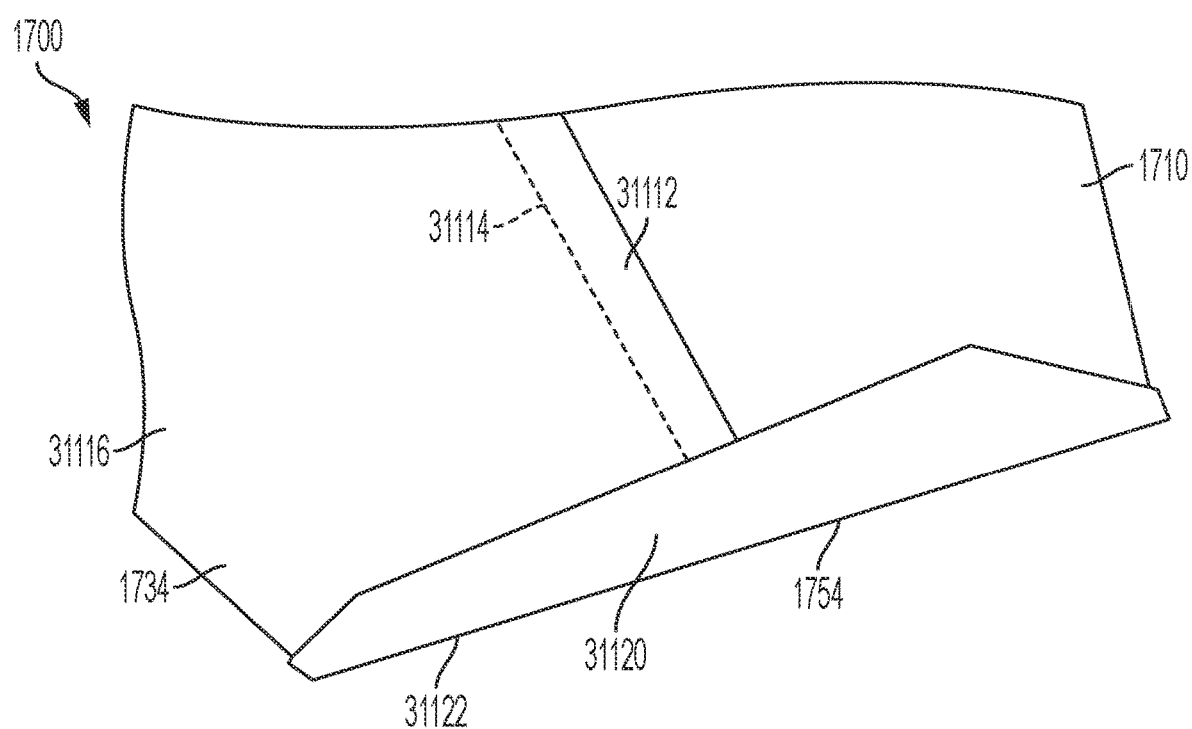
FIG. 33 is a perspective view of a bottom end of the cushioned mailer of FIG. 31.

FIG. 33 illustrates a detail view of the bottom end 1754 of the cushioned mailer 1700. As shown, the bottom sealing flap 31120 can be folded at the bottom end 1754 to define the bottom flap fold line 31122. The bottom sealing flap 31120 can be folded upward towards the front outer portion 1734 of the outer sheet 1710 and attached thereto to enclose the inner cavity 1826 (shown in FIG. 34) at the bottom end 1754. Also visible in FIG. 33 is the first sealing end 31112 of the cushioned mailer 1700, which can be folded over and secured to the second sealing end 31114 (indicated by the dashed line), as previously described to define the continuous mailer sidewall 31116 encircling the inner cavity 1826.

Figure 34:
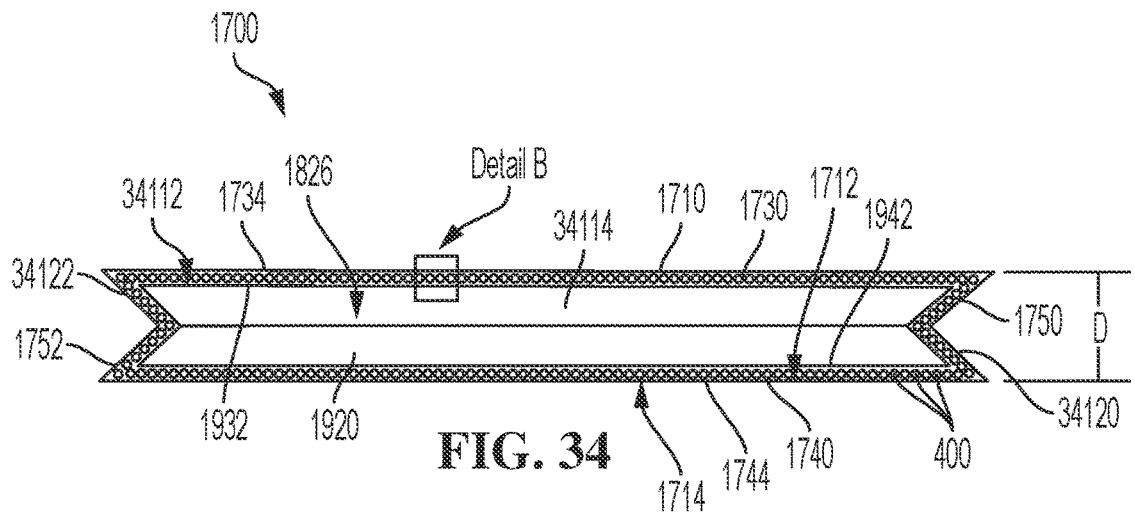
FIG. 34 is a cross sectional view of the cushioned mailer of FIG. 31 taken along line 34-34 in FIG. 31.

FIG. 34 illustrates a cross-sectional view of the cushioned mailer 1700 taken along line 34-34 in FIG. 31. The cushioned mailer 1700 can comprise the inner sheet 1920 and the outer sheet 1710. The inner sheet 1920 can define the inner surface 34112 and the outer surface 34114, and the outer sheet 1710 can define the inner surface 1712 and the outer surface 1714. The outer surface 34114 of the inner sheet 1920 can define the inner cavity 1826. The cushioning inserts 400 can be disposed between the inner sheet 1920 and the outer sheet 1710. The inner surface 34112 of the inner sheet 1920 and the inner surface 1712 of the outer sheet 1710 can face the cushioning inserts 400, as shown. As described previously, in some aspects, the cushioning inserts 400 can be attached to either or both of the outer and inner sheets 1710,1920, such as by an adhesive, for example and without limitation.

The cushioned mailer 1700 can define the front panel 1730 and the rear panel 1740 extending generally between the left and right sides 1750,1752. The inner sheet 1920 can define the front inner portion 1932 of the front panel 1730, and the outer sheet 1710 can define the front outer portion 1734 of the front panel 1730. The inner sheet 1920 can define the rear inner portion 1942 of the rear panel 1740, and the outer sheet 1710 can define the rear outer portion 1744 of the rear panel 1740. Additionally, in example aspects, the first and second gussets 34120,34122 can be formed at the left and right sides 1750,1752, respectively, of the cushioned mailer 1700. Each of the first and second gussets 34120, 34122 can define a substantially V-shaped cross-section extending inward towards inner cavity 1826. The first and second gussets 34120,34122 can allow for a depth D of the cushioned mailer 1700 to be adjusted to accommodate contents 1800 (shown in FIG. 18) of varying dimensions. Other aspects of the cushioned mailer 1700 may not comprise the first and second gussets 34120,34122.

According to example aspects, the first sealing end 31112 (shown in FIG. 35) of the cushioned mailer 1700 can be coupled to the second sealing end 31114 (shown in FIG. 35) of the cushioned mailer 1700 at Detail B of the front panel 1730. Referring to FIG. 35, which illustrates Detail B, a first outer sealing edge 35110 of the outer sheet 1710 can be sealed to a first inner sealing edge 35112 of the inner sheet 1920 to seal the cushioned mailer 1700 at the first sealing end 31112 thereof. For example, the first outer sealing edge 35110 can be sealed to the first inner sealing edge 35112 by an adhesive, such as glue for example and without limitation, or any other suitable fastener known in the art. Similarly, a second outer sealing edge 35114 of the outer sheet 1710 can be sealed to a second inner sealing edge 35116 of the inner sheet 1920 to seal the cushioned mailer 1700 at the second sealing end 31114 thereof, such as with an adhesive or any other suitable fastener. The first and second sealing ends 31112,31114 of the cushioned mailer 1700 can aid in retaining the cushioning inserts 400 between the outer sheet 1710 and the inner sheet 1920.

To form the continuous mailer sidewall 31116 (shown in FIG. 31) of the cushioned mailer 1700 (shown in FIG. 31)

and to encircle the inner cavity 1826 thereof, the first sealing end 31112 can be folded over the second sealing end 31114, as shown. The overlapping first and second sealing ends 31112,31114 can define an outer sealing seam 35118 and an inner sealing seam 35120. The first sealing end 31112 can further be secured to the second sealing end 31114, such as by an adhesive, for example and without limitation, or any other suitable fastener known in the art. In some aspects, the first and second sealing ends 31112,31114 can be compressed or crushed, as shown, to reduce or taper a thickness of each of the first and second sealing ends 31112,31114. Compressing or crushing the first and second sealing ends 31112,31114 can compress any of the cushioning inserts 400 disposed between the outer sheet 1710 and the inner sheet 1920 at the first and second sealing ends 31112,31114, as shown, thereby allowing the overlapping first and second sealing ends 31112,31114 to lie substantially flush with the remainder of the front panel 1730.

Figure 36:
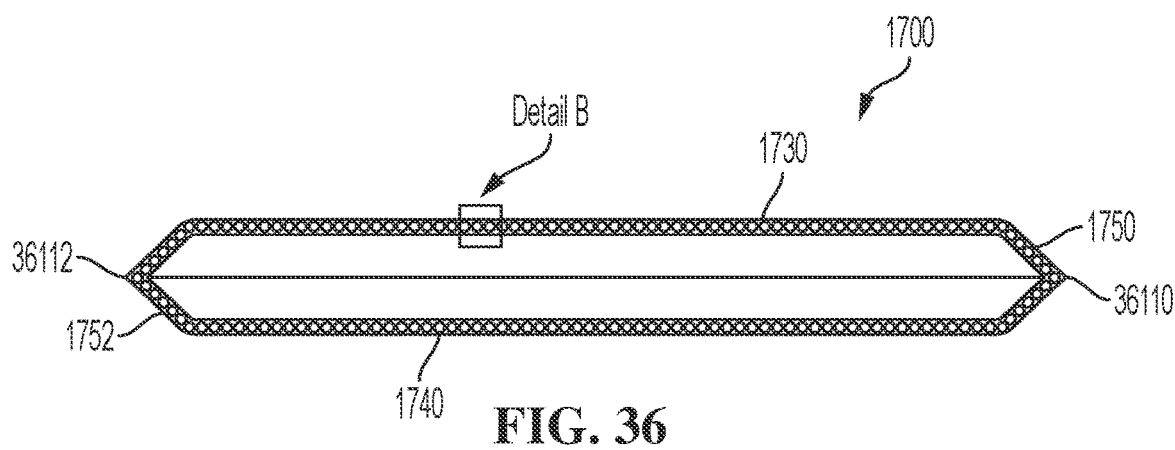
FIG. 36 is a cross-sectional view of the cushioned mailer in accordance with another example aspect of the present disclosure.

FIG. 36 illustrates a cross-sectional view of the cushioned mailer 1700 according to another aspect of the present disclosure, wherein the cushioned mailer 1700 does not comprise the first and second gussets 34120,34122 (shown in FIG. 34) at the left and right sides 1750,1752 thereof. Rather, in the present aspect, the cushioned mailer 1700 can be folded to form the simple left bend line 36110 between the front and rear panels 1730,7140 at the left side 1750 and the simple right bend line 36112 between the front and rear panels 1730,1740 at the right side 1752.

Figure 37:
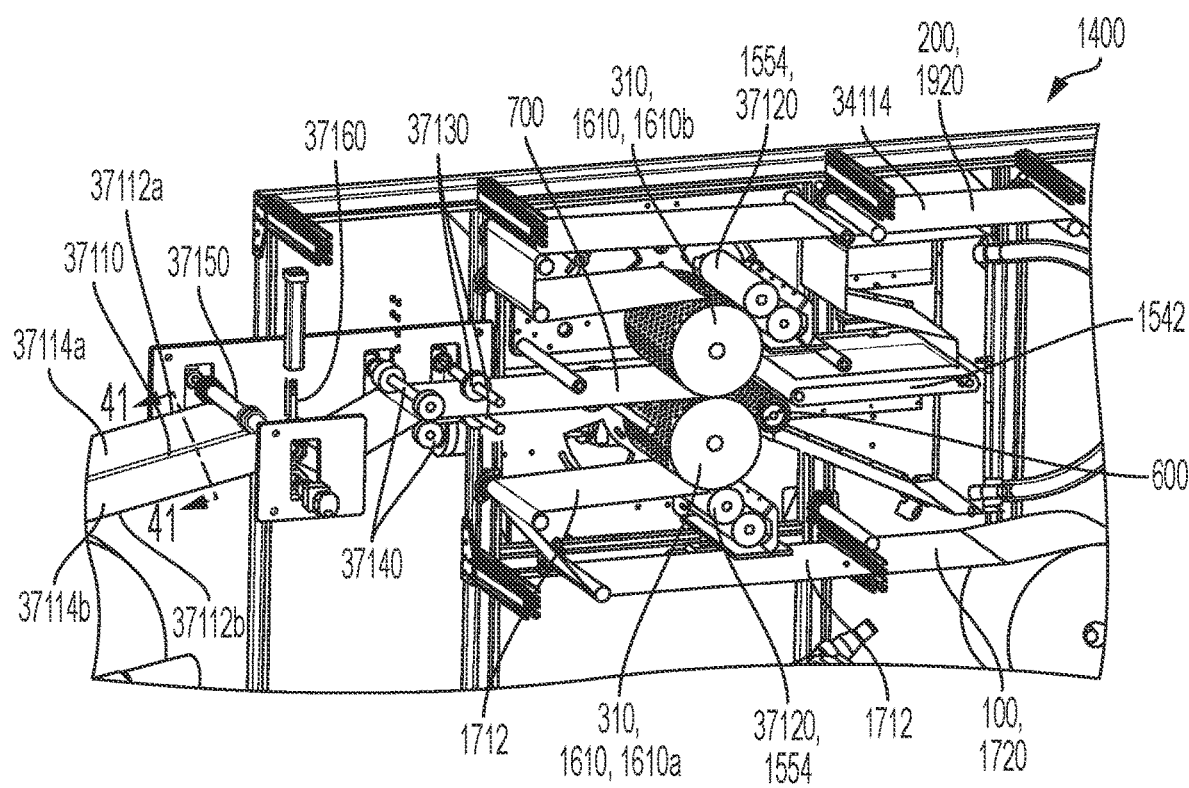
FIG. 37 is a perspective view of the rolling machine in accordance with another aspect of the present disclosure.
Figure 38:
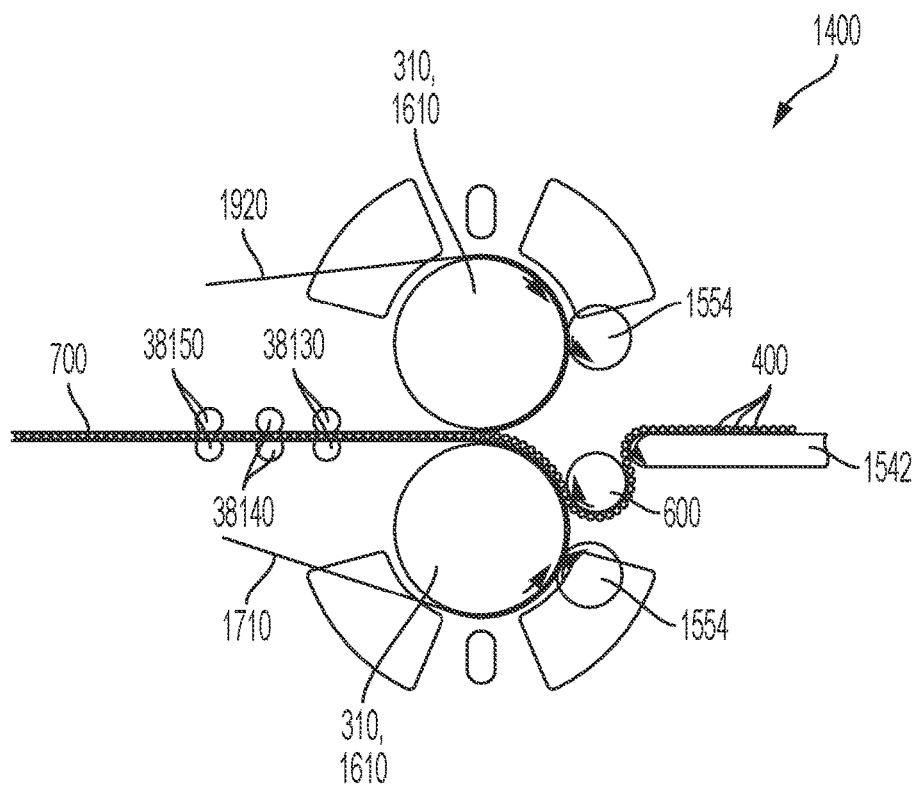
FIG. 38 is a front view of a schematic of the rolling machine of FIG. 37.

FIG. 37 illustrates a perspective view of the rolling machine 1400 and FIG. 38 illustrates a schematic of the rolling machine 1400, in accordance with another example aspect of the disclosure. The rolling machine 1400 of the present aspect can be configured to produce another example aspect of the cushioning sheet 700, which can then be formed into the cushioned mailer 1700 (shown in FIG. 31). In example aspects, the outer sheet 1710 of the cushioned mailer 1700 can be formed from the first layer 100, and the inner sheet 1920 of the cushioned mailer 1700 can be formed from the second layer 200. Each of the first and second layers 100,200 can be simultaneously fed into the rolling machine 1400 as previously described. Furthermore, each of the first and second layers 100,200 can be substantially smooth prior to passing through the rolling machine 1400. In some aspects, the first and second layers 100,200 can also remain substantially smooth after passing through the rolling machine 1400. According to example aspects, the rolling machine 1400 can comprise the pair of first layer rollers 310, which can be the female rollers 1610. In some aspects, the first layer rollers 310 can define the socket indentations 314 (shown in FIG. 3), as previously described. In other aspects, however, the first layer rollers 310 can be substantially smooth. In the present aspect, the rolling machine 1400 does not comprise the second layer rollers 320 (i.e., the male rollers 1620, both shown in FIG. 16).

The rolling machine 1400 can further comprise a pair of the adhesive rollers 1554 configured to apply the adhesive 240 (shown in FIG. 2) to the first and second layers 100,200. More specifically, as shown, the first layer 100 can be fed between a first one of the adhesive rollers 1554a and a first one of the female rollers 1610a to apply the adhesive 240 to the inner surface 1712 of the first layer 100 (i.e., the outer sheet 1710). Likewise, the second layer 200 can be fed between a second one of the adhesive rollers 1554b and a second one of the female rollers 1610b to apply the adhesive 240 to the inner surface 34112 of the second layer 200 (i.e., the inner sheet 1920). In the present aspect, the adhesive rollers 1554 can be gravure rollers 37120 (i.e., engraved rollers), which can deposit strips of the adhesive 240 onto the first and second layers 100,200. In the present aspect, neither the first layer 100 nor the second layer 200 is biased into the socket indentations 314 of the corresponding female roller 1610 when fed between the corresponding adhesive roller 1554 and female roller 1610, and the first and second layers 100,200 can thereby remain substantially smooth upon passing therebetween.

Once the strips of adhesive 240 have been applied to the first layer 100 and the second layer 200 by the corresponding adhesive rollers 1554, the cushioning inserts 400 (shown in FIG. 38) can be deposited onto the inner surface 1712 of the first layer 100. Example aspects of the rolling machine 1400 can comprise the vacuum roller 600 for picking up the cushioning inserts 400 from the conveyor belt 1542 and depositing them onto the first layer 100. The conveyor belt 1542 may or may not be configured to vibrate as previously described. The cushioning inserts 400 can be transported along the conveyor belt 1542 and can be suctioned into the corresponding insert indentations 604 (shown in FIG. 6) of the vacuum roller 600. The vacuum roller 600 can then rotate the cushioning inserts 400 towards the first layer 100. Once the cushioning inserts 400 are proximate to or in contact with the inner surface 1712 of the first layer 100, the suction force can be reduced or paused to release the cushioning inserts 400 from the corresponding insert indentations 604 onto the inner surface 1712 of the first layer 100. The cushioning inserts 400 can further adhere to the strips of the adhesive 240 applied to the inner surface 1712 of the first layer 100 to retain the cushioning inserts 400 on the first layer 100.

Figure 41:
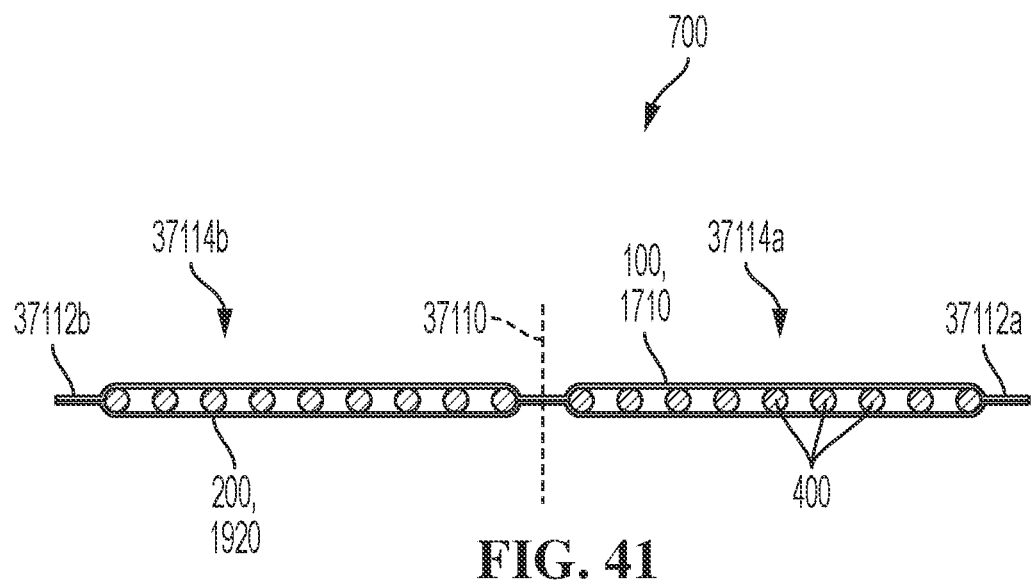
FIG. 41 is a cross-sectional view of the cushioning sheet in accordance with another example aspect of the present disclosure, taken along line 41-41 in FIG. 37.

Once the cushioning inserts 400 have been deposited on the first layer 100, each of the first and second layers 100,200 can be simultaneously passed between the pair of first layer rollers 310 (i.e., the female rollers 1610), as previously described. The strips of adhesive 240 applied to the inner surface 34112 of the second layer 200 can adhere to the cushioning inserts 400, such that cushioning inserts 400 can be attached to both the first and second layers 100,200 (i.e., the outer and inner sheets 1710,1920). In example aspects, the pair of female rollers 1610 can be spaced to only lightly contact the outer surfaces 1712,34114 of the smooth first and second layers 100,200, respectively, without (or only minimally) pressing the first and second layers 100,200 into the corresponding socket indentations 314. The first and second layers 100,200 can thereby remain substantially smooth after passing between the female rollers 1610, as shown in FIG. 41, and the cushioning inserts 400 can retain their volume.

In other aspects, however, the female rollers 1610 can be positioned closer together to bias the first and second layers 100,200 into the socket indentations 314. In some aspects, the inner surface 1712 of the first layer 100 can be adhered to the inner surface 34112 of the second layer between adjacent cushioning inserts 400, thereby forming the cushioning sockets 42110 (shown in FIG. 42) in the first and second layers 100,200. Each of the cushioning inserts 400 can be received in a corresponding one of the cushioning sockets 42110 as previously described. In other aspects, the first layer rollers 310 may or may not define the socket indentations 604, and the first layer rollers 310 can be configured to crush or compress the cushioning inserts 400 between the first and second layers 100,200, without forming the cushioning sockets 42110. That is, the cushioning inserts 400 can be compressed without adhering the first and second layers 100,200 together between adjacent cushioning inserts 400. Thus, the first and second layers 100,200 can remain substantially smooth with the cushioning inserts 400 compressed therebetween to reduce an overall thickness of the cushioning sheet 700.

The cushioning sheet 700 can then be fed between a pair of center nip rollers 37130 and a pair of outer nip rollers 37140. The center nip rollers 37130 can press the first and second layers 100,200 together along a centerline 37110 of the cushioning sheet 700, and first and second layers 100, 200 can be sealed together along the centerline 37110 by the adhesive 240 applied thereto. Similarly, the outer nip rollers 37140 can press and seal the first and second layers 100,200 together along opposing first and second sheet sides 37112a,b of the cushioning sheet 700. (FIG. 41, described in further detail below, illustrates a cross-sectional view of the cushioning sheet 700 after passing between the center nip rollers 37130 and the outer nip rollers 37140.)

The cushioning sheet 700 can then be fed between a pair of slicing rollers 37150, which can cut the cushioning sheet 700 lengthwise along the centerline 37110 into elongated first and second sheet strips 37114a,b. The slicing rollers 37150 can also trim the first and second sheet sides 37112a,b of the cushioning sheet 700 in some aspects. According to example aspects, the rolling machine 1400 can comprise a tensioner 37160 disposed between the outer nip rollers 37140 and the slicing rollers 37150. The tensioner 37160 can be configured to engage and tension the cushioning sheet 700 prior to slicing the cushioning sheet 700 with the slicing rollers 37150. In example aspects, each of the sheet strips 37114a,b can be about 12" wide; however, in other aspects, the width of the sheet strips 37114a,b can vary. In other aspects, the cushioning sheet 700 can be cut into additional sheet strips 37114a,b, and/or the cushioning sheet 700 may not be cut into the sheet strips 37114a,b. Moreover, in other aspects, the first and second layers 100,200 may not be sealed together along the centerline 37110 and may only be sealed at the first and second sheet sides 37112a,b.

Figure 39:
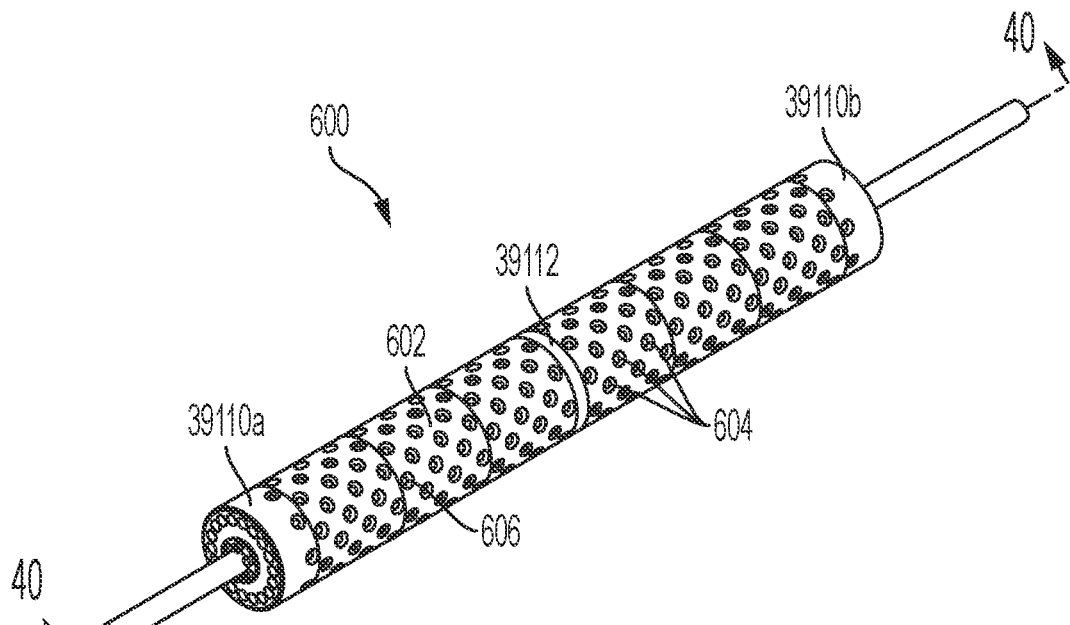
FIG. 39 is a perspective view of the vacuum roller in accordance with another aspect of the present disclosure.
Figure 40:
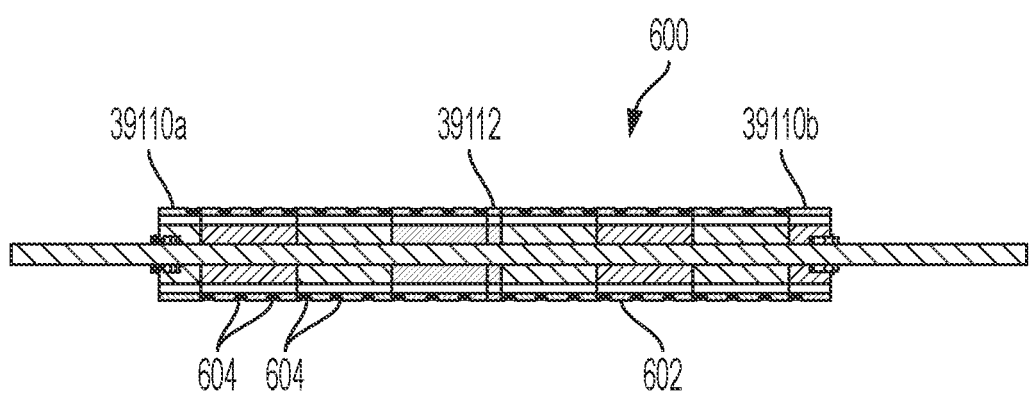
FIG. 40 is a cross-sectional view of the vacuum roller of FIG. 39 taken along line 40-40 in FIG. 39.

FIG. 39 illustrates a perspective view of the vacuum roller 600 according to another example aspect of the present disclosure, and FIG. 40 illustrates a cross-sectional view of the vacuum roller 600 taken along line 40-40 in FIG. 39. The vacuum roller 600 can define the substantially cylindrical outer surface 602 and the plurality of insert indentations 604 formed therein, each of which can be configured to pick up and retain one of the cushioning inserts 400 (shown in FIG. 4). Each of the insert indentations 604 can comprise the vacuum port 606 configured to suction a corresponding one of the cushioning inserts 400 into the insert indentation 604. In example aspects, the vacuum roller 600 can define substantially smooth opposing first and second outer roller ends 39110a,b and a substantially smooth center roller portion 39112, where none of the insert indentations 604 are formed. The center roller portion 39112 of the vacuum roller 600 can be configured to align along the centerline 37110 (shown in FIG. 37) of the cushioning sheet 700 (shown in FIG. 37) such that none of the cushioning inserts 400 are deposited along the centerline 37110, which can facilitate pressing and sealing the first and second layers 100,200 (shown in FIG. 37) together along the centerline 37110. Similarly, the opposing first and second outer roller ends 39110a,b of the vacuum roller 600 can be configured to align along the opposing first and second sheet sides 37112a,b (shown in FIG. 37) of the cushioning sheet 700 such that none of the cushioning inserts 400 are deposited along the first and second sheet sides 37112a,b, which can facilitate pressing and sealing the first and second layers 100,200 together along the first and second sheet sides 37112a,b.

FIG. 41 illustrates a cross-sectional view of the cushioning sheet 700 sectioned into the first and second sheet strips 37114a,b. As shown, the cushioning sheet 700 can comprise the first layer 100 (e.g., the outer sheet 1710), the second layer 200 (e.g., the inner sheet 1920), and the plurality of the cushioning inserts 400 disposed therebetween. In the present aspect, each of the first and second layers 100,200 can be substantially smooth and do not define the cushioning sockets 42110 (shown in FIG. 42). The first and second layers 100,200 can be sealed together along the centerline 37110 of the cushioning sheet 700 and at the opposing first and second sheet sides 37112a,b, as previously described. In example aspects, the cushioning sheet 700 can further be cut along the centerline 37110 to separate the first sheet strip 37114a from the second sheet strip 37114b.

The cushioning sheet 700 can be used to form the cushioned mailer 1700 (shown in FIG. 31). In example aspects, the first layer 100 of the cushioning sheet 700 can define the outer sheet 1710 of the cushioned mailer 1700, and the second layer 200 of the cushioning sheet 700 can define the inner sheet 1920 of the cushioned mailer 1700. When the cushioning sheet 700 is sliced along the centerline 37110 to separate the first and second sheet strips 37114a,b, the first sheet strip 37114a can be used to form a first one of the cushioned mailers 1700, and the second sheet strip 37114b can be used to form a second one of the cushioned mailers 1700.

FIG. 42 illustrates a cross-sectional view of the cushioning sheet 700 sectioned into the first and second sheet strips 37114a,b according to another example aspect of the disclosure. In the present aspect, the first and second layers 100,200 can define the cushioning sockets 42110 (e.g., the first sockets 130 in the first layer 100 and the second sockets 230 in the second layer 200) for receiving the cushioning inserts 400 therein. In some aspects, the first and second layers 100,200 can be sealed together between adjacent cushioning inserts 400, such as by the adhesive 240 (shown in FIG. 2). In other aspects, the first and second layers 100,200 may not be sealed together between adjacent cushioning inserts 400, but can simply can be biased towards one another between the adjacent cushioning inserts 400 to define less pronounced cushioning sockets 42110.

Figure 43:
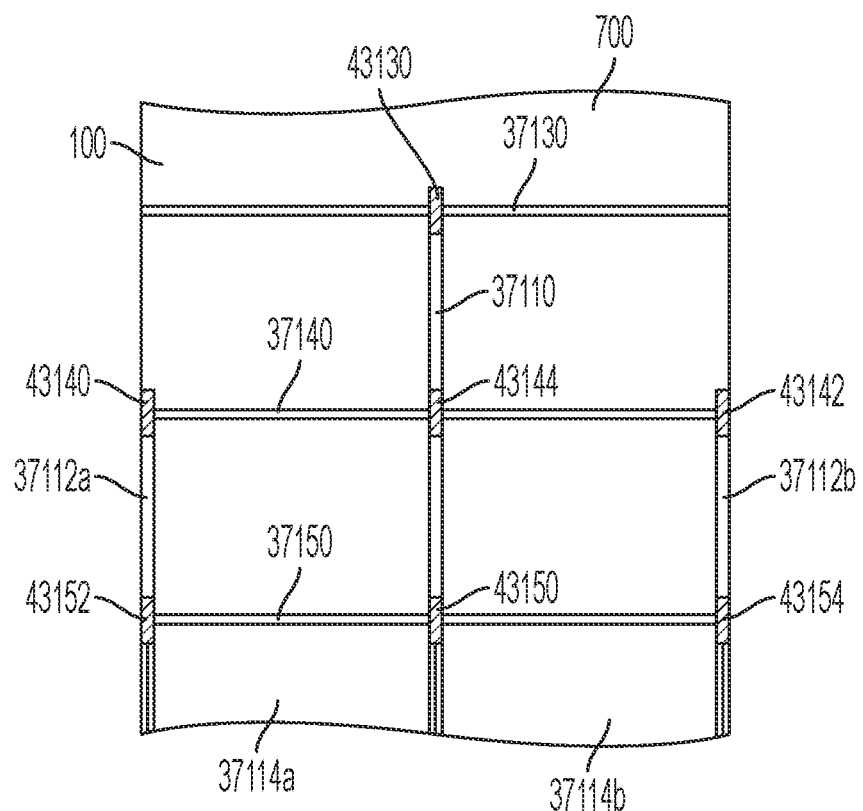
FIG. 43 is a top view of a schematic of the rolling machine of FIG. 37.
Figure 44:
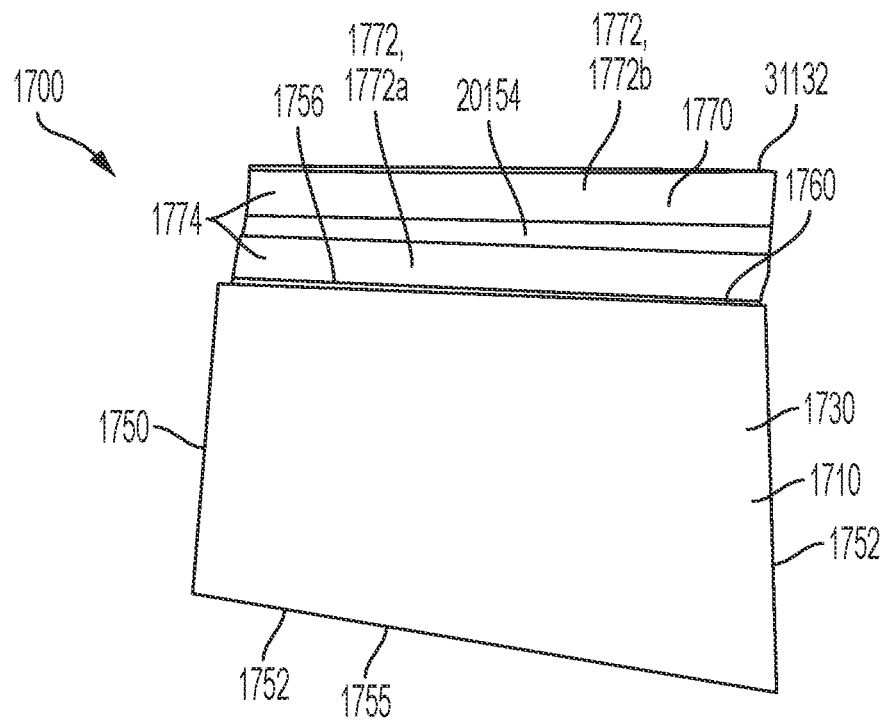
FIG. 44 is a front perspective view of the cushioned mailer in accordance with another example aspect of the present disclosure, wherein the cushioned mailer is in an unsealed configuration.
Figure 45:
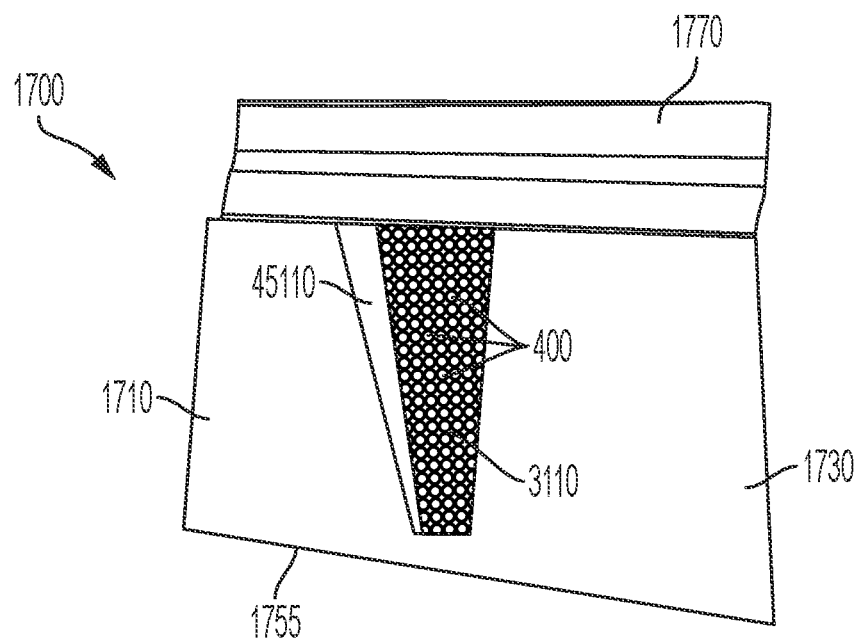
FIG. 45 is another front perspective view of the cushioned mailer of FIG. 44, where a portion of an outer layer of the cushioned mailer is peeled back.

FIG. 43 illustrates a top view of the cushioning sheet 700 being fed through the center nip rollers 37130 to press and seal the first and second layers 100,200 (second layer 200 shown in FIG. 37) together along the centerline 37110 and the outer nip rollers 37140 to press and seal the first and second layers 100,200 together along the opposing first and second sheet sides 37112a,b. Each of the center nip rollers 37130 can comprise a center wheel 43130, and the first and second layers 100,200 can be pressed together along the centerline 37110 between the center wheels 43130. Similarly, each of the outer nip rollers 37140 can define a first outer wheel 43140 and an opposite second outer wheel 43142. The first and second layers 100,200 can be pressed together at the first sheet side 37112a between the first outer wheels 43140 and at the second sheet side 37112b between the second outer wheels 43142. In some aspects, each of the outer nip rollers 37140 can also comprise a secondary center wheel 43144 to further press the first and second layers 100,200 together along the centerline 37110. However, other aspects of the outer nip rollers 37140 may not comprise the secondary center wheels 43144.

FIG. 43 also shows the cushioning sheet 700 being fed through the slicing rollers 37150 to cut the cushioning sheet 700 along the centerline 37110 and to trim the cushioning sheet 700 at the first and second sheet sides 37112a,b. As shown, either or both of the slicing rollers 37150 can comprise a slicing wheel 43150 configured to cut the cushioning sheet 700 into the first and second sheet strips 37114*a,b*. Either or both of the slicing rollers 37150 can also comprise a first outer trim wheel 43152 and a second outer trim wheel 43154. The first outer trim wheel(s) 43152 can trim the cushioning sheet 700 along the first sheet side 37112*a* thereof, and the second outer trim wheel(s) 43154 can trim the cushioning sheet 700 along the second sheet side 37112*b* thereof.

FIGS. 44-47 illustrate the cushioned mailer 1700 according to another example aspect of the present disclosure. Similar to the cushioned mailer 1700 of FIG. 31, the present cushioned mailer 1700 can comprise the outer sheet 1710 and the inner sheet 1920 (shown in FIG. 46). The inner sheet 1920 can generally define the inner cavity 1826 (shown in FIG. 46) of the cushioned mailer 1700, within which contents 1800 (shown in FIG. 18) can be received. In the present aspect, both the outer sheet 1710 and the inner sheet 1920 can be formed as a substantially planar paper sheet, though in other aspects, the outer sheet 1710 and/or the inner sheet 1920 can define the cushioning sockets 42110 (shown in FIG. 42). The cushioned mailer 1700 can further comprise the intermediate cushioning layer 31110 (shown in FIG. 45) disposed between the outer sheet 1710 and the inner sheet 1920, which in the present aspect can comprise the plurality of the cushioning inserts 400 (shown in FIG. 45). A flap portion 45110 of the outer sheet 1710 is folded back in the present view to show the cushioning inserts 400.

Example aspects of the cushioned mailer 1700 can define the left side 1750, the right side 1752, the bottom end 1754, and the top end 1756. As shown, each of the left side 1750 and the right side 1752 of the cushioned mailer 1700 can extend substantially vertically between the top end 1756 and the bottom end 1754. The first and second gussets 34120, 34122 (shown in FIG. 46) can be formed at the left and right sides 1750,1752, respectively. The cushioned mailer 1700 can further define the front panel 1730 and the rear panel 1740 (shown in FIG. 46) extending between the left and right sides 1750,1752. The opening 1760 can be defined at the top end 1756 of the cushioned mailer 1700, which can allow access to inner cavity 1826. The cushioned mailer 1700 can define the closure flap 1770 extending from the top end 1756 thereof for selectively covering and uncovering the opening 1760 in the open and closed orientations, respectively.

The closure flap 1770 can comprise one or more of the adhesive strips 1772 extending substantially from the left side 1750 to the right side 1752 of the cushioned mailer 1700. In the present aspect, the closure flap 1770 comprises the inner adhesive strip 1772*a* proximate to the top end 1756 and the outer adhesive strip 1772*b* proximate to the distal flap end 31132. The tear strip 20154 can be formed between the inner and outer adhesive strips 1772*a,b*, as shown. Each of the adhesive strips 1772 can be selectively covered by the peelable backing 1774, which can be peeled away from the cushioned mailer 1700 to expose the adhesive strip 1772. The cushioned mailer 1700 can be sealed in the closed orientation on a first occasion with the outer adhesive strip 1772*b*. The tear strip 20154 can then be torn away from the cushioned mailer 1700 to facilitate opening the cushioned mailer 1700 from the sealed configuration. The cushioned mailer 1700 can then be re-sealed in the closed orientation on a second occasion with the inner adhesive strip 1772*a*.

In the present aspect, the cushioned mailer 1700 does not comprise the bottom sealing flap 31120 (shown in FIG. 31). Furthermore, the first sealing end 31112 (shown in FIG. 31) is not folded over and coupled to the second sealing end 31114 (shown in FIG. 31) at the front panel 1730, as previously described. Rather, in the present aspect, the cushioned sheet 700 forming the cushioned mailer 1700 can be folded over onto itself at the bottom end 1754 and sealed at the left side 1750 and the right side 1752, similar to the embodiment shown in FIGS. 17-19. As shown, the cushioned mailer 1700 can define the bottom fold line 1755 at the bottom end 1754 thereof. Moreover, the left and right sealing flaps 1930*a,b* (shown in FIG. 58) can be defined at the left and right sides 1750,1752, respectively.

In the present aspect, a first edge portion 58120 (shown in FIG. 58) of the outer sheet 1710 can extend outward beyond the inner sheet 1720 and the intermediate cushioning layer 31110 to define the left sealing flap 1930*a*, and a second edge portion 58122 (shown in FIG. 58) of the outer sheet 1710 can extend outward beyond the inner sheet 1720 and the intermediate cushioning layer 31110 to define the right sealing flap 1930*b*. As previously described, in the folded orientation, the left sealing flap 1930*a* can be folded over and secured to itself to seal the cushioned mailer 1700 at the left side 1750 thereof, and the right sealing flap 1930*b* can be folded over and secured to itself to seal the cushioned mailer 1700 at the right side 1752 thereof. The cushioned mailer 1700 can be sealed at the left and right sides 1750, 1752 thereof by an adhesive, such as glue for example, or any other suitable fastener or fastening technique known in the art.

Figure 46:
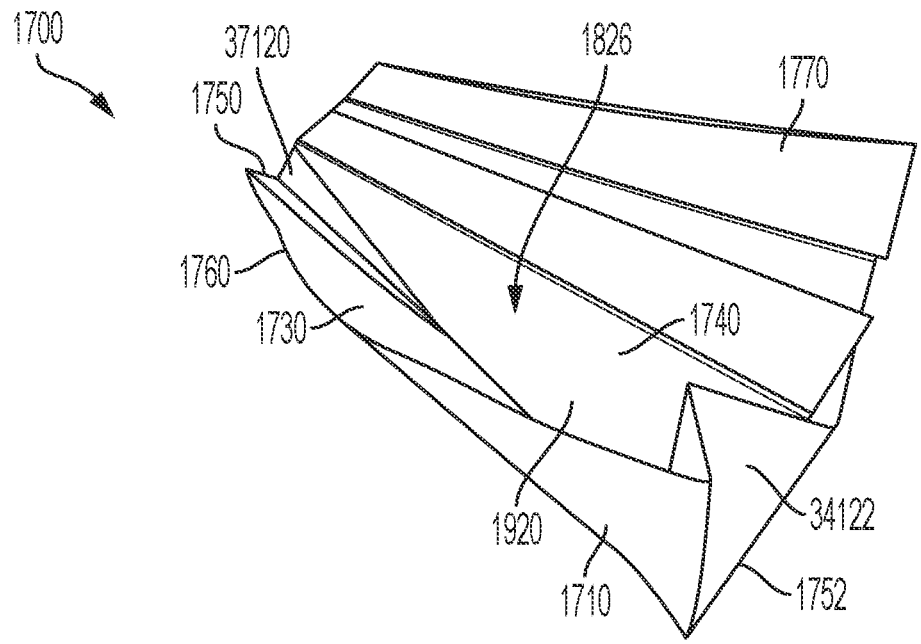
FIG. 46 is a top perspective view of the cushioned mailer of FIG. 44.

As shown in FIG. 46, the cushioned mailer 1700 can further be folded inward at the left and right sides 1750,1752 thereof to define the first and second gussets 34120,34122. FIG. 47 illustrates the cushioned mailer 1700, wherein the closure flap 1770 can be folded over the opening 1760 (shown in FIG. 46) of the inner cavity 1826 (shown in FIG. 46). In example aspects, each of the peelable backings 1774 can extend outward beyond the closure flap 1770 in the present aspect, as described in further detail below with respect to FIGS. 48-50. One of the peelable backings 1774 can be removed from the corresponding adhesive strip 1772 (shown in FIG. 44) and sealed to the front panel 1730 in the closed orientation.

Figure 48:
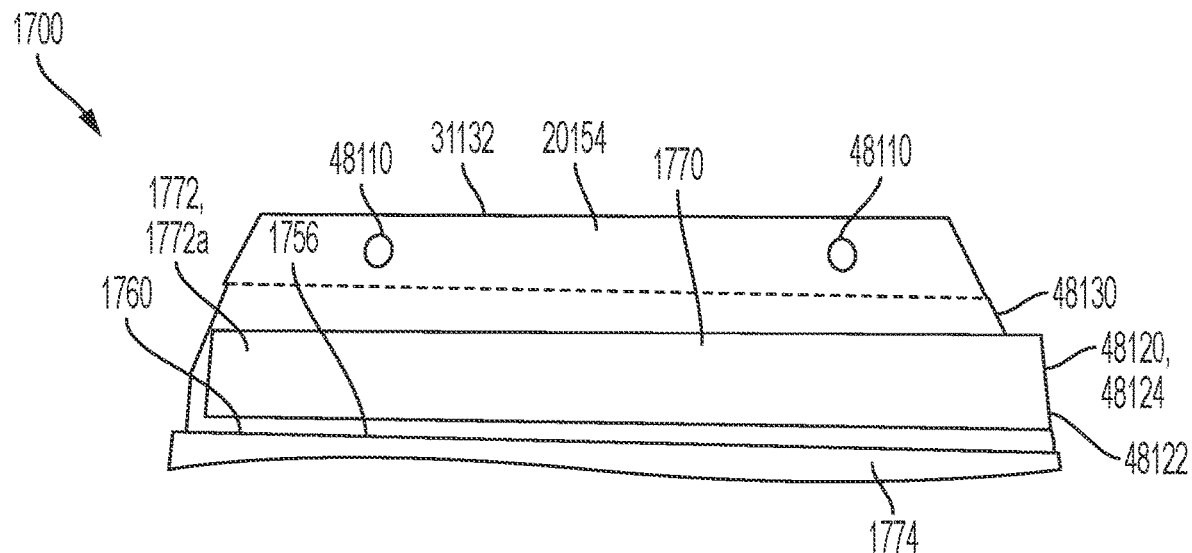
FIG. 48 is a front view of a closure flap of the cushioned mailer in accordance with another example aspect of the disclosure.
Figure 49:
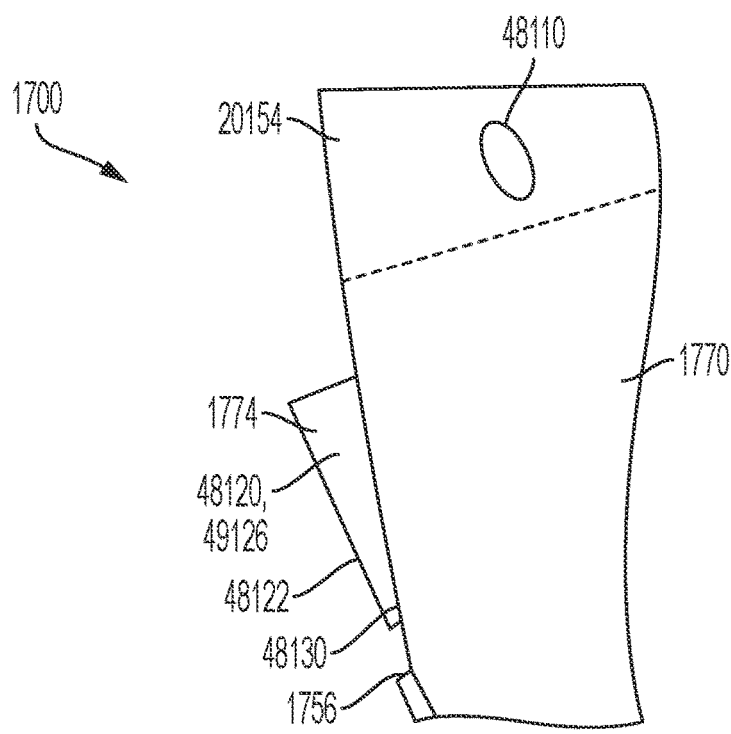
FIG. 49 is a rear perspective view of the closure flap of FIG. 48.
Figure 50:
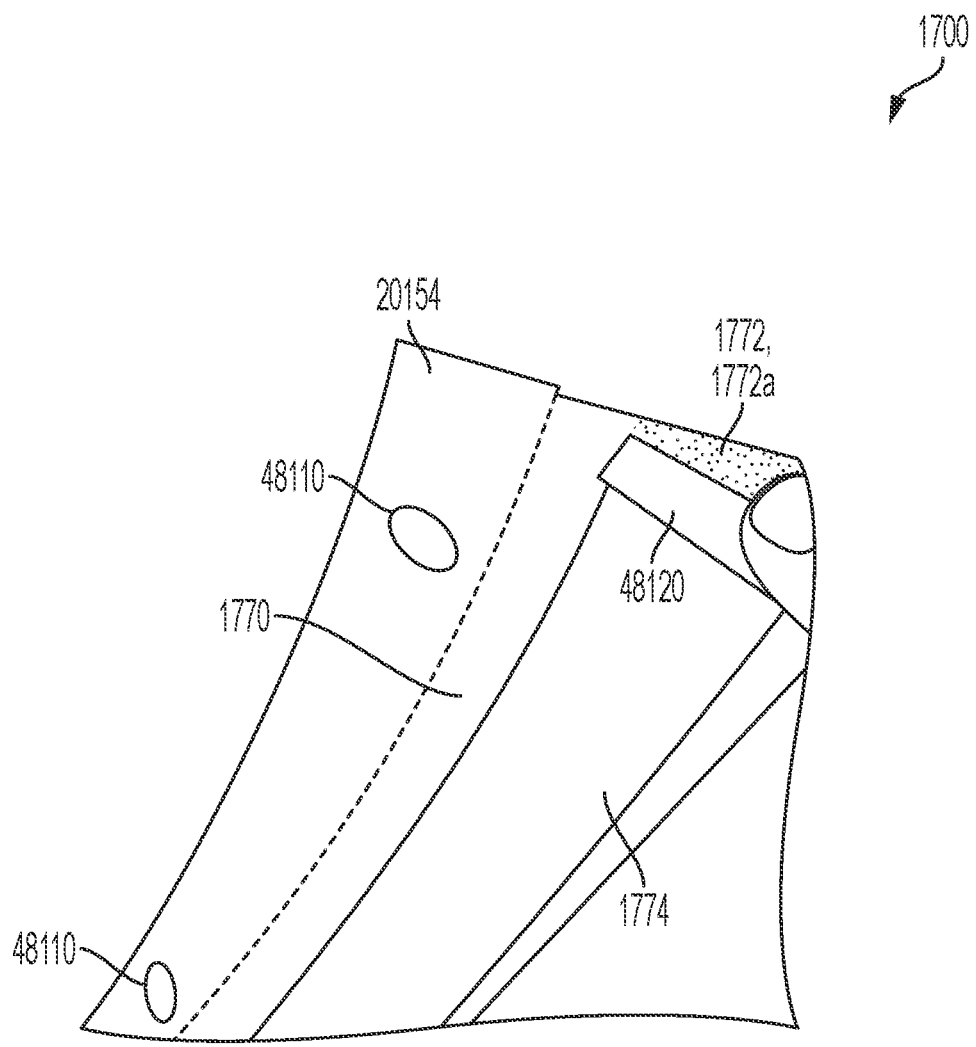
FIG. 50 is a front perspective view of the closure flap of FIG. 48.

FIGS. 48-50 illustrate the closure flap 1770 of the cushioned mailer 1700 according to another example aspect of the present disclosure. As shown, the closure flap 1700 can comprise the tear strip 20154 and one or more of the adhesive strips 1772. For example, in the present aspect, the closure flap 1770 comprises the inner adhesive strip 1772*a* only, though other aspects of the closure flap 1770 can comprise additional adhesive strips 1772. The inner adhesive strip 1772*a* can be disposed proximate to the opening 1760, and the tear strip 20154 can be disposed distal to the opening 1760, proximate to the distal flap end 31132.

In example aspects, one or more hanging holes 48110 can be formed through the tear strip 20154. The hanging holes 48110 can be configured to receive a hanger device therethrough to suspend the cushioned mailer 1700 therefrom in an upright, vertical orientation (i.e., with the top end 1756 of the cushioned mailer 1700 vertically above the bottom end 1754, shown in FIG. 17). Hanging the cushioned mailer 1700 in such a vertical orientation can facilitate locating and retrieving the cushioned mailer 1700 for use. Additionally, hanging the cushioned mailer 1700 in the vertical orientation can facilitate inserting contents 1800 (shown in FIG. 18) downwardly into the inner cavity 1826 (shown in FIG. 46) through the opening 1760, such as at a packaging facility. Once the contents 1800 have been loaded into the inner cavity 1826, the cushioned mailer 1700 can be separated from the tear strip 20154 to dismount the cushioned mailer 1700 from the hanger device. In some aspects, the tear strip 20154 can remain attached to the hanger device when the cushioned mailer 1700 is separated therefrom. In other aspects, the cushioned mailer 1700 can be removed from the hanger device with the tear strip 20154 still attached thereto, and the tear strip 20154 can later be separated from the cushioned mailer 1700. Two of the hanging holes 48110 are shown in the present aspect; however, in other aspects, the closure flap 1770 can comprise more or fewer hanging holes 48110.

As shown, the adhesive strip 1772 can be covered by the peelable backing 1774 prior to sealing the cushioned mailer 1700 in the closed orientation. In example aspects, the peelable backing 1774 can define an overhanging tab 48120 at a first backing end 48122 of the peelable backing 1774. The overhanging tab 48120 can extend beyond a flap side edge 48130 of the closure flap 1770, such that the overhanging tab 48120 is exposed at both a front backing side 48124 and an opposite rear backing side 49126 (shown in FIG. 49) of the peelable backing 1774. The overhanging tab 48120 of the peelable backing 1774 can be easily gripped and pulled by a user to facilitate removing the peelable backing 1774 from the adhesive strip 1772. FIG. 50 illustrates the overhanging tab 48120 being pulled away from the adhesive strip 1772.

Figure 51:
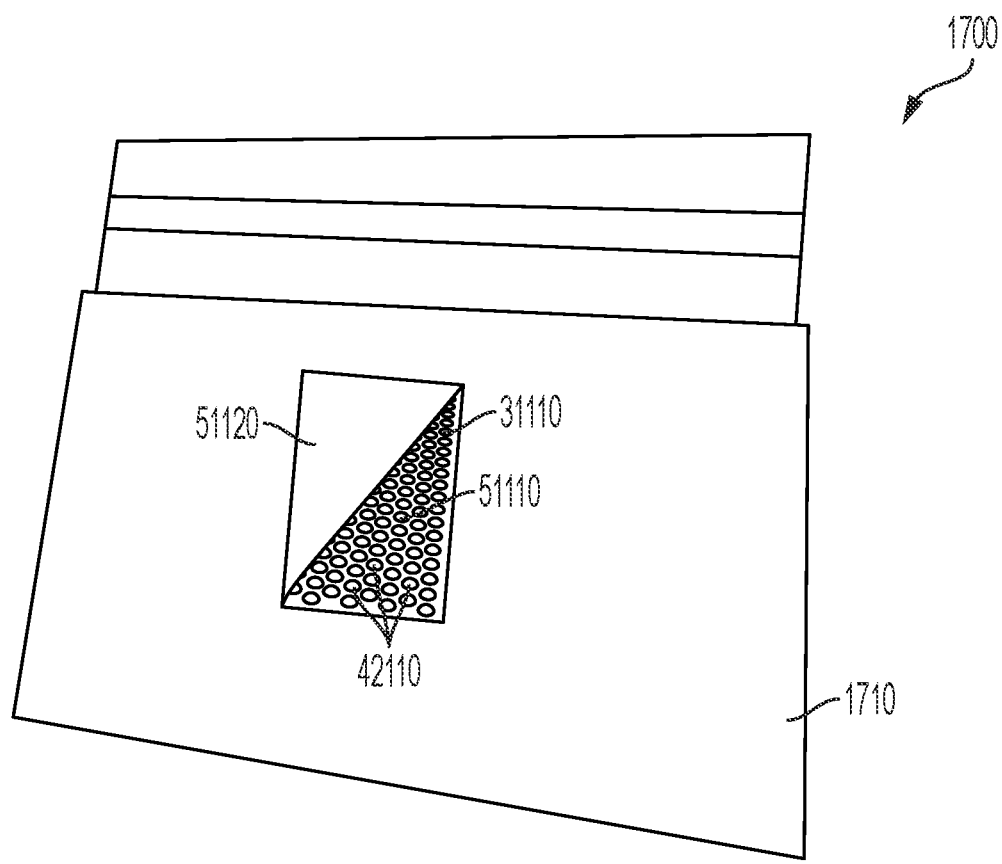
FIG. 51 is a from view of the cushioned mailer in accordance with another aspect of the present disclosure, where a portion of the outer layer is peeled back.

FIG. 51 illustrates the cushioned mailer 1700 according to another example aspect of the present disclosure. The cushioned mailer 1700 of FIG. 51 can be substantially similar to the cushioned mailer 1700 of FIGS. 44-47; however, in the present aspect, the intermediate cushioning layer 31110 disposed between the outer sheet 1710 and the inner sheet 1920 (shown in FIG. 19) can comprise a textured sheet 51110 instead of the cushioning inserts 400 (shown in FIG. 45). The textured sheet 51110 can be formed as previously described. A flap portion 51120 of the outer sheet 1710 is folded back in the present view to show the textured sheet 51110. The textured sheet 51110 can comprise a plurality of the cushioning sockets 42110. For example, the textured sheet 51110 can be substantially the same as or similar to the first layer 100 comprising first sockets 130 (shown in FIG. 1) or the second layer 200 comprising the second sockets 230 (shown in FIG. 2). In some aspects, additional layers of the textured sheets 51110 may disposed between the outer sheet 1710 and the inner sheet 1920.

Figure 52:
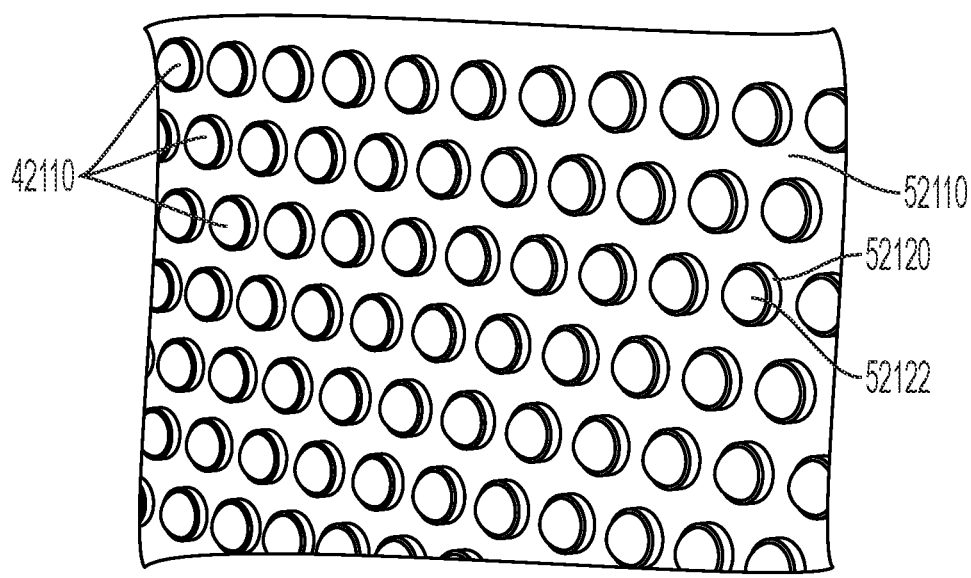
FIG. 52 is a close-up view of a textured sheet in accordance with another aspect of the present disclosure.

As shown in FIG. 52, the cushioning sockets 42110 can extend from a sheet base 52110 of the textured sheet 51110, similar to the first base 120 of the first layer 100 (shown in FIG. 1) or the second base 220 of the second layer 200 (shown in FIG. 2). The sheet base 52110 can be substantially planar in example aspects. Furthermore, in some aspects, each of the cushioning sockets 42110 can define a substantially cylindrical socket sidewall 52120 extending from the sheet base 52110 and a substantially domed or semi-spherical socket end 52122 extending from the socket sidewall 52120 opposite the sheet base 52110. In other aspects, each of the cushioning sockets 42110 can be substantially semi-spherical like the first and second sockets 130,230. In other aspects, the cushioning sockets 42110 can define any other suitable shape.

Figure 53:
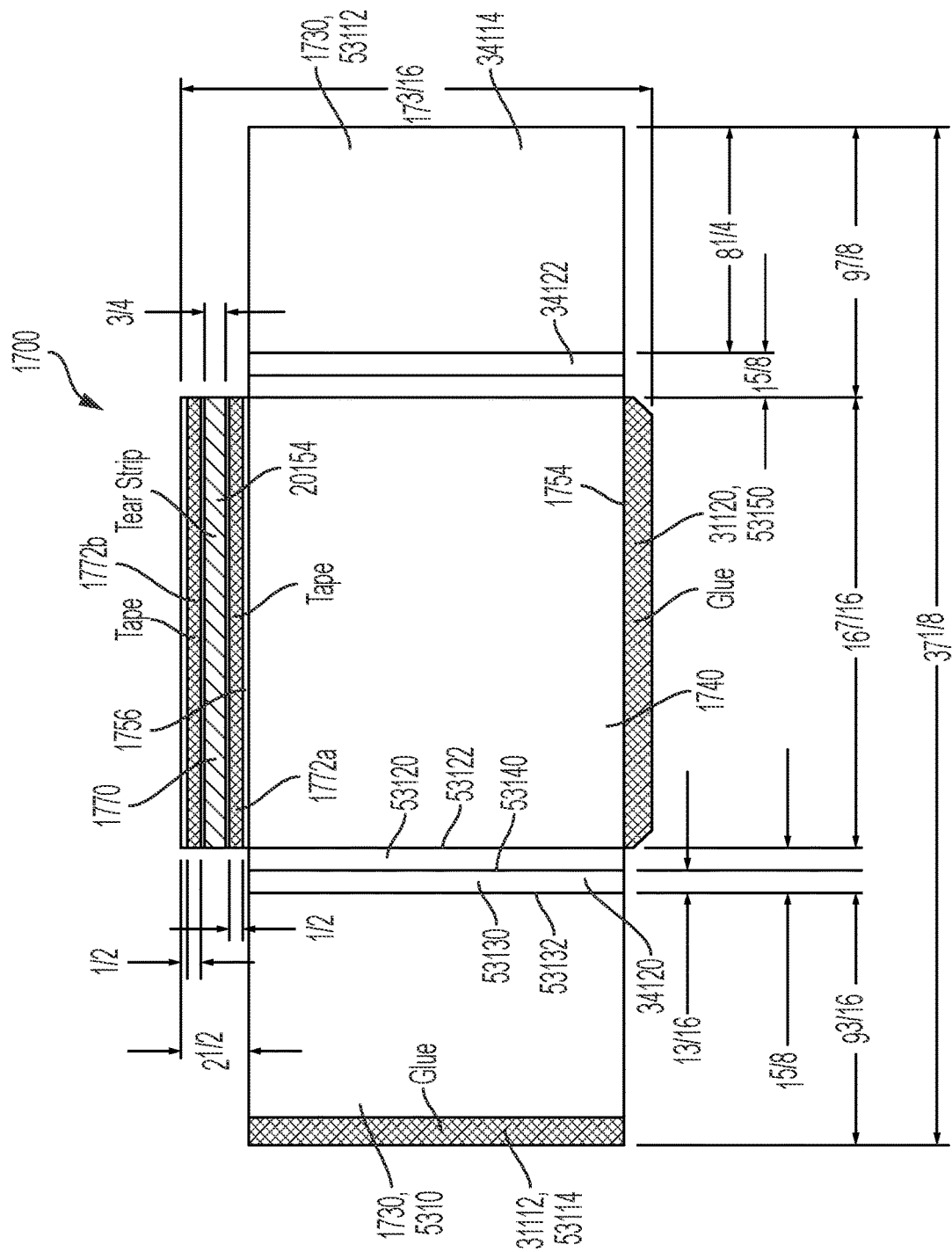
FIG. 53 is a top view of the outer layer of the cushioned mailer in a blank configuration, in accordance with another aspect of the present disclosure.

FIG. 53 illustrates the cushioned mailer 1700 in a blank configuration, in accordance with one example aspect of the present disclosure. As shown, the cushioned mailer 1700 can define the rear panel 1740 and the first and second gussets 34120,34122 disposed at either side of the rear panel 1740. In the blank configuration, the front panel 1730 can define a first front flap 53110 extending from the first gusset 34120 opposite the rear panel 1740 and a second front flap 53112 extending from the second gusset 34122 opposite the rear panel 1740. The first front flap 53110 can define the first sealing end 31112, and the second front flap 53112 can define the second sealing end 31114. In the present aspect, a front sealing adhesive 53114, such as glue, can be applied to the first sealing end 31112 for attaching the first sealing end 31112 to the second sealing end 31114. The front sealing adhesive 53114 can seal the first front flap 53110 to the second front flap 53112 to form the front panel 1730 when the cushioned mailer 1700 is in an assembled configuration (shown in FIG. 54).

According to example aspects, each of the first and second gussets 34120,34122 can define a rear gusset flap 53120 connected to the rear panel 1740 at a rear flap bend line 53122 and a front gusset flap 53130 connected to the front panel 1730 at a front flap bend line 53132. The rear and front gusset flaps 53120,53130 can be configured to fold inward at the rear and front flap bend lines 53122,53132, respectively, towards the inner cavity 1826 (shown in FIG. 18). Furthermore, the rear gusset flap 53120 can be connected to the corresponding front gusset flap 53130 at a side gusset bend line 53140. The rear gusset flap 53120 can be configured to fold towards the front gusset flap 53130 at the side gusset bend line 53140 to define the V-shaped cross-section of the corresponding first and second gussets 34120,34122, as previously described.

Additionally, the bottom sealing flap 31120 can extend from the rear panel 1740 at the bottom end 1754 of the cushioned mailer 1700, and the closure flap 1770 can extend from the rear panel 1740 at the top end 1756 of the cushioned mailer 1700. A bottom sealing adhesive 53150, such as glue, can be applied to the bottom sealing flap 31120 to seal the bottom sealing flap 31120 to the front panel 1730 when the cushioned mailer 1700 is in the assembled configuration. The closure flap 1770 can comprise the inner and outer adhesive strips 1772a,b and the tear strip 20154 disposed therebetween. Example dimensions of the cushioned mailer 1700 are shown in inches in FIG. 53. The dimensions disclosed herein are merely exemplary and should not be construed as limiting.

Figure 54:
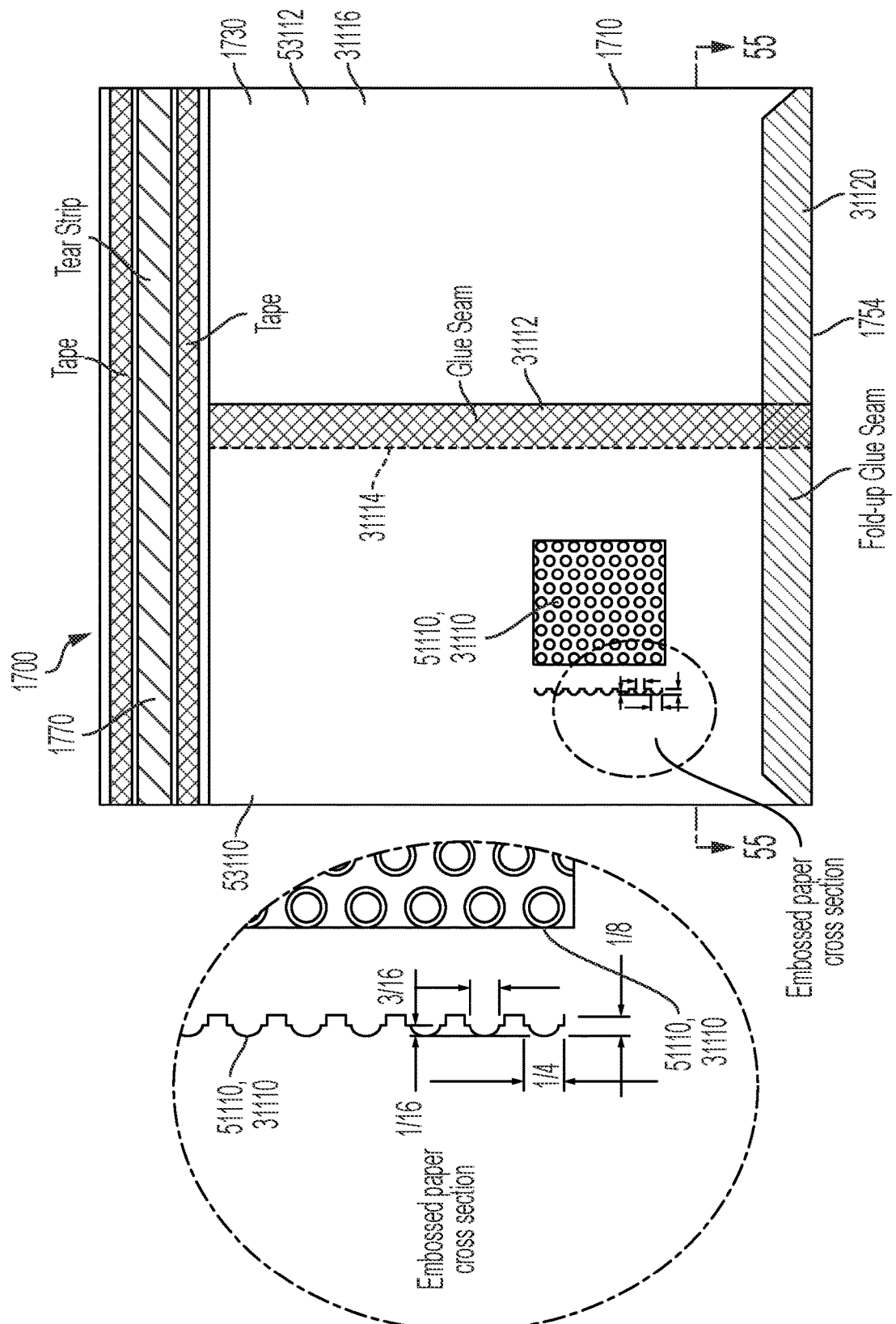
FIG. 54 is a front view of the cushioned mailer comprising the outer layer of FIG. 53.
Figure 55:
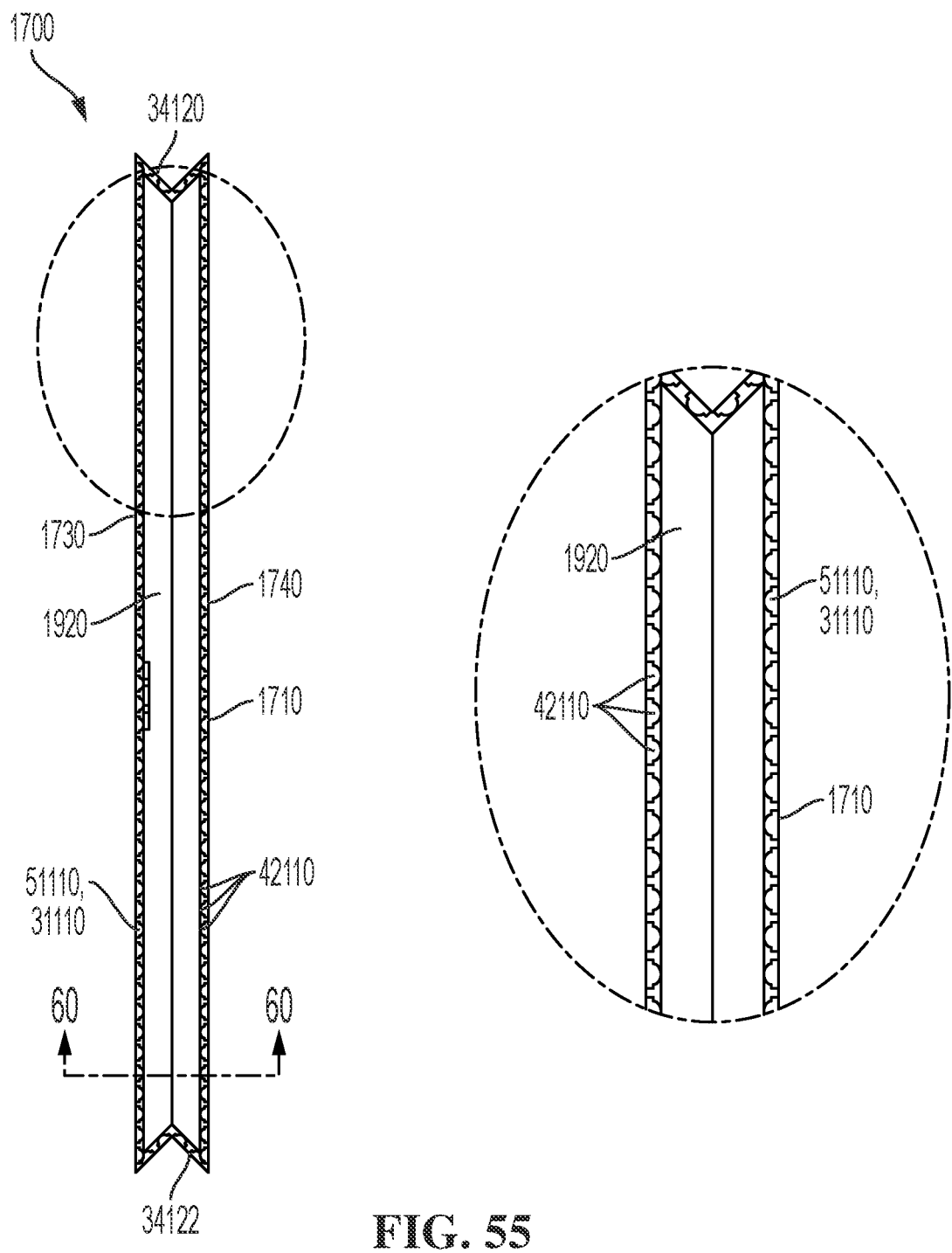
FIG. 55 is a cross-sectional view of the cushioned mailer of FIG. 54 taken along line 55-55 in FIG. 54.

FIG. 54 illustrates the cushioned mailer 1700 of FIG. 54 in the assembled configuration. In the assembled configuration, the first sealing end 31112 can be folded over and sealed to the second sealing end 31114 (shown in FIG. 53) to join the first front flap 53110 to the second front flap 53112 and to form the continuous mailer sidewall 31116. The first front flap 53110 and the second front flap 53112 can together define the front panel 1730, as shown. Furthermore, the bottom sealing flap 31120 extending from the rear panel 1740 (shown in FIG. 53) can be folded over and sealed to the front panel 1730 at the bottom end 1754 of the cushioned mailer 1700 to seal the inner cavity 1826 (shown in FIG. 46) at the bottom end 1754. In the present view, a portion of the outer sheet 1710 is removed to show the intermediate cushioning layer 31110 disposed between the outer sheet 1710 and the inner sheet 1920 (shown in FIG. 55). In the present aspect, the intermediate cushioning layer 31110 can be the textured sheet 51110. The various example dimensions shown in FIG. 54 are in inches. The dimensions disclosed herein are merely exemplary and should not be construed as limiting FIG. 55 illustrates a cross-sectional view and a detailed cross-sectional view of the cushioned mailer 1700 taken along line 55-55 in FIG. 54. As shown, the textured sheet 51110 can be disposed between the outer sheet 1710 and the inner sheet 1920. Both the outer sheet 1710 and the inner sheet 1920 can be substantially smooth. In example aspects, the cushioning sockets 42110 can extend inward towards the inner sheet 1920, as shown. In example aspects, extending the cushioning sockets 42110 inward towards the inner sheet 1920 can aid in maintaining the smoothness of the outer sheet 1710. In some aspects, the domed socket end 52122 (shown in FIG. 52) of each cushioning socket 42110 can be adhered to the inner sheet 1920 and/or the sheet base 52110 (shown in FIG. 52) of the textured sheet 51110 can be adhered to the outer layer 1710. In other aspects, the cushioning sockets 42110 can extend outward towards the outer sheet 1710.

Figure 56:
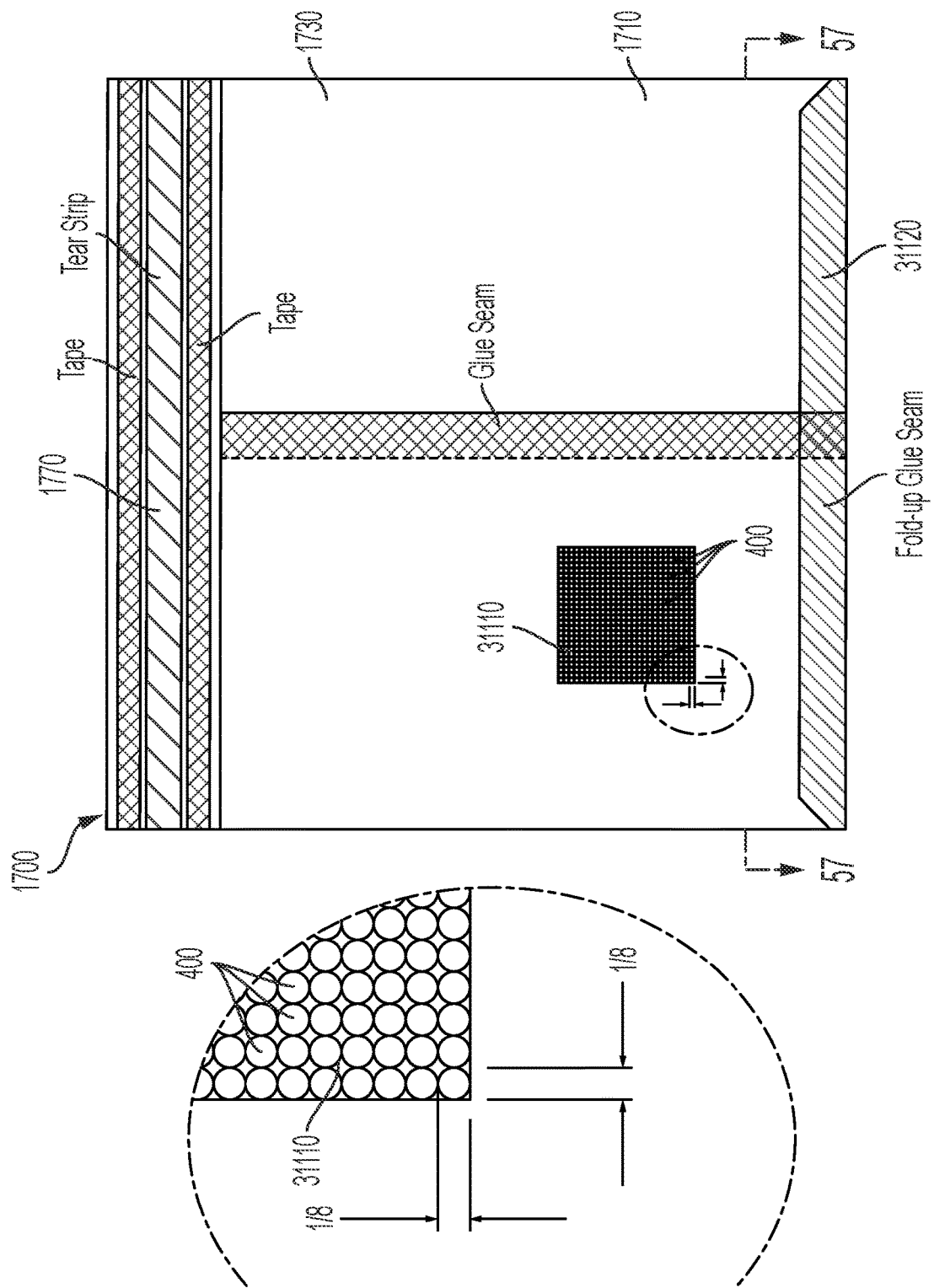
FIG. 56 is a front view of the cushioned mailer comprising the outer layer of FIG. 53 in accordance with another aspect of the disclosure.
Figure 57:
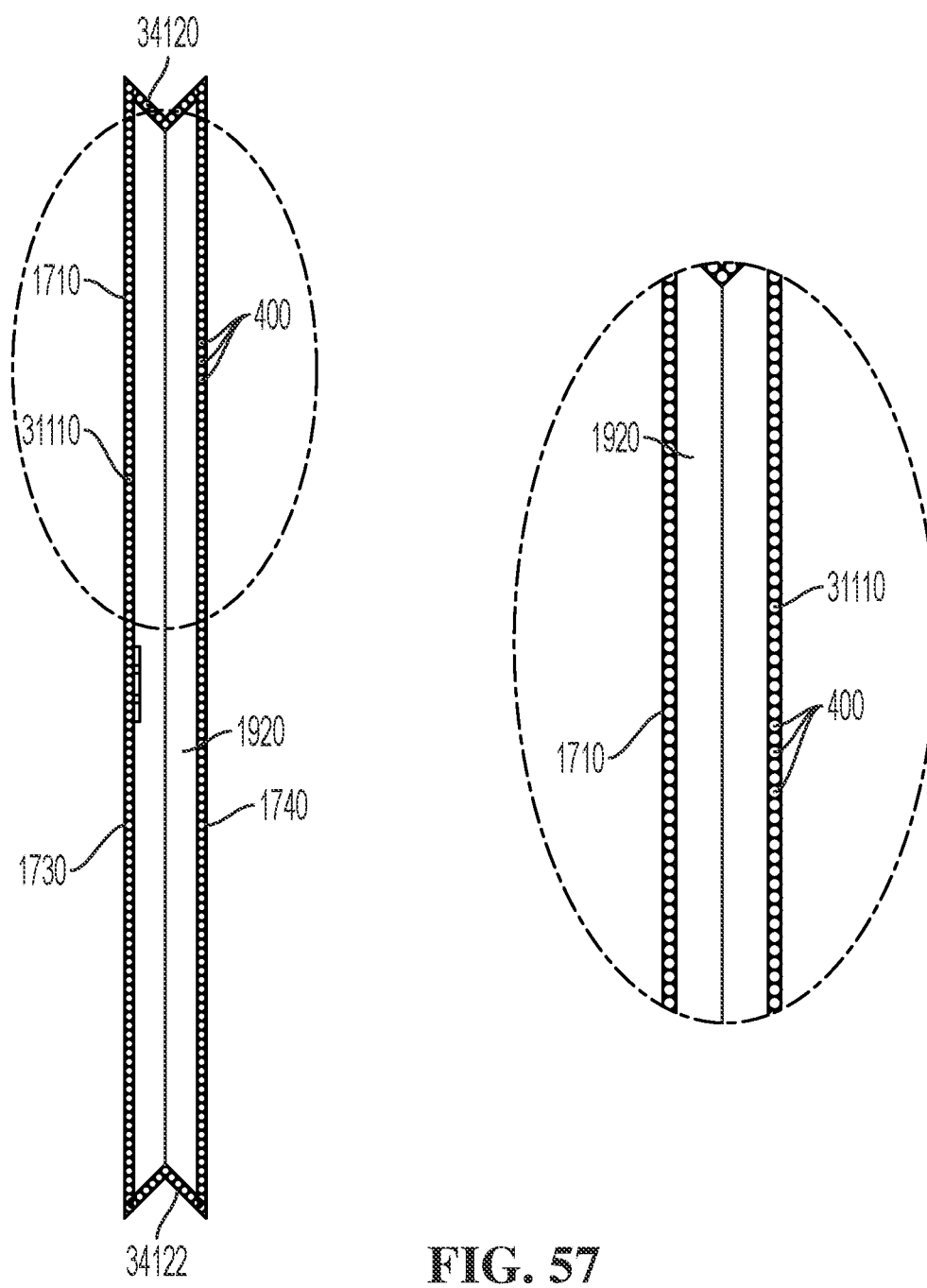
FIG. 57 is a cross-sectional view of the cushioned mailer of FIG. 56 taken along line 57-57 in FIG. 56.

FIG. 56 the cushioned mailer 1700 in the assembled configuration, in accordance with another example aspect of the present disclosure. The cushioned mailer 1700 of FIG. 56 can be assembled from the blank configuration in the same manner as the cushioned mailer 1700 of FIGS. 53-55. However, in the present aspect, the intermediate cushioning layer 31110 can comprise the cushioning inserts 400. The various example dimensions of the cushioned mailer 1700 shown in FIG. 56 are in inches. The dimensions disclosed herein are merely exemplary and should not be construed as limiting. FIG. 57 illustrates a cross-sectional view and a detailed cross-sectional view of the cushioned mailer 1700 taken along line 57-57 in FIG. 56. As shown, the cushioning inserts 400 can be disposed between the outer sheet 1710 and the inner sheet 1920. Both the outer sheet 1710 and the inner sheet 1920 can be substantially smooth. In other aspects, the outer sheet 1710 and/or the inner sheet 1920 can define the cushioning sockets 42110. In example aspects, the cushioning inserts 400 can confront, and in some instances may contact, adjacent ones of the cushioning inserts 400. In other aspects, the cushioning inserts 400 can be spaced from adjacent cushioning inserts 400.

Figure 58:
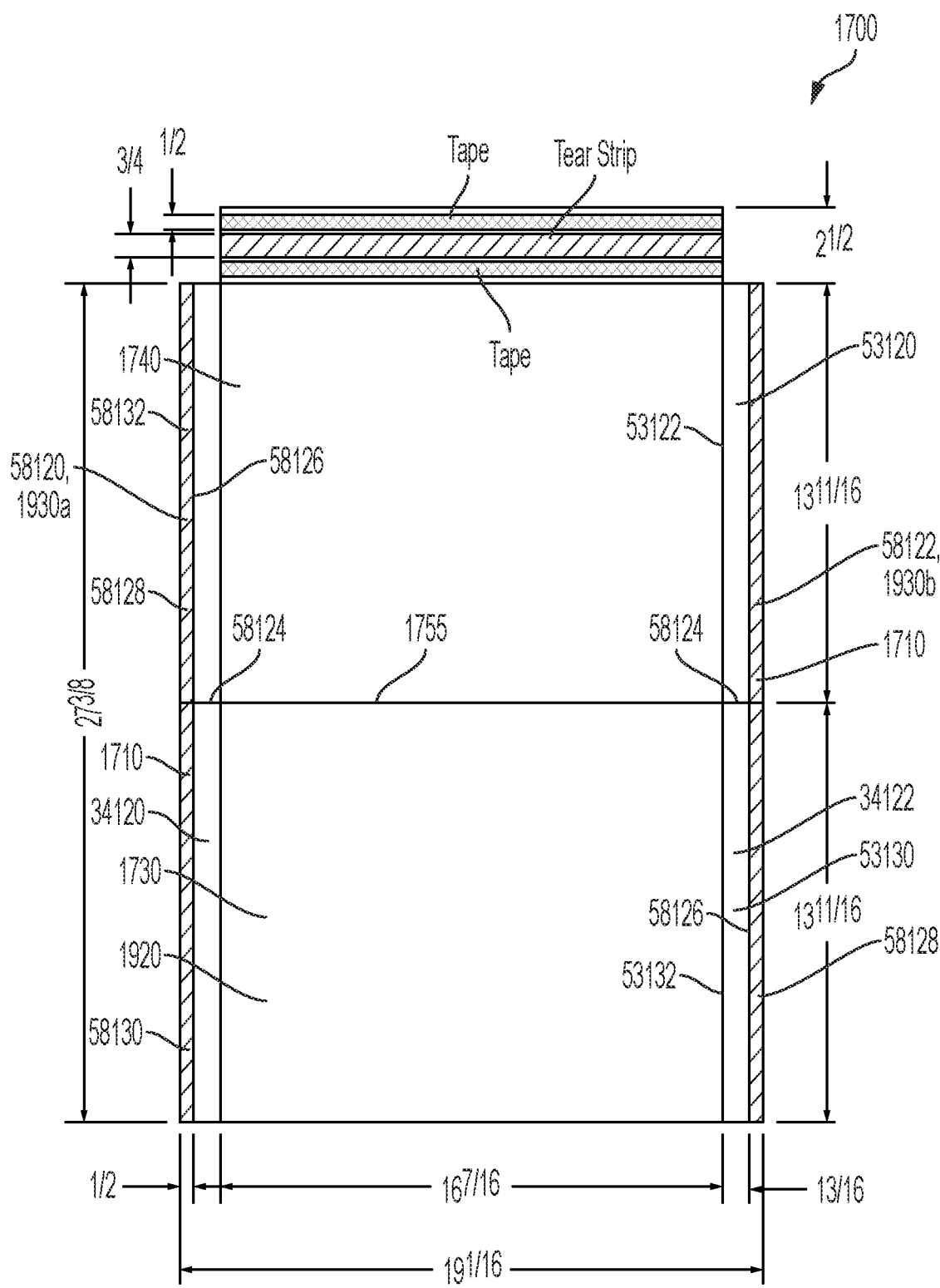
FIG. 58 is a is a top view of the outer layer of the cushioned mailer in the blank configuration, in accordance with another aspect of the present disclosure.

FIG. 58 illustrates the cushioned mailer 1700 in the blank configuration, in accordance with another example aspect of the present disclosure. The cushioned mailer 1700 of the present aspect can define the rear panel 1740 and the front panel 1730. The front panel 1730 can be connected to the rear panel 1740 by the bottom fold line 1755. The front panel 1730 can be folded relative to the rear panel 1740 at the bottom fold line 1755 to substantially confront the rear panel 1740 and to define the inner cavity 1826 (shown in FIG. 18) therebetween in the assembled configuration. The cushioned mailer 1700 can define the first and second gussets 34120, 34122. In the present aspect, each of the first and second gussets 34120,34122 can comprise one of the rear gusset flaps 53120 connected to the rear panel 1740 at the rear flap bend line 53122 and one of the front gusset flaps 53130 connected to the front panel 1730 at the front flap bend line 53132.

Each of the rear gusset flaps 53120 can be hingedly connected to the corresponding front gusset flap 53130 at a bottom gusset bend line 58124. In example aspects, each of bottom gusset bend lines 58124 can be formed as an extension of the bottom fold line 1755. Each of the front gusset flaps 53130 can be folded towards the corresponding rear gusset flap 53120 at the bottom gusset bend line 58124 as the front panel 1730 is folded towards the rear panel 1740 at the bottom fold line 1755. Furthermore, the left and right sealing flaps 1930*a,b* can extend along an outer gusset edge 58126 of the first and second gussets 34120,34122, respectively.

In some aspects, the intermediate cushioning layer 31110 (shown in FIG. 31) and/or the inner sheet 1920 can terminate at the outer gusset edges 58126. For example, in the present aspect, the left and right sealing flaps 1930*a,b*, can be defined by the outer sheet 1710 only. The first edge portion 58120 of the outer sheet 1710 can extend outward beyond the first gusset 34120 to define the left sealing flap 1930*a*, and the second edge portion 58122 of the outer sheet 1710 can extend outward beyond the second gusset 34122 to define the right sealing flap 1930*b*. In other aspects, the inner sheet 1920 and/or the intermediate cushioning layer 31110 can also extend outward beyond the outer gusset edges 58126 to partially define the left and right sealing flaps 1930*a,b*.

A gusset adhesive 58128, such as glue for example and without limitation, can be applied to each of the left and right sealing flaps 1930*a,b*. When the cushioned mailer 1700 is folded to the assembled configuration, a front flap portion 58130 of each of the left and right sealing flaps 1930*a,b* adjacent to the corresponding front gusset flap 53130 can be adhered to a rear flap portion 58132 of the corresponding left or right sealing flap 1930*a,b* adjacent to the corresponding rear gusset flap 53120. Moreover, in the assembled configuration, the side gusset bend lines 53140 (shown in FIG. 53) can be formed at the outer gusset edges 58126, and the first and second gussets 34120,34122 can fold inward towards the inner cavity 1826 (shown in FIG. 18) in the assembled configuration, as previously described. The various example dimensions of the cushioned mailer 1700 shown in FIG. 58 are in inches. The dimensions disclosed herein are merely exemplary and should not be construed as limiting.

Figure 59:
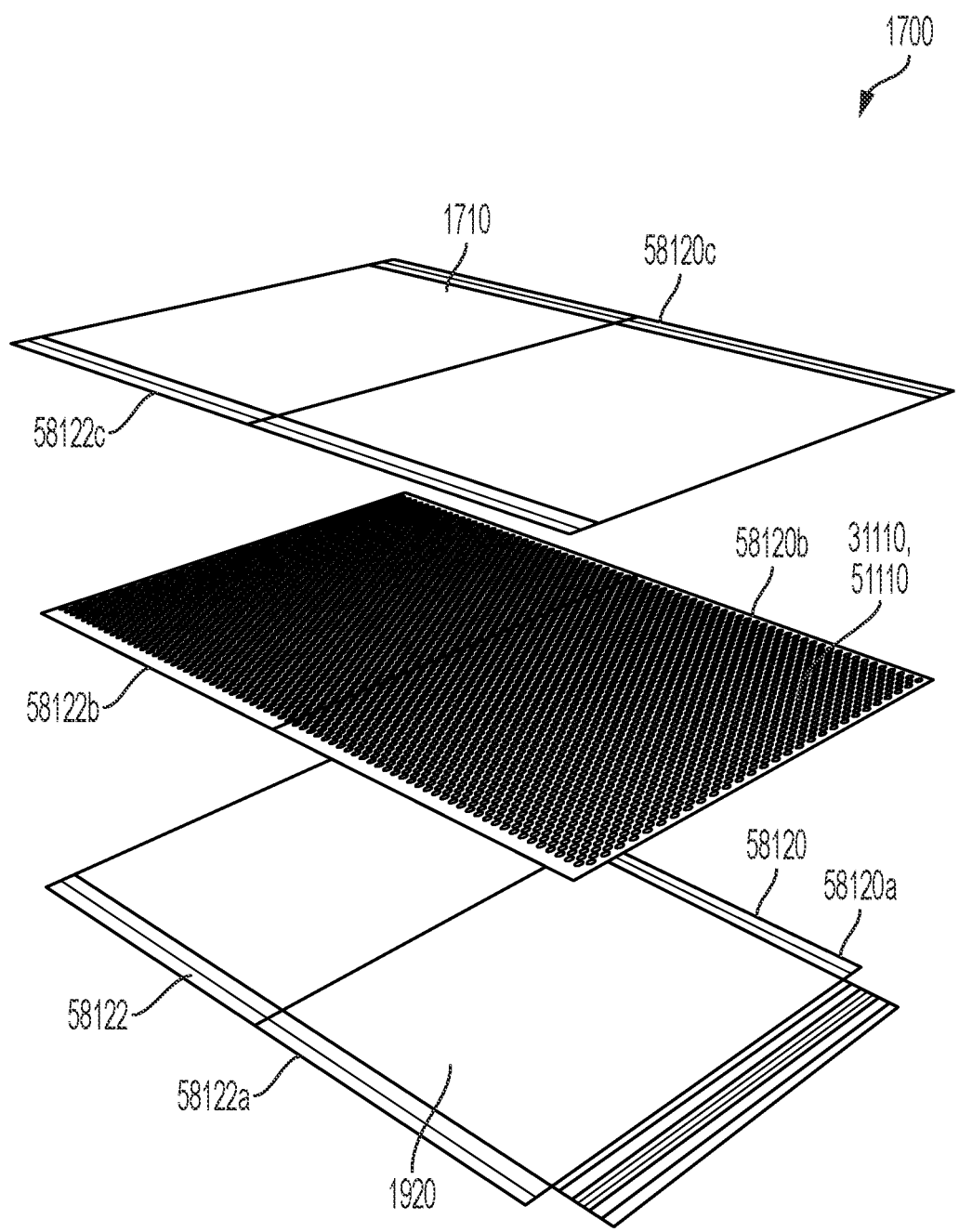
FIG. 59 illustrates an exploded view of the cushioned mailer, in accordance with another aspect of the present disclosure.

FIG. 59 is an exploded view of an example aspect of the cushioned mailer 1700, illustrating the textured sheet 51110 disposed between the outer sheet 1710 and the inner sheet 1920. In the present aspect, first edge portions 58120*a,b,c* and second edge portions 58122*a,b,c* of the inner sheet 1920, the textured sheet 51110, and the outer sheet 1710 can cooperate to define the left and right sealing flaps 1930*a,b* (shown in FIG. 58). In some aspects, the first edge portions 58120*a,b,c* and the second edge portions 58122*a,b,c* of the inner sheet 1920, the textured sheet 51110, and the outer sheet 1710 can be substantially smooth to facilitate adhering the inner sheet 1920, the textured sheet 51110, and the outer sheet 1710 together and forming substantially smooth left and right sealing flaps 1930*a,b*.

Figure 60:
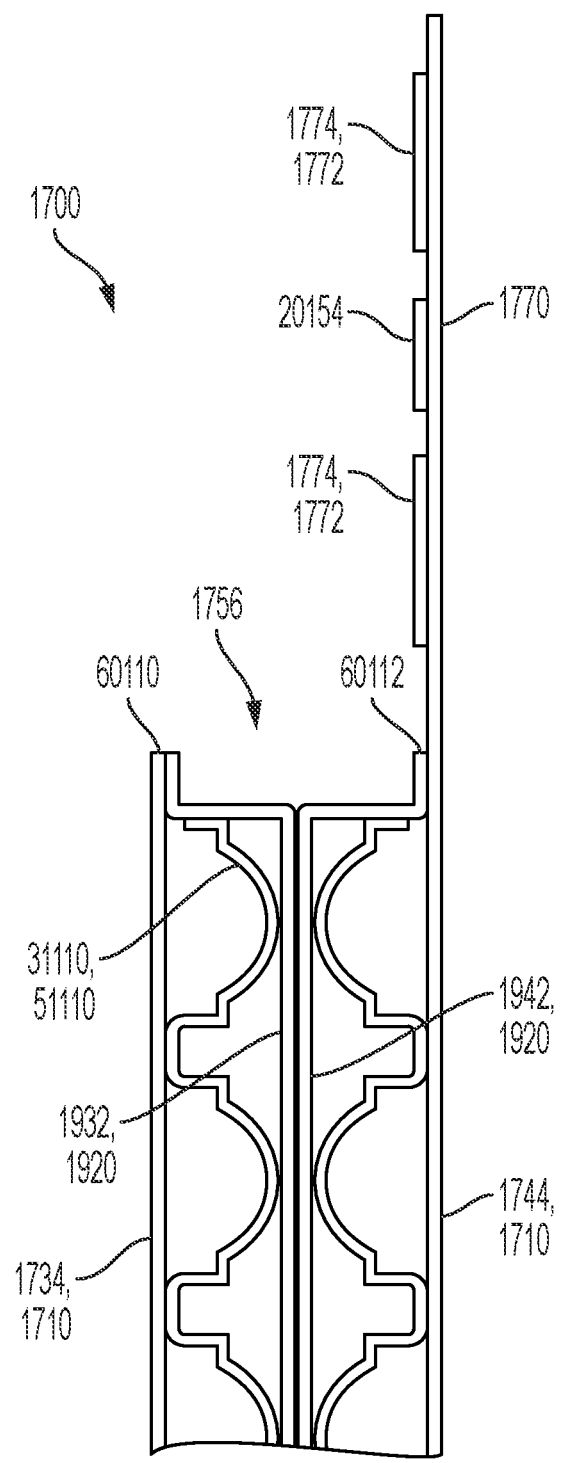
FIG. 60 is a cross-sectional view of the cushioned mailer taken along line 60-60 in FIG. 55.

FIG. 60 is a cross-sectional view of the top end 1756 of the cushioned mailer 1700 taken along line 60-60 in FIG. 55. In some aspects, as shown, the front inner portion 1932 of the inner sheet 1920 can be sealed to the front outer portion 1734 of the outer sheet 1710 at the top end 1756 of the cushioned mailer 1700 to define a front top seam 60110. Similarly, the rear inner portion 1942 of the inner sheet 1920 can be sealed to the rear outer portion 1744 of the outer sheet 1710 at the top end 1756 of the cushioned mailer 1700 to define a rear top seam 60112. In some aspects, the inner sheet 1920 and/or the outer sheet 1710 can also or alternatively be sealed to the intermediate cushioning layer 31110 at the top end 1756. However, in other aspects, as shown in FIGS. 23A and 23B, the inner sheet 1920 may not be sealed to the outer sheet 1710 at the top end 1756 of the cushioned mailer 1700.

Figure 61:
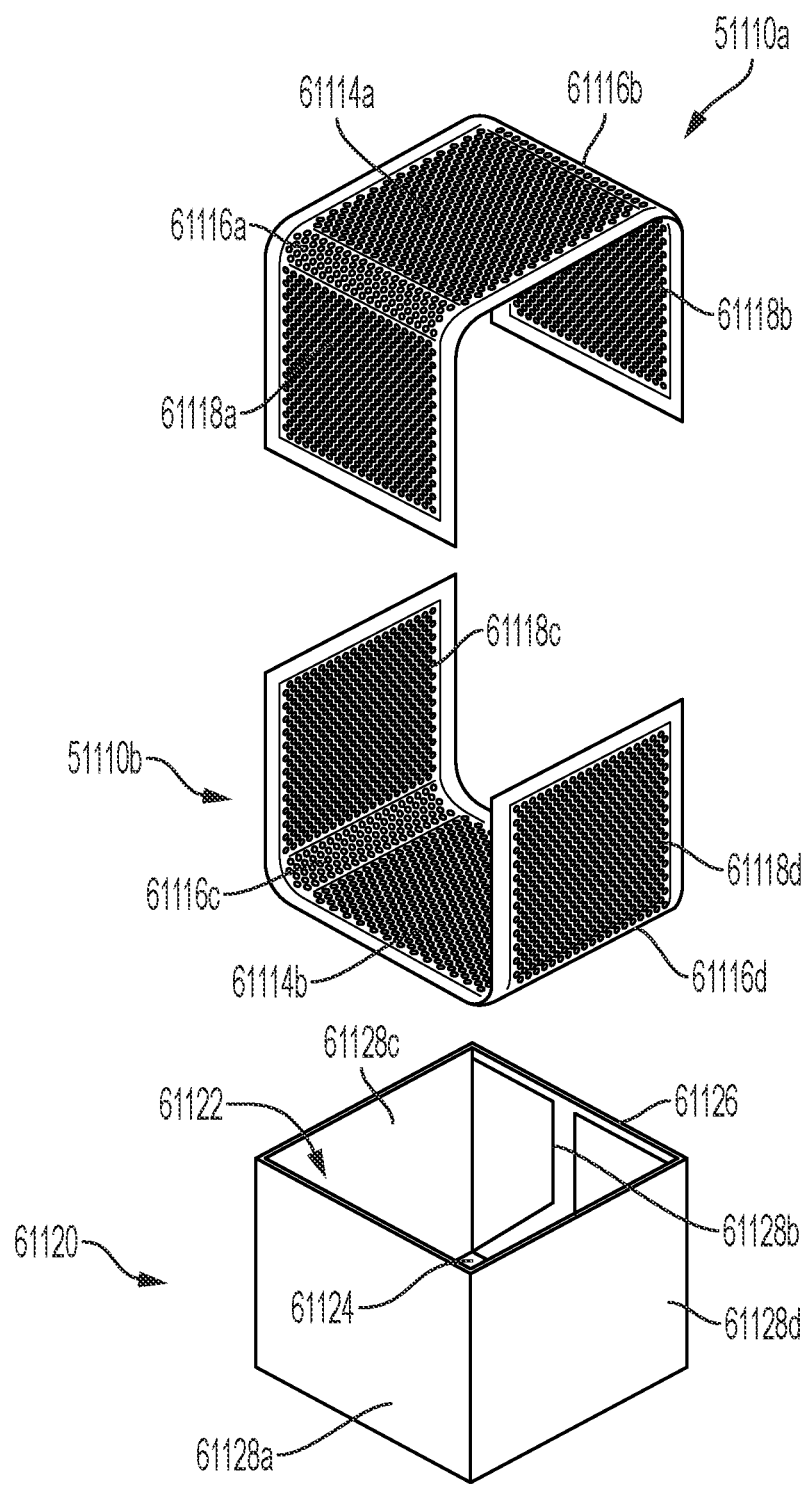
FIG. 61 is an exploded view of the textured sheet utilized in another packing application, in accordance with another aspect of the present disclosure.

FIG. 61 illustrates the textured sheet 51110 in accordance with another example aspect of the disclosure. In example aspects, one or more of the textured sheets 51110 and/or cushioning sheets 700 (shown in FIG. 7) can be as cushioning and/or insulation in packaging applications other than mailers. For example, in the present aspect, first and second textured sheets 51110*a,b* can be received within an interior box cavity 61122 of a box 61120 to cushion and/or insulate contents 1800 (shown in FIG. 18) received in the interior box cavity 61122. In example aspects, each of the first and second textured sheets 51110*a,b* can be folded into a C-shape.

The first textured sheet 51110*a* can define a first center liner panel 61114*a* disposed between a first side liner panel 61118*a* and a second side liner panel 61118*b*. A first side fold 61116*a* can be defined between the first side liner panel 61118*a* and the first center liner panel 61114*a*, and a second side fold 61116*b* can be defined between the second side liner panel 61118*b* and the first center liner panel 61114*a*. Similarly, the second textured sheet 51110*b* can define a second center liner panel 61114*b* disposed between a third side liner panel 61118*c* and a fourth side liner panel 61118*d*. A third side fold 61116*c* can be defined between the third side liner panel 61118*c* and the second center liner panel 61114*b*, and a fourth side fold 61116*d* can be defined between the fourth side liner panel 61118*d* and the second center liner panel 61114*b*.

The box 61120 can define a bottom box panel 61124 and an open top box end 61126 opposite the bottom box panel 61124. In other aspects, a top box panel (not shown) can be formed at the top box end 61126. The box 61120 can further define first, second, third, and fourth box side panels 61128*a,b,c,d*. When the first and second textured sheets 51110*a,b* are assembled with the box 61120, each of the first, second, third, and fourth side liner panel 61118*a,b,c,d* can be configured to confront a corresponding one of the first, second, third, and fourth box side panels 61128*a,b,c,d*, respectively. Additionally, the first center liner panel 61114*a* can be disposed at the top box end 61126, and the second center liner panel 61114*b* can confront the bottom box panel 61124. In other aspects, the textured sheets 51110 and/or cushioning sheets 700 can be utilized in any other suitable packaging application.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A cushioned mailer comprising:
a paper outer layer;
a paper inner layer defining an inner cavity of the cushioned mailer, the inner cavity configured to receive contents therein, the inner cavity defining an opening at a top end of the cushioned mailer, the opening allowing access to the inner cavity;
an intermediate cushioning layer disposed between the paper outer layer and the paper inner layer, the intermediate cushioning layer comprising a plurality of voids defined between the paper outer layer and the paper inner layer and a plurality of cushioning inserts, each of the plurality of cushioning inserts being substantially uniform in size and shape and received in a corresponding one of the plurality of voids, each void having a diameter that is larger than a diameter of the cushioning insert disposed therein so that each void is configured to allow unrestricted movement of the cushioning insert disposed therein about the corresponding void; and
a closure flap extending from the top end of the cushioned mailer, the closure flap comprising an adhesive strip, the adhesive strip configured to seal the cushioned mailer in a closed orientation, the closure flap covering the opening in the closed orientation to retain the contents in the inner cavity,
wherein the adhesive strip is removably covered by a peelable backing, the peelable backing is removable from the adhesive strip to expose the adhesive strip and seal the cushioned mailer in the closed orientation, and the peelable backing defines an overhanging tab at a first backing end of the peelable backing, the overhanging tab extending beyond a side edge of the closure flap.

2. The cushioned mailer of claim 1, wherein the plurality of cushioning inserts are arranged in a single layer between the paper inner layer and the paper outer layer, the plurality of cushioning inserts defining a plurality of rows and columns of the cushioning inserts.

3. The cushioned mailer of claim 1, wherein each of the plurality of cushioning inserts comprises a starch material, and wherein the starch material is repulpable.

4. The cushioned mailer of claim 3, each of the plurality of cushioning inserts is substantially spherical in shape.

5. The cushioned mailer of claim 1, wherein the closure flap further comprises a tear strip, the tear strip extending substantially along a width of the closure flap, the tear strip disposed between the adhesive strip and the top end of the cushioned mailer, wherein the tear strip is configured to be torn away from the closure flap to reconfigure the cushioned mailer from the closed orientation to an open orientation.

6. The cushioned mailer of claim 5, wherein:
the adhesive strip is a first adhesive strip and the peelable backing is a first peelable backing;
the closure flap further comprises a second adhesive strip and a second peelable backing removably covering the second adhesive strip; and
the tear strip is disposed between the first adhesive strip and the second adhesive strip.

7. The cushioned mailer of claim 5, wherein a hanging hole is defined through the tear strip, the hanging hole configured to receive a hanger device therethrough to suspend the cushioned mailer in an upright, vertical orientation.

8. The cushioned mailer of claim 1, wherein the cushioned mailer defines a first sealing end and a second sealing end, and wherein the first sealing end is folded over and sealed to the second sealing end to define a continuous mailer sidewall encompassing all sides of the inner cavity.

9. The cushioned mailer of claim 8, wherein:
the cushioned mailer defines a bottom end opposite the top end;
a bottom sealing flap extends from the bottom end of the cushioned mailer; and
the bottom sealing flap encloses the inner cavity at the bottom end.

10. The cushioned mailer of claim 1, wherein:
the cushioned mailer defines a front panel and a rear panel;
the front panel is folded relative to the rear panel at a bottom fold line at a bottom end of the cushioned mailer;
the cushioned mailer further defines a first sealing flap at a first side of the cushioned mailer and a second sealing flap at a second side of the cushioned mailer opposite the first side;
the first sealing flap and the second sealing flap are folded at the bottom end;
each of the first and second sealing flaps comprise a front flap portion adjacent to the front panel and a rear flap portion adjacent to the rear panel;
the front flap portion of the first sealing flap is sealed to the rear flap portion of the first sealing flap; and
the front flap portion of the second sealing flap is sealed to the rear flap portion of the second sealing flap.

11. The cushioned mailer of claim 1, wherein:
the cushioned mailer comprises a front panel, a rear panel, a first gusset disposed at a first side of the cushioned mailer, and a second gusset disposed at a second side of the cushioned mailer opposite the first side;
each of the front panel and the rear panel extend between the first gusset and the second gusset; and
each of the first gusset and the second gusset extend inward towards the inner cavity.

12. The cushioned mailer of claim 11, wherein each of the first gusset and the second gusset comprise a rear gusset flap connected to the rear panel at a rear flap bend line and a front gusset flap connected to the front panel at a front flap bend line, the rear gusset flap is connected to the front gusset flap at a side gusset bend line, and the rear gusset flap is folded towards the front gusset flap at the side gusset bend line to define a substantially V-shaped cross-section.

13. A cushioned mailer comprising:
a paper outer layer;
a paper inner layer defining an inner cavity of the cushioned mailer, the inner cavity configured to receive contents therein, the inner cavity defining an opening at a top end of the cushioned mailer, the opening allowing access to the inner cavity;
an intermediate cushioning layer disposed between the paper outer layer and the paper inner layer, the intermediate cushioning layer comprising a plurality of voids defined between the paper outer layer and the paper inner layer and a plurality of cushioning inserts, each of the plurality of cushioning inserts being received in a corresponding one of the plurality of voids, each void having a diameter that is larger than a diameter of the cushioning insert disposed therein so that each void is configured to allow unrestricted movement of the cushioning insert disposed therein about the corresponding void; and
a closure flap extending from the top end of the cushioned mailer, the closure flap comprising an adhesive strip, the adhesive strip configured to seal the cushioned mailer in a closed orientation, the closure flap covering the opening in the closed orientation to retain the contents in the inner cavity,
wherein the adhesive strip is removably covered by a peelable backing, the peelable backing is removable from the adhesive strip to expose the adhesive strip and seal the cushioned mailer in the closed orientation, and the peelable backing defines an overhanging tab at a first backing end of the peelable backing, the overhanging tab extending beyond a side edge of the closure flap.

14. The cushioned mailer of claim 13, wherein the plurality of voids are arranged to define a plurality of rows of the voids and a plurality of columns of the voids.

15. The cushioned mailer of claim 13, wherein:
each of the plurality of voids is defined by a first socket defined by the paper outer layer and a second socket defined by the paper inner layer.

16. The cushioned mailer of claim 13, wherein the closure flap further comprises a tear strip, the tear strip extending substantially along a width of the closure flap, the tear strip disposed between the adhesive strip and the top end of the cushioned mailer, wherein the tear strip is configured to be torn away from the closure flap to reconfigure the cushioned mailer from the closed orientation to an open orientation.

17. The cushioned mailer of claim 16, wherein:
the adhesive strip is a first adhesive strip and the peelable backing is a first peelable backing;
the closure flap further comprises a second adhesive strip and a second peelable backing removably covering the second adhesive strip; and
the tear strip is disposed between the first adhesive strip and the second adhesive strip.

18. The cushioned mailer of claim 1, wherein a hanging hole is defined through the tear strip, the hanging hole configured to receive a hanger device therethrough to suspend the cushioned mailer in an upright, vertical orientation.

19. The cushioned mailer of claim 13, wherein the cushioned mailer defines a first sealing end and a second sealing end, and wherein the first sealing end is folded over and sealed to the second sealing end to define a continuous mailer sidewall encompassing all sides of the inner cavity.

20. The cushioned mailer of claim 19, wherein:
the cushioned mailer defines a bottom end opposite the top end;
a bottom sealing flap extends from the bottom end of the cushioned mailer; and
the bottom sealing flap encloses the inner cavity at the bottom end.

21. The cushioned mailer of claim 13, wherein:
the cushioned mailer defines a front panel and a rear panel;
the front panel is folded relative to the rear panel at a bottom fold line at a bottom end of the cushioned mailer;
the cushioned mailer further defines a first sealing flap at a first side of the cushioned mailer and a second sealing flap at a second side of the cushioned mailer opposite the first side;
the first sealing flap and the second sealing flap are folded at the bottom end;

each of the first and second sealing flaps comprise a front flap portion adjacent to the front panel and a rear flap portion adjacent to the rear panel;

the front flap portion of the first sealing flap is sealed to the rear flap portion of the first sealing flap; and the front flap portion of the second sealing flap is sealed to the rear flap portion of the second sealing flap.

22. The cushioned mailer of claim 13, wherein:

the cushioned mailer comprises a front panel, a rear panel, a first gusset disposed at a first side of the cushioned mailer, and a second gusset disposed at a second side of the cushioned mailer opposite the first side;

each of the front panel and the rear panel extend between the first gusset and the second gusset; and each of the first gusset and the second gusset extend inward towards the inner cavity.

23. The cushioned mailer of claim 22, wherein each of the first gusset and the second gusset comprise a rear gusset flap connected to the rear panel at a rear flap bend line and a front gusset flap connected to the front panel at a front flap bend line, the rear gusset flap is connected to the front gusset flap at a side gusset bend line, and the rear gusset flap is folded towards the front gusset flap at the side gusset bend line to define a substantially V-shaped cross-section.

* * * * *